(12) United States Patent
Eura et al.

(10) Patent No.: US 8,994,813 B2
(45) Date of Patent: Mar. 31, 2015

(54) INFORMATION PROCESSING APPARATUS, INFORMATION PROCESSING METHOD, AND PROGRAM

(75) Inventors: Yuka Eura, Tokyo (JP); Ryo Mukaiyama, Tokyo (JP); Takanori Nishimura, Kanagawa (JP); Tamaki Kojima, Tokyo (JP); Noriaki Nakagawa, Tokyo (JP); Yoshiyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 2477 days.

(21) Appl. No.: 11/482,000

(22) Filed: Jul. 7, 2006

(65) Prior Publication Data

US 2007/0024722 A1    Feb. 1, 2007

(30) Foreign Application Priority Data

Jul. 26, 2005 (JP) .................................. 2005-215903

(51) Int. Cl.
*H04N 7/18* (2006.01)
*G06F 17/30* (2006.01)
(Continued)

(52) U.S. Cl.
CPC .......... *G06F 17/30265* (2013.01); *G11B 27/34* (2013.01); *H04N 1/00442* (2013.01); *H04N 1/00453* (2013.01); *H04N 1/00458* (2013.01); *H04N 1/32128* (2013.01); *H04N 2201/3214* (2013.01); *H04N 2201/3215* (2013.01); *H04N 2201/3225* (2013.01); *H04N 2201/3273* (2013.01)
USPC ......................................................... 348/97

(58) Field of Classification Search
CPC ............. G06F 17/30265; G11B 27/34; H04N 1/00442; H04N 1/00453; H04N 1/00458; H04N 2201/3273; H04N 1/32128; H04N 2201/3214; H04N 2201/3215; H04N 2201/3225
USPC ............................................................ 348/97
See application file for complete search history.

(56) References Cited

U.S. PATENT DOCUMENTS 5,999,173 A * 12/1999 Ubillos ........................ 715/724
7,877,690 B2 * 1/2011 Margulis ...................... 715/723
(Continued)

FOREIGN PATENT DOCUMENTS

JP        2003-78864       3/2003
JP        2003-309793      10/2003
(Continued)

OTHER PUBLICATIONS

Office Action issued Aug. 18, 2011, in Japanese Patent Application No. 2005-215903.

*Primary Examiner* — Tung Vo
(74) *Attorney, Agent, or Firm* — Oblon, McClelland, Maier & Neustadt, L.L.P.

(57) ABSTRACT

An information processing apparatus is disclosed which includes: an allocation device configured to allocate each of a plurality of picture display areas to each of a plurality of picture groups each made up of a plurality of pictures, the picture display areas being arrayed in a first direction on a screen for displaying pictures; and a display control device configured to display each of the pictures constituting each of the picture groups in screen locations which correspond to the picture display areas allocated to the picture groups and which are arrayed in a second direction different from the first direction and are determined by times associated with the pictures.

8 Claims, 28 Drawing Sheets

(51) Int. Cl.
*G11B 27/34* (2006.01)
*H04N 1/00* (2006.01)
*H04N 1/32* (2006.01)

(56) References Cited

U.S. PATENT DOCUMENTS

2002/0051065 A1* 5/2002 Takahashi .................... 348/232
2004/0189687 A1* 9/2004 Yamamoto .................... 345/716

FOREIGN PATENT DOCUMENTS

| JP | 2004-70450 | 3/2004 |
| JP | 2004-328265 | 11/2004 |
| JP | 2005-33711 | 2/2005 |
| JP | 2005-63043 | 3/2005 |
| JP | 2006-268010 | 10/2006 |

* cited by examiner

FIG. 13

```
1  <MemoryCardInfo>
2    <InfoItem GUID="{5F1AD6DB-FA1D-4F4F-8BDB-66C9D8DE7C4D}">
3      <PhotographerName>euran</PhotographerName>
4      <Destination>
5        C:¥Documents and Settings¥nishy4¥My Documents¥My Pictures¥
6      </Destination>
7      <LastMedia>F:¥</LastMedia>
8      <LastCopiedDate>Tue, 31 May 2005 22:43:12 GMT</LastCopiedDate>
9    </InfoItem>
10   <InfoItem GUID="{5F1AD6DB-FA1D-4F4F-8BDB-66C9D8DE7C4E}">
11     <PhotographerName>nishy</PhotographerName>
12     <Destination>
13       C:¥Documents and Settings¥nishy4¥My Documents¥My Pictures¥
14     </Destination>
15     <LastMedia>F:¥</LastMedia>
16     <LastCopiedDate>Tue, 31 May 2005 22:45:12 GMT</LastCopiedDate>
17   </InfoItem>
18 </MemoryCardInfo>
```

FIG.14

```
1  <CopiedFileInfo>
2      <ImageFile Name="DSC00273.JPG" Size="159324" Time="Fri, 08 Oct 2004 07:45:46
3      GMT" TimeMilisec="000" Direction="10"/>
4      <ImageFile Name="DSC00274.JPG" Size="241910" Time="Fri, 08 Oct 2004 07:48:36
5      GMT" TimeMilisec="000" Direction="10"/>
6      <ImageFile Name="DSC00275.JPG" Size="207712" Time="Fri, 08 Oct 2004 07:55:42
7      GMT" TimeMilisec="000" Direction="10"/>
8  </CopiedFileInfo>
```

FIG.15A

MEDIA LINEUP INFORMATION

| ID | PHOTOGRAPHER | STORAGE LOCATION | ... |
|---|---|---|---|
| ID-A | tanaka | MyDocuments¥Pictures | ... |
| ID-B | suzuki | MyDocuments¥Pictures | ... |
| ID-C | sato | MyDocuments¥Pictures | ... |

FIG.15B

MEDIA DETAIL INFORMATION

| | FILE NAME | SIZE | LAST CHANGED DATE AND TIME |
|---|---|---|---|
| MEDIUM A (ID-A) | DSC000001.jpg | 1.10MB | 2004/01/01/13:01:55 |
| | DSC000002.jpg | 1.21MB | 2004/01/01/13:02:05 |
| | DSC000003.jpg | 1.11MB | 2004/01/01/13:05:07 |
| | ... | ... | ... |

FIG.15C

MEDIA DETAIL INFORMATION

| | FILE NAME | SIZE | LAST CHANGED DATE AND TIME |
|---|---|---|---|
| MEDIUM B (ID-B) | DSC000001.jpg | 1.21MB | 2004/01/01/13:01:56 |
| | DSC000002.jpg | 1.22MB | 2004/01/01/13:02:03 |
| | DSC000003.jpg | 1.31MB | 2004/01/01/13:05:05 |
| | ... | ... | ... |

FIG.15D

MEDIA DETAIL INFORMATION

| | FILE NAME | SIZE | LAST CHANGED DATE AND TIME |
|---|---|---|---|
| MEDIUM C (ID-C) | DSC000001.jpg | 1.11MB | 2004/01/01/13:01:57 |
| | DSC000002.jpg | 1.00MB | 2004/01/01/13:02:03 |
| | DSC000003.jpg | 1.12MB | 2004/01/01/13:05:09 |
| | ... | ... | ... |

FIG.19

```
1  [euran]
2  TimeOffset=0.0006712962962963
3  [nishy]
4  TimeOffset=0.0000000000000000
5  [ryom]
6  TimeOffset=0.0002546296296296
7  [ykoba]
8  TimeOffset=0.0002546296296296
```

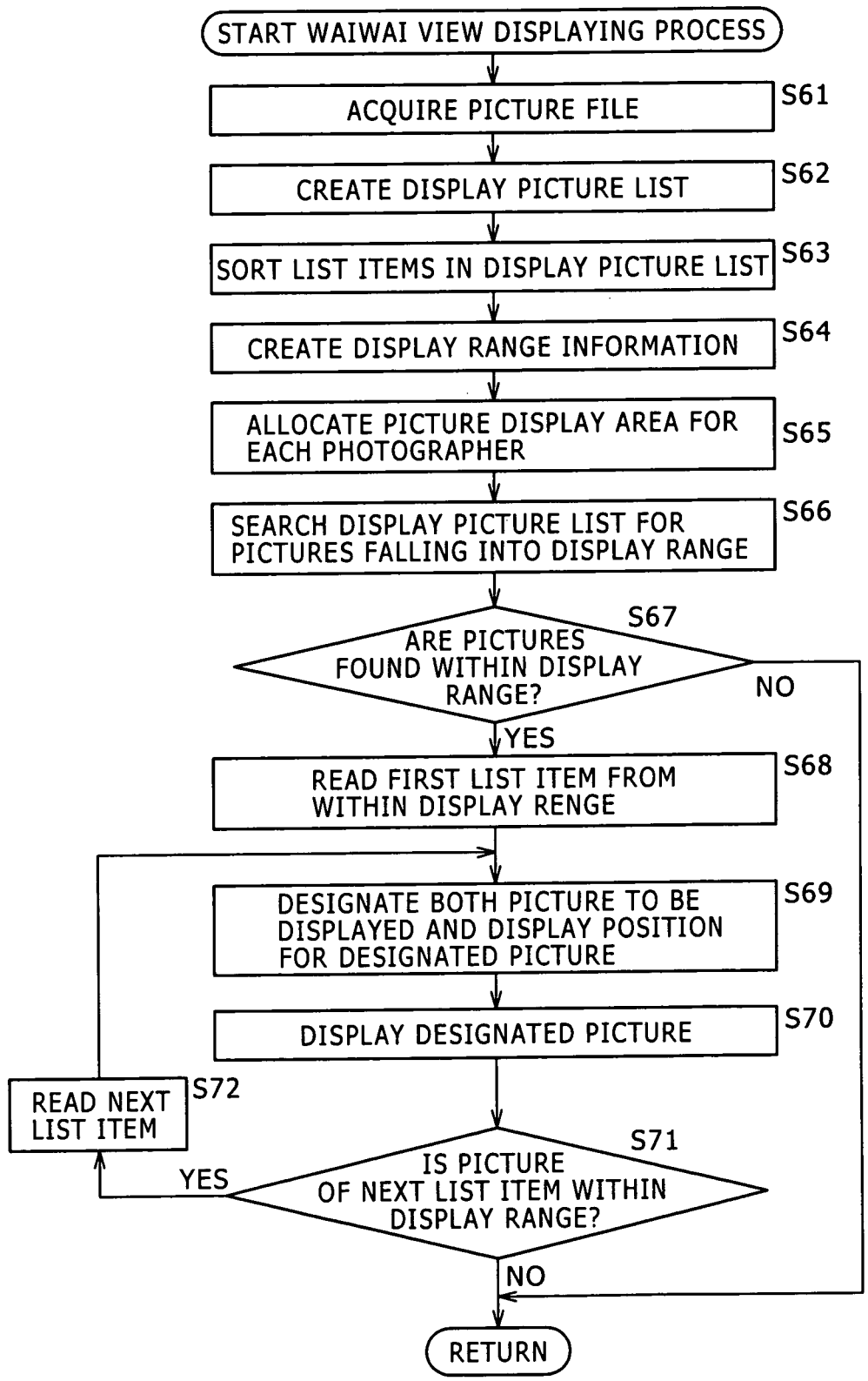

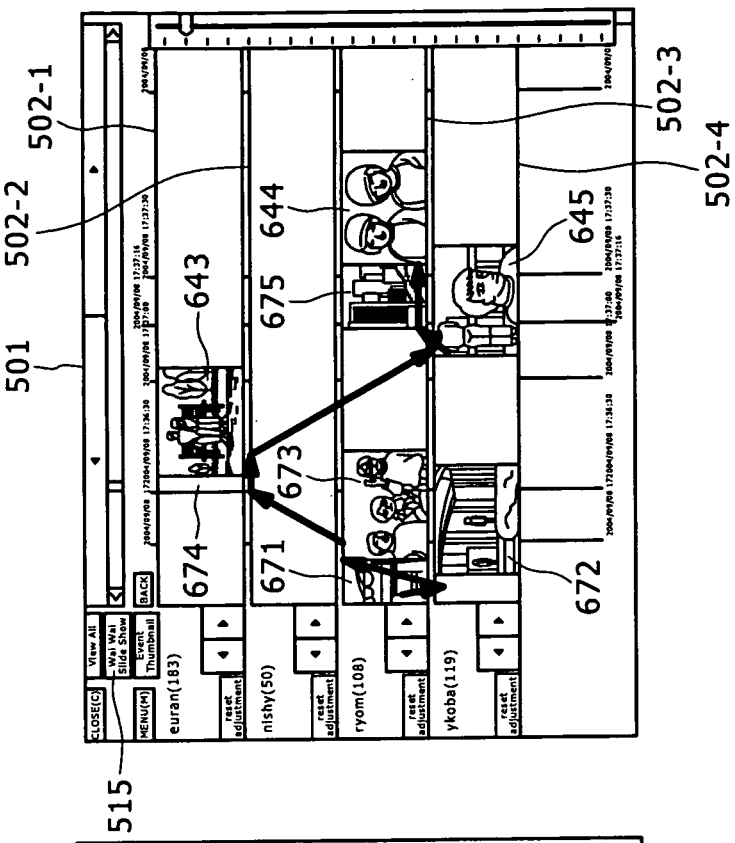
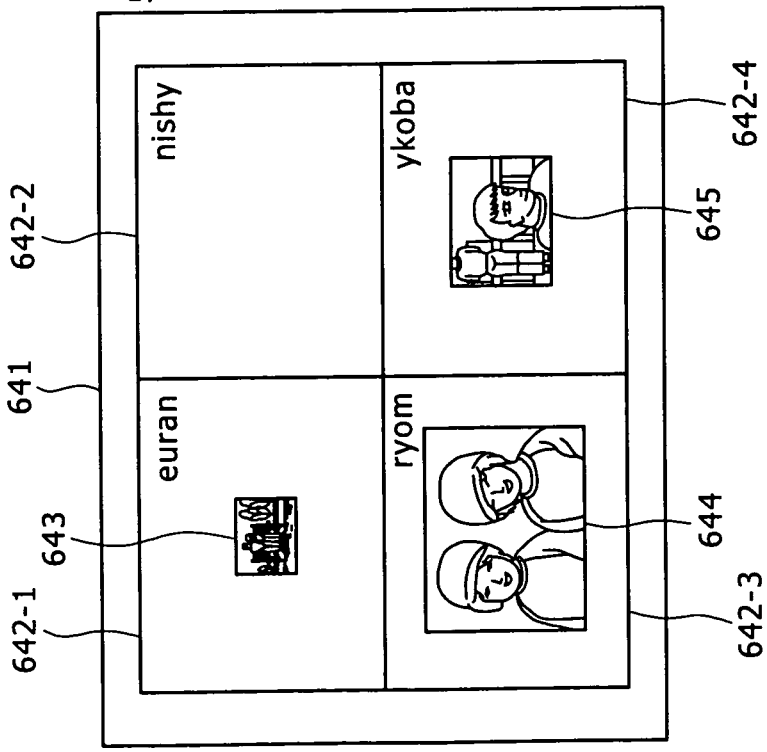
FIG. 23A
FIG. 23B

FIG.27

801
+ 20040101   + DSC00001. jpg (2004/01/01 10:01)
            + DSC00002. jpg (2004/01/01 10:10)
802     + DSC00003. jpg (2004/01/01 10:20)
+ 20050201   + DSC01001. jpg (2005/01/01 10:05)
            + DSC01002. jpg (2005/01/01 10:20)
803     + DSC01003. jpg (2005/01/01 10:28)
+ 20050102   + DSC02001. jpg (2005/01/02 10:10)
            + DSC02002. jpg (2005/01/02 10:20)
804     + DSC02003. jpg (2005/01/02 10:25)
+ 20050201   + DSC03001. jpg (2005/02/01 10:05)
            + DSC03002. jpg (2005/02/01 10:20)
            + DSC03003. jpg (2005/02/01 10:30)

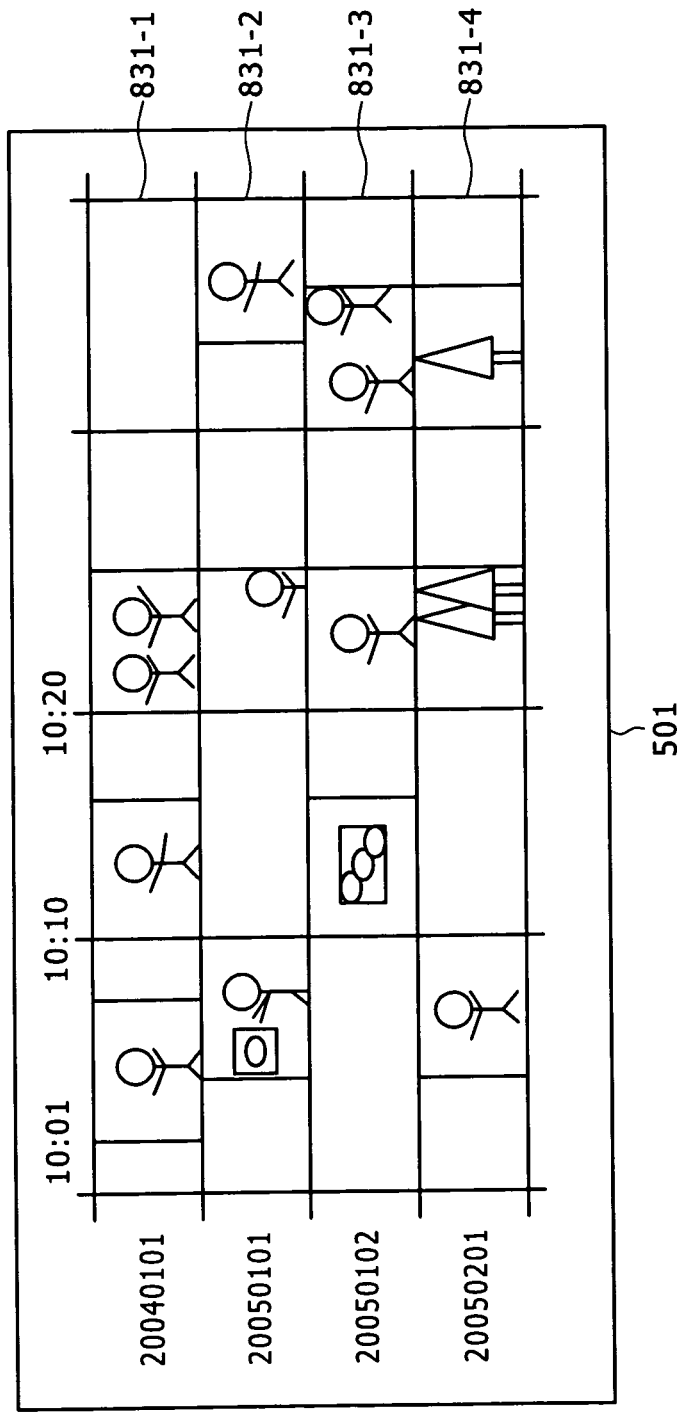

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-215903 filed with the Japanese Patent Office on Jul. 26, 2005, the entire contents of which being incorporated herein by reference.

BACKGROUND OF THE INVENTION

1. Field of the Invention

The present invention relates to an information processing apparatus, an information processing method, and a program. More particularly, the invention relates to an information processing apparatus, an information processing method, and a program for displaying pictures more effectively than before.

2. Description of the Related Art

Recent years have witnessed the widespread use of digital still cameras that take pictures (i.e., photographs) using semiconductor devices such as CCD (charge coupled devices) or CMOS (complementary metal oxide semiconductor). In many cases, picture files (i.e., picture data) acquired by such digital still cameras having taken pictures are written to information processing apparatus such as personal computers for management purposes.

The information processing apparatus allows pictures to be displayed or edited based on the picture files brought in from the digital still camera. Generally, the picture files imported from the digital camera into the information processing apparatus are written to folders that are created per photographer, per event, or by photographed date and time for storage. The user of the apparatus may get pictures displayed one after another from the picture files kept in each folder or may get a lineup of the pictures displayed for enjoyment.

In the past, some information processing apparatus allowed the pictures in recorded picture files to be sorted into predetermined categories. When a button for designating a certain category was selected, a lineup of the pictures placed under the designated category was displayed (as disclosed illustratively in Japanese Patent Laid-open No. 2005-33711). With this type of information processing apparatus, it was possible to drag and drop a desired picture onto a category-designating button so as to classify that picture into the category indicated by the button.

SUMMARY OF THE INVENTION

In the related art outlined above, the pictures in picture files brought into the information processing apparatus were displayed in sequence or by category. However, it was difficult to display the pictures in a more effective manner.

For example, a plurality of photographers using a plurality of digital still cameras may take pictures in a certain location and later export the taken pictures in picture files to a single information processing apparatus. In such a case, the information processing apparatus creates a folder for each photographer, and each created folder accommodates the picture files of the pictures taken by the photographer associated with the folder in question.

The information processing apparatus then allows a lineup of the pictures in the picture files to be displayed per folder. However, the information processing apparatus has difficulty displaying at one time a lineup of the pictures in all picture files kept in each of the folders of all photographers. Only the lineup of the pictures taken by one photographer may be displayed at any one time. That means even if some of the pictures taken by the multiple photographers are similar to one another, such similar pictures may not be displayed simultaneously.

It is possible to move the picture files from each photographer's folder into a single folder, whereby a lineup of the pictures taken by all photographers may be displayed. In this case, however, none of the pictures displayed in the lineup can be identified with the photographer who took the pictures.

The present invention has been made in view of the above circumstances and provides an information processing apparatus, an information processing method, and a program for displaying pictures in a more effective manner than before.

In carrying out the present invention and according to one embodiment thereof, there is provided an information processing apparatus including: allocation means for allocating each of a plurality of picture display areas to each of a plurality of picture groups each made up of a plurality of pictures, the picture display areas being arrayed in a first direction on a screen for displaying pictures; and display control means for displaying each of the pictures constituting each of the picture groups in screen locations which correspond to the picture display areas allocated to the picture groups and which are arrayed in a second direction different from the first direction and are determined by times associated with the pictures.

Preferably, the information processing apparatus may further include storage means for storing information representing a correction value for correcting the times associated with the pictures; wherein the display control means may cause the pictures to be displayed in the display locations determined by updated times obtained by adding the correction value to the times associated with the pictures.

According another embodiment of the present invention, there is provided an information processing method including the steps of: allocating each of a plurality of picture display areas to each of a plurality of picture groups each made up of a plurality of pictures, the picture display areas being arrayed in a first direction on a screen for displaying pictures; and displaying each of the pictures constituting each of the picture groups in screen locations which correspond to the picture display areas allocated to the picture groups and which are arrayed in a second direction different from the first direction and are determined by times associated with the pictures.

According to a further embodiment of the present invention, there is provided a program for causing a computer to execute a procedure including the steps of: allocating each of a plurality of picture display areas to each of a plurality of picture groups each made up of a plurality of pictures, the picture display areas being arrayed in a first direction on a screen for displaying pictures; and displaying each of the pictures constituting each of the picture groups in screen locations which correspond to the picture display areas allocated to the picture groups and which are arrayed in a second direction different from the first direction and are determined by times associated with the pictures.

According to the present invention, as outlined above, each of a plurality of picture display areas is allocated to each of a plurality of picture groups each made up of a plurality of pictures. The picture display areas are arrayed in a first direction on a screen for displaying pictures. Each of the pictures constituting each of the picture groups is displayed in screen locations which correspond to the picture display areas allocated to the picture groups and which are arrayed in a second direction different from the first direction and are determined by times associated with the pictures.

Meanwhile, the term "network" will be defined hereunder as a scheme under which at least two devices are interconnected in such a manner that one of them may send information to the other. The devices communicating with on another via the network may be independent devices or may be internal blocks making up a single device.

In addition, the term "communication" will be defined hereunder as exchanges of information between parties wirelessly, in wired fashion, or through the combination of the two methods. That is, communication may take place wirelessly over one segment and in wired fashion over another segment. Communication may also take place in wired fashion from a first device to a second device, and wirelessly from the second device to a third device.

The present invention thus allows pictures to be displayed in a more effective manner than before when embodied illustratively as outlined above.

BRIEF DESCRIPTION OF THE DRAWINGS

Further objects and advantages of the present invention will become apparent upon a reading of the following description and appended drawings in which:

FIG. 13 is a schematic view showing typical media lineup information;

FIG. 14 is a schematic view showing typical media detail information;

FIGS. 15A, 15B, 15C and 15D are tabular views explanatory of media detail information about the removable media registered in the media lineup information;

FIG. 19 is a schematic view showing a typical setting file;

FIG. 20 is a flowchart of steps constituting a WaiWai View displaying process;

FIGS. 23A and 23B are schematic views explanatory of a WaiWai slide show display screen;

FIG. 27 is a schematic view showing a typical sub-folder to be stored into a top folder; and FIG. 28 is a schematic view showing typical pictures displayed on the WaiWai View display screen.

DETAILED DESCRIPTION OF THE PREFERRED EMBODIMENTS

What is described below as the preferred embodiments of the present invention corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

One preferred embodiment of the present invention is an information processing apparatus including: allocation means (e.g., display area allocation device 143 in FIG. 4) configured to allocate each of a plurality of picture display areas (e.g., areas 502-1 through 502-4 in FIG. 16) to each of a plurality of picture groups each made up of a plurality of pictures, the picture display areas being arrayed in a first direction on a screen for displaying pictures; and display control means (e.g., rendering control device 145 in FIG. 4) configured to display each of the pictures constituting each of the picture groups in screen locations which correspond to the picture display areas allocated to the picture groups and which are arrayed in a second direction different from the first direction and are determined by times associated with the pictures.

Preferably, the information processing apparatus may further include storage means (e.g., offset value updating device 162 in FIG. 4) configured to store information representing a correction value for correcting the times associated with the pictures; wherein the display control means (e.g., rendering control device 145 in FIG. 4) may cause the pictures to be displayed in the display locations determined by updated times obtained by adding the correction value to the times associated with the pictures.

Other preferred embodiments of the present invention are an information processing method and a program each including the steps of: allocating (e.g., in step S65 of FIG. 20) each of a plurality of picture display areas (e.g., areas 502-1 through 502-4 in FIG. 16) to each of a plurality of picture groups each made up of a plurality of pictures, the picture display areas being arrayed in a first direction on a screen for displaying pictures; and displaying (e.g., in step S70 of FIG. 20) each of the pictures constituting each of the picture groups in screen locations which correspond to the picture display areas allocated to the picture groups and which are arrayed in a second direction different from the first direction and are determined by times associated with the pictures.

The present invention may be adapted advantageously to information processing apparatus such as personal computers.

Figure 1:
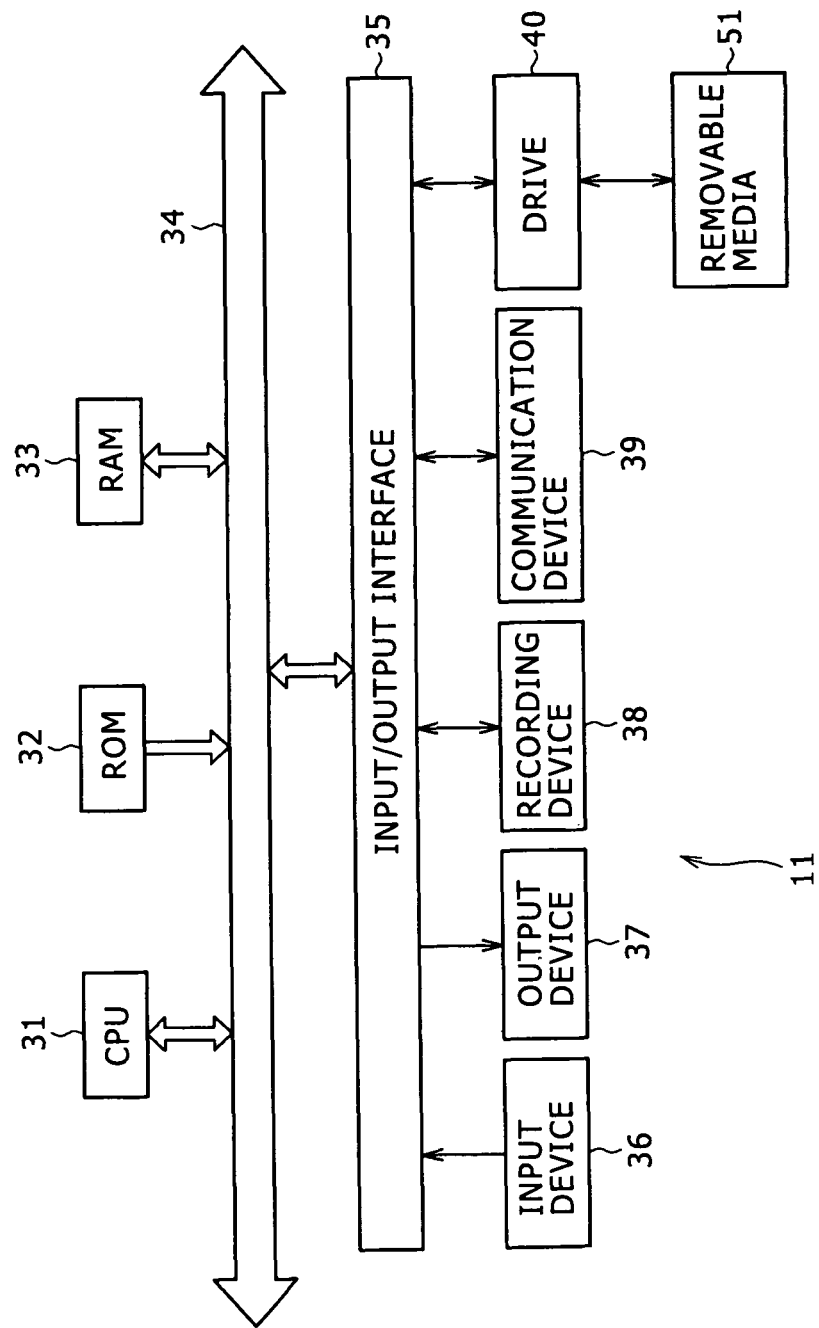
FIG. 1 is a block diagram showing a structure of an information processing apparatus embodying the present invention.

The preferred embodiments of the present invention will now be described with reference to the accompanying drawings. FIG. 1 shows a structure of a typical information processing apparatus embodying the present invention.

The information processing apparatus 11 includes a CPU (central processing unit) 31, a ROM (read only memory) 32, a RAM (random access memory) 33, an input device 36, an output device 37, a recording device 38, a communication device 39, and a drive 40.

The CPU 31 carries out diverse processes in keeping with programs held in the ROM 32 or in the recording device 38. The RAM 33 retains the programs and data being utilized by the CPU 31 during its processing. The CPU 31, ROM 32, and RAM 33 are interconnected by a bus 34.

An input/output interface 35 is also connected to the CPU 31 through the bus 34. The input/output interface 35 is connected with the input device 36 and output device 37. The input device 36 is illustratively made up of a keyboard, a mouse, and microphones. The output device 37 is illustratively formed by a display unit and speakers. The CPU 31 executes various processes in response to commands entered through the input device 36. The result of the processing is sent from the CPU 31 to the output device 37.

The recording device 38 connected to the input/output interface 35 is illustratively composed of a hard disk drive that records the programs to be performed and the data to be operated on by the CPU 31. The communication device 39 communicates with an external apparatus via a network such as the Internet or a local area network. Programs may also be acquired through the communication device 39 and recorded to the recording device 38.

The drive 40 connected to the input/output interface 35 may be loaded with removable media 51 such as a magnetic disk, an optical disk, a magneto-optical disk, or a semiconductor memory. At that point, the drive 40 drives the loaded piece of media and acquires the programs or data recorded thereon. The programs and data thus acquired are transferred as needed to the recording device 38 for recording to the latter.

Figure 2:
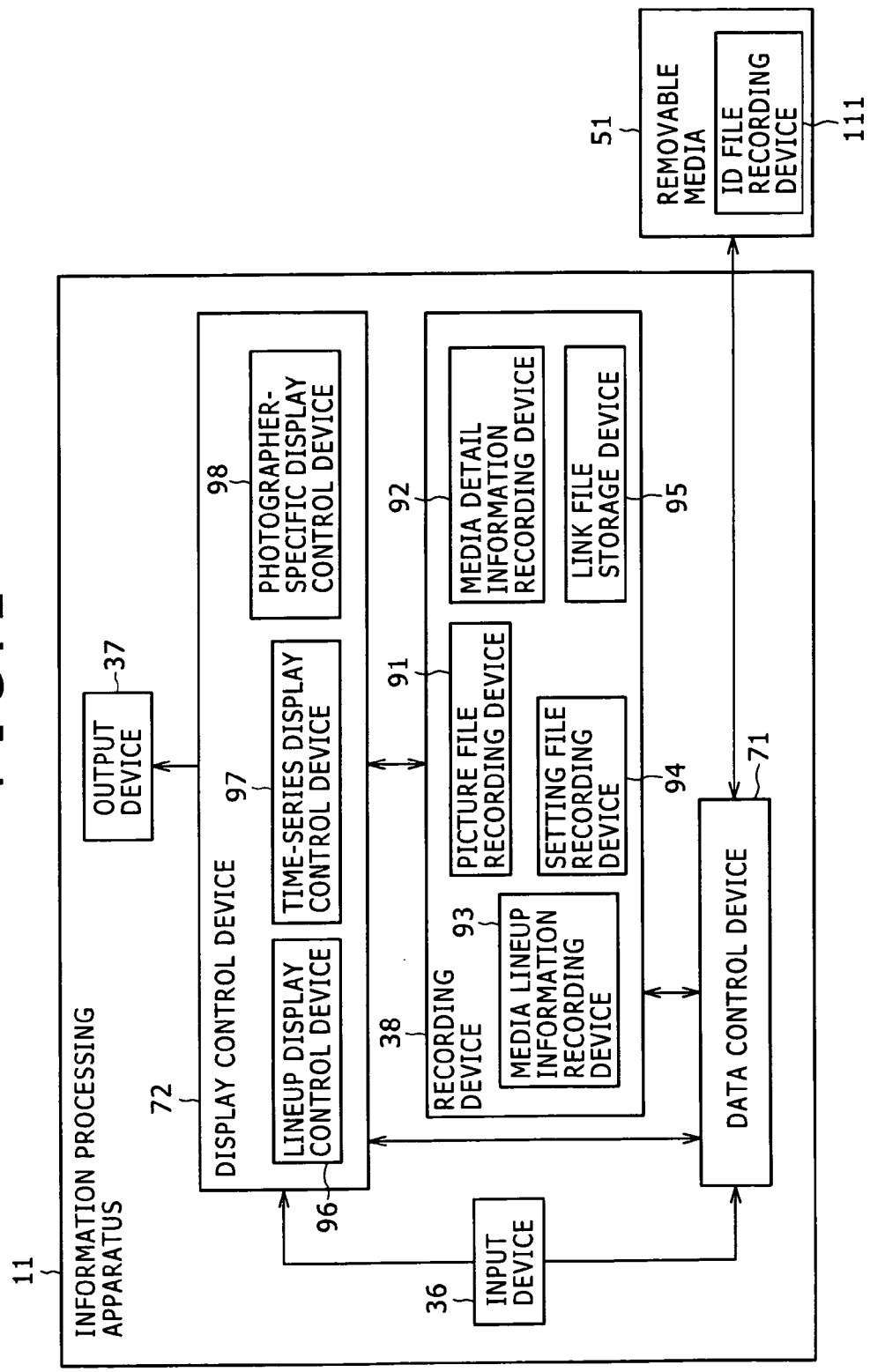
FIG. 2 is a block diagram showing a functional structure of the information processing apparatus.

FIG. 2 is a block diagram showing a functional structure of the information processing apparatus 11 indicated in FIG. 1. The information processing apparatus 11 is shown to include the input device 36, the output device 37, the recording device 38, a data control device 71, and a display control device 72. Of the reference numerals in FIG. 2, those already used in FIG. 1 designate like or corresponding parts, and their descriptions will be omitted where redundant.

The recording device 38 records various kinds of data and supplies the recorded data to the data control device 71 or display control device 72. The recording device 38 further records the data supplied from the data control device 71 or display control device 72.

The recording device 38 is constituted by a picture file recording device 91, a media detail information recording device 92, a media lineup information recording device 93, a setting file recording device 94, and a link file storage device 95.

The picture file recording device 91 in the recording device 38 records picture files (i.e., picture data) supplied from the removable media 51 through the data control device 71. Illustratively, the picture files fed from the removable media 51 may be picture files representing the pictures taken by imaging devices such as digital still cameras or camera-equipped mobile phones. The picture files each include information about the photographed date and time (i.e., picture-taken time) of the picture in question (the information may also be referred to as additional information).

Suppose that the recording device 38 is supplied with picture files from the data control device 71. In that case, under control of the data control device 71, the recording device 38 creates a folder (also called a top folder) with its name derived from an event name that is input by the user operating the input device 36. The recording device 38 further creates a folder (also called a sub-folder) with its name derived from a photographer name that is input by the user operating the input device 36. The recording device 38 proceeds to place the created sub-folder into the top folder and store the two folders.

The picture file recording device 91 in the recording device 38 stores into a created sub-folder the picture files supplied from the data control device 71. If there already exists a top folder with its name derived from a previously input event name, then the recording device 38 creates a sub-folder with its name taken from the photographer name and places the sub-folder thus created into the existing top folder. It follows that the top folder accommodates one or a plurality of sub-folders. In the ensuing description, one or a plurality of picture files (i.e., pictures) held in a single sub-folder will be called a picture group.

The media detail information recording device 92 in the recording device 38 records media detail information including information representing the names of the picture files imported from the removable media 51 into the picture file recording device 91 or the names of the picture files exported from the picture file recording device 91 to the removable media 51, as well as file sizes (i.e., picture file sizes). The media detail information recording device 92 updates the recorded media detail information under control of the data control device 71.

The media lineup information recording device 93 records media lineup information representing a lineup of information about a plurality of removable media 51. More specifically, the media lineup information recording device 93 records as the media lineup information such information as IDs (identification) for identifying each piece of removable media 51 and photographer names (i.e., user names) associated with each piece of removable media 51. Under control of the data control device 71, the media lineup information recording device 93 updates the recorded media lineup information.

The setting file recording device 94 records a setting file that contains information about relative photographed dates and times (picture-taken dates and times) for the pictures in the picture files recorded in the picture file recording device 91. Illustratively, the setting file may store offset values each serving as the value for correcting the photographed dates and times regarding the pictures in the picture files held in a sub-folder (i.e., pictures in a picture group). An offset value is defined as the difference in time between the photographed date and time of each picture file containing a picture on the one hand, and the date and time for that file modified by the user operating the input device 36 (i.e., this is a display time, to be discussed later) on the other hand. The setting file recording device 94 updates the recorded setting file under control of the display control device 72.

The link file storage device 95 temporarily holds link files which is supplied from the display control device 72 and linked to the picture files recorded in the picture file recording device 91.

When a piece of removable media 51 is loaded into the information processing apparatus 11, the data control device 71 detects the loaded removable media 51. If the information about the detected removable media 51 (i.e., ID for identifying the removable media 51) is not found in the media lineup information in the media lineup information recording device 93, then the data control device 71 creates an ID file that includes the ID for identifying the detected removable media 51. The data control device 71 proceeds to send the created ID file to the removable media 51 for storage thereto and cause the control device 38 to update the media lineup information in such a manner that the ID for identifying the removable media 51 will be included in the media lineup information. Each piece of removable media 51 is furnished with an ID file recording device 111 that records the ID file supplied by the data control device 71.

When the input device 36 is operated by the user to designate a picture file to be imported, the input device 36 supplies the data control device 71 with an input signal reflecting the user's operation. In turn, the data control device 71 acquires from the removable media 51 the picture file designated by the input signal and supplies the acquired picture file to the recording device 38. If the export of a picture file is designated by the display control device 72, the data control device 71 acquires from the recording device 38 the picture file designated to be exported and sends the acquired picture file to the removable media 51 for recording thereto.

When an input signal is supplied from the input device 36 in response to the user's operation or when a command is given from the data control device 71, the display control device 72 may acquire a predetermined picture file from the recording device 38. The acquired picture file is supplied to the output device 37 which in turn displays the picture of the supplied file on its screen.

The display control device 72 includes a lineup display control device 96, a time-series display control device 97, and a photographer-specific display control device 98. The lineup display control device 96, time-series display control device 97, and photographer-specific display control device 98 are capable of exchanging data (i.e., signals) therebetween.

The lineup display control device 96 in the display control device 72 acquires picture files and a setting file from the recording device 38. The lineup display control device 96 then causes the output device 37 to display a lineup of pictures based on the acquired picture files and setting file.

The time-series display control device 97 in the display control device 72 creates link files linked to the picture files recorded in the picture file recording device 91, and supplies the created link files to the link file storage device 95 in the recording device 38 for storage. The time-series display control device 97 further acquires the picture files linked to the link files stored in the link file storage device 95 and, based on the acquired picture files, causes the output device 37 to display pictures one by one.

The photographer-specific display control device 98 in the display control device 72 acquires picture files from the recording device 38 and, based on the acquired picture files, causes the output device 37 to display in sequence the pictures taken by photographers (using their imaging devices) in picture display areas each allocated to a single photographer.

Figure 3:
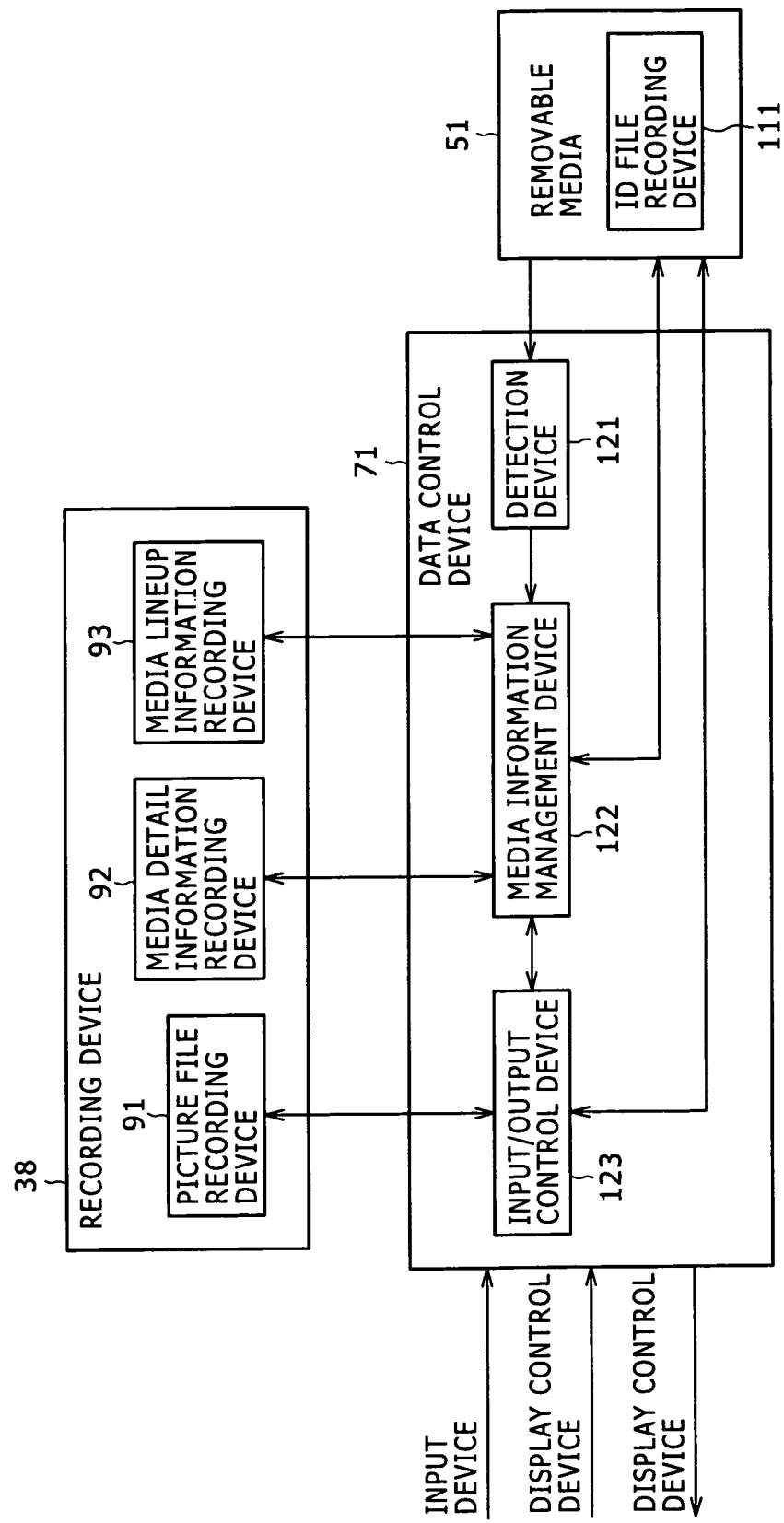
FIG. 3 is a block diagram showing a detailed structure of a data control device.

FIG. 3 is a block diagram showing a detailed structure of the data control device 71. Specifically, the data control device 71 includes a detection device 121, a media information management device 122, and an input/output control device 123.

When a piece of removable media 51 is loaded into the information processing apparatus 11, the detection device 121 detects the loaded removable media 51. At this point, the detection device 121 generates a signal indicating the detection of removable media 51, and sends the generated signal to the media information management device 122.

Given the signal indicating the detection of removable media 51 from the detection device 151, the media information management device 122 reads an ID file from the loaded removable media 51. The media information management device 122 then checks to determine whether or not information about the removable media 51 identified by the ID found in the retrieved ID file is recorded in the media lineup information held in the media lineup information recording media 93. If the information about the removable media 51 is not found in the media lineup information, the media information management device 122 causes the recording media 38 to update the media lineup information based on the ID file retrieved from the removable media 51 being loaded.

If the ID file is not recorded on the removable media 51, the media information management device 122 creates an ID file and sends the created ID file to the removable media 51 for recording thereto. The media information management device 122 further acquires the media detail information or media lineup information from the recording device 38 and supplies the acquired media detail information or media lineup information to the input/output control device 123.

The input/output control device 123 may import (i.e., acquire) picture files from the removable media 51 and record the imported picture files to the picture file recording device 91. Alternatively, the input/output control device 123 may acquire picture files from the picture file recording device 91 and send the acquired picture files to the removable media 51 for recording thereto. In such cases, the media information management device 122 causes the recording device 38 to update the media detail information under instructions from the input/output control device 123.

When the input device 36 is operated by the user to designate a picture file to be imported, the input device 36 supplies the data control device 71 with an input signal reflecting the user's operation. In turn, the input/output control device 123 acquires from the removable media 51 the picture file designated by the input signal in reference to the media detail information and media lineup information fed from the media information management device 122. The input/output control device 123 proceeds to send the acquired picture file to the picture file recording device 91. If the export of a picture file is designated by the display control device 72, the input/output control device 123 acquires from the picture file recording device 91 the picture file designated to be exported and sends the acquired picture file to the removable media 51 for recording thereto.

Figure 4:
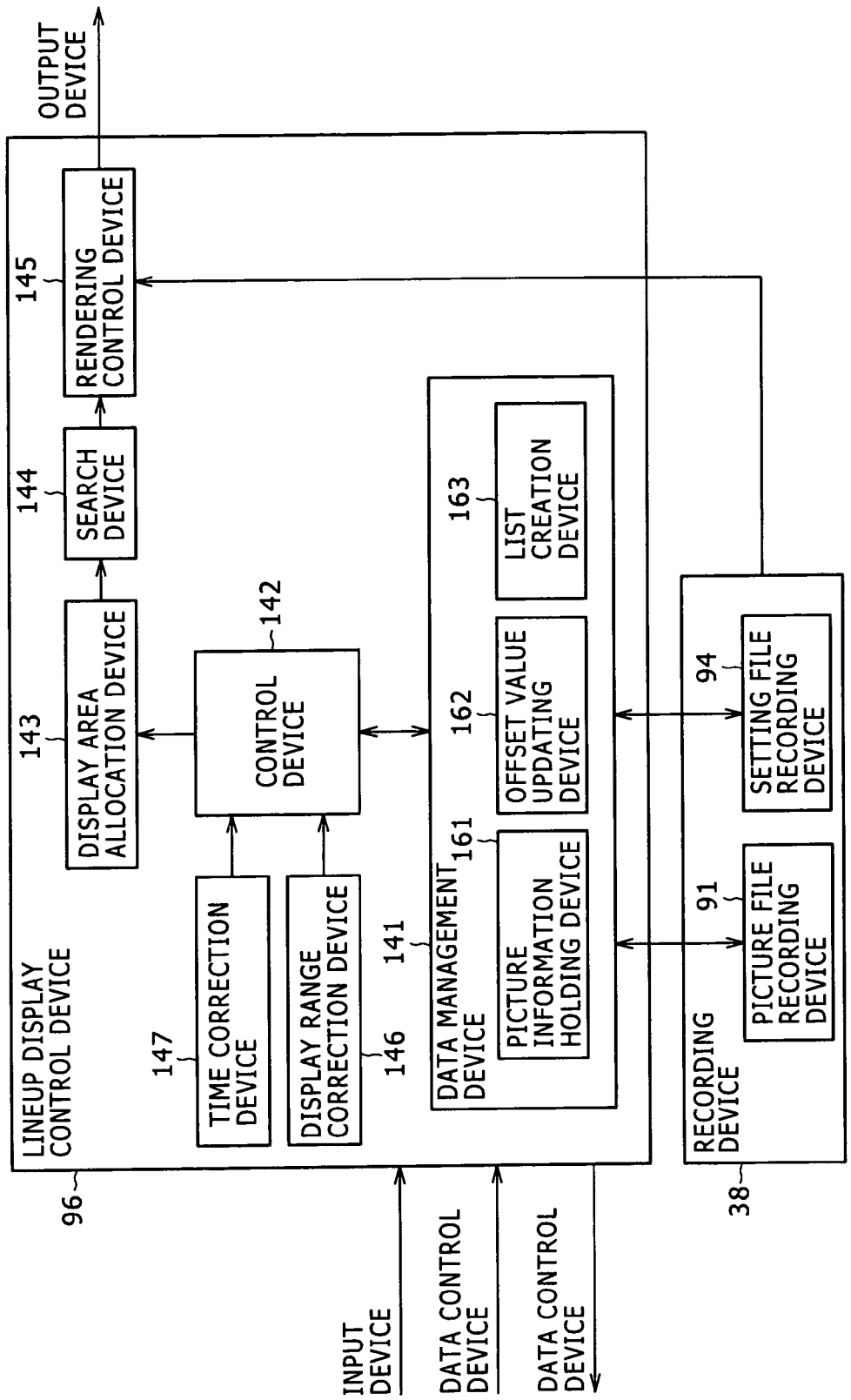
FIG. 4 is a block diagram showing a detailed structure of a lineup display control device.

FIG. 4 is a block diagram showing a detailed structure of the lineup display control device 96. The lineup display control device 96 is specifically made up of a data management device 141, a control device 142, a display area allocation device 143, a search device 144, a rendering control device 145, a display range correction device 146, and a time correction device 147.

The data management device 141 manages information about picture files. The data management device 141 is structured to include a picture information holding device 161, an offset value updating device 162, and a list creation device 163.

The picture information holding device 161 in the data management device 141 acquires a picture file from the picture file recording device 91 and, based on the acquired picture file, creates picture information composed of a file name of the picture file, a path to the picture file, and additional information about the picture file. The picture information thus created is retained in the picture information holding device 161.

The offset value updating device 162 in the data management device 141 acquires a setting file from the setting file recording device 94. On the basis of the acquired setting file, the offset value updating device 162 determines an offset value for each picture group. Illustratively, the offset value updating device 162 may take the offset value for picture files from a given sub-folder and establish that value as the offset value for the picture group composed of the pictures in the picture files kept in the sub-folder in question; the offset value updating device 162 retains such offset values temporarily.

When supplied with information for identifying a picture group and information indicative of an offset value change from the time correction device 147 via the control device 142, the offset value updating device 162 updates the offset value for the picture group identified by the supplied picture group identification information in a manner reflecting the supplied offset value change. The offset value updating device 162 further causes the recording device 38 to update the setting file in the setting file recording device 94 on the basis of the offset value being stored.

The list creation device 163 in the data management device 141 creates a display picture list, i.e., a list of pictures from the picture group desired to be displayed on the basis of the picture information held by the picture information holding device 161. Illustratively, the display picture list of a given picture group includes paths to the picture files of the pictures contained in the picture group, and information indicative of the photographed dates and times for these pictures.

The data management device 141 supplies the control device 142 with that display picture list of a picture group which is created by the list creation device 163 and with that offset value for the picture group which is stored in the offset value updating device 162. Based on the offset value kept in the offset value updating device 162, the data management device 141 further corrects (i.e., rewrites) the additional information about the picture file recorded in the picture file recording device 91 and causes the recording device 38 to record the picture file with the corrected additional information to the picture file recording device 91 independently of the original picture file.

The control device 142 supplies the display area allocation device 143 with the display picture list and offset value sent from the data management device 141. The control device 142 further supplies the data management device 141 with the information for identifying the picture group and with the information indicative of the offset value change sent from the time correction device 147.

Furthermore, if desired, the control device 142 creates display range information representing a time range for pictures to be displayed in (i.e., display time range, to be discussed later) on the basis of display range change information fed from the display range correction device 146. The display range information thus created is sent to the display area allocation device 143. The display range change information is defined as information indicating a change in the time range designated by the display range information.

The display area allocation device 143 allocates picture display areas to picture groups (i.e., photographers) on a one-on-one basis in reference to the picture information held in the picture information holding device 161 as part of the data management device 141, thereby creating allocation information indicative of the display area allocated to each picture group. The display area allocation device 143 then supplies the search device 144 with the created allocation information together with the display picture list, offset value, and display range information sent from the control device 142.

Given the display picture list, offset value, display range information, and allocation information from the display area allocation device 143, the search device 144 searches for the pictures to be displayed. With the pictures detected as a result of the search, the search device 144 informs the rendering control device 145 of the pictures to be displayed and the display locations in which to display the pictures in question.

The rendering control device 145 acquires from the recording device 38 the picture files of the pictures designated by the search device 144, feeds the acquired picture files to the output device 37, and causes the output device 37 to display (on its screen) the pictures in the display locations designated by the search device 144.

When the input device 36 is operated by the user to designate a change in the time range for the pictures to be displayed in, the input device 36 issues an input signal reflecting the user's operation to the display range correction device 146. Accordingly, the display range correction device 146 generates display range change information and supplies the generated information to the control device 142.

When the input device 36 is operated by the user to designate a change in the offset value (display time, to be discussed later) for the picture being displayed, the input device 36 issues an input signal reflecting the user's operation to the time correction device 147. Accordingly, the time correction device 147 creates information for identifying a picture group that contains the picture for which the change has been designated, as well as information indicative of the offset value change. The items of information thus created are forwarded to the data management device 141 via the control device 142.

Figure 5:
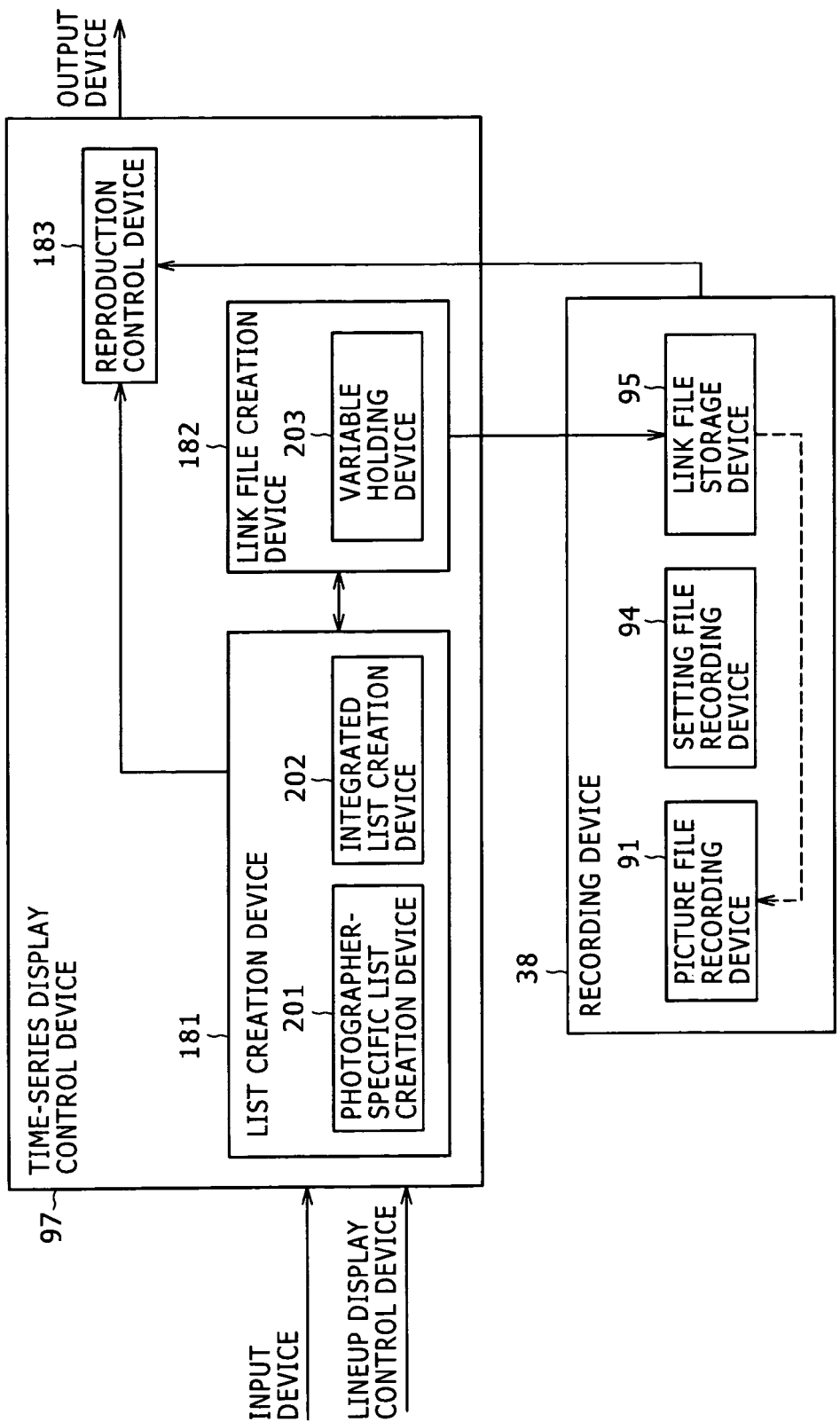
FIG. 5 is a block diagram showing a detailed structure of a time-series display control device.

FIG. 5 is a block diagram showing a detailed structure of the time-series display control device 97. The time-series display control device 97 is specifically constituted by a list creation device 181, a link file creation device 182, and a reproduction control device 183.

The list creation device 181 acquires picture information and an offset value from the lineup display control device 96 in order to create a display picture list, i.e., a list of the pictures to be displayed. The list creation device 181 has a photographer-specific list creation device 201 and an integrated list creation device 202.

The photographer-specific list creation device 201 in the list creation device 181 creates display picture lists for picture groups on a one-on-one basis in accordance with picture information and offset values. Illustratively, the photographer-specific list creation device 201 creates a display picture list for each picture group in such a manner that the created list is constituted by paths to the picture files of the pictures included in a single picture group and by the display times of these pictures. A display time is defined as the time obtained by adding the time indicated by an offset value to the time representative of the photographed date and time of a picture in a picture file.

The integrated list creation device 202 in the list creation device 181 creates a single display picture list by integrating display picture lists each covering a plurality of picture groups following list creation by the photographer-specific list creation device 201. When the link file creation device 182 creates link files linked to the picture files of pictures included in a display picture list and places the link files thus created into a work folder, the list creation device 181 notifies the reproduction control device 183 of the work folder created by the link file creation device 182 as the folder that contains the link files being linked to the pictures to be displayed.

In reference to the display image list created by the list creation device 181, the link file creation device 182 creates link files linked to the picture files of pictures included in the created display picture list. The link file creation device 182 has a variable holding device 203.

The variable holding device 203 in the link file creation device 182 retains a variable that serves as the file name of a link file. Every time the link file creation device 182 creates a link file, the variable holding device 203 increments the retained variable by one.

The link file creation device 182 creates a work folder and sends the created folder to the link file storage device 95 for storage. Using the variable held by the variable holding device 203 as a link file name, the link file creation device 182 creates a link file linked to the picture file of each picture contained in the display picture list generated by the integrated list creation device 202. The link files thus created are supplied to the link file storage device 95 whereby the link files are placed into the work folder for storage.

When display of the pictures from the display picture list has ended, the link file creation device 182 causes the recording device 38 to delete the work folder from the link file storage device 95 along with the link files placed in the work folder.

The reproduction control device 183 retrieves that link file in the work folder which is designated by the link creation device 181 from the link file storage device 95 as part of the recording device 38. The link file creation device 182 proceeds to acquire the picture file linked to the retrieved link file from the picture file recording device 91 and cause the output device 37 to display the picture based on the picture file thus acquired.

Figure 6:
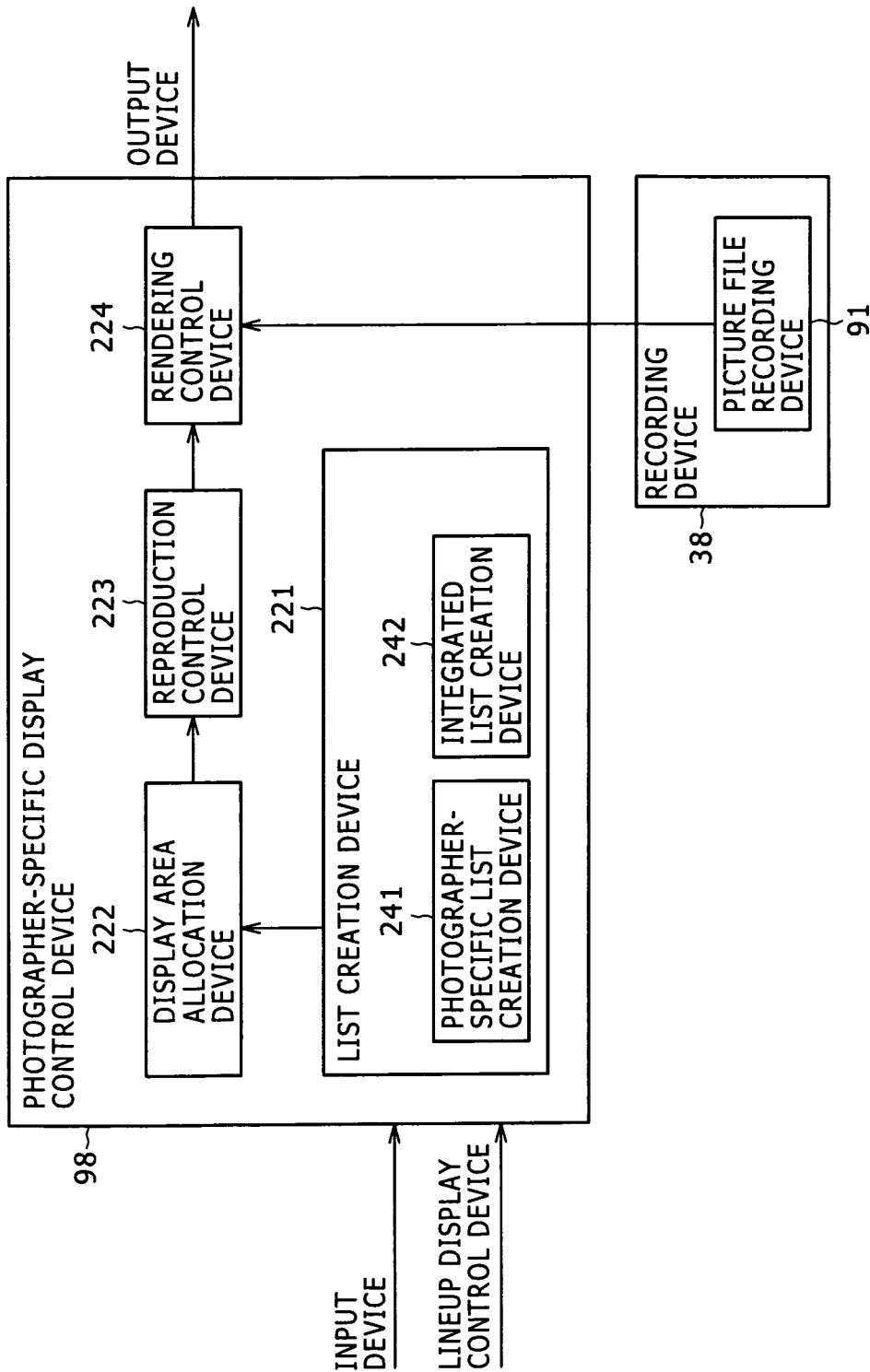
FIG. 6 is a block diagram showing a detailed structure of a photographer-specific display control device.

FIG. 6 is a block diagram showing a detailed structure of the photographer-specific display control device 98. The photographer-specific display control device 98 is specifically constituted by a list creation device 221, a display area allocation device 222, a reproduction control device 223, and a rendering control device 224.

The list creation device 221 acquires picture information and an offset value from the lineup display control device 96 so as to create a display picture list, i.e., a list of the pictures to be displayed. The list creation device 221 has a photographer-specific list creation device 241 and an integrated list creation device 242.

The photographer-specific list creation device 241 as part of the list creation device 221 creates display picture lists for picture groups on a one-on-one basis in accordance with picture information and offset values. Illustratively, the photographer-specific list creation device 241 creates a display picture list for each picture group in such a manner that the created list is constituted by paths to the picture files of the pictures included in a single picture group, by the display times of these pictures, and by a group number identifying the picture group in question. A display time is defined as the time obtained by adding the time indicated by an offset value to the time representative of the photographed date and time of a picture in a picture file.

The integrated list creation device 242 in the list creation device 221 creates a single display picture list by integrating display picture lists each covering a plurality of picture groups following list creation by the photographer-specific list creation device 241. The list creation device 221 supplies the display area allocation device 222 with the display picture list created by the integrated list creation device 242.

In accordance with the picture group number included in the display picture list sent from the list creation device 221, the display area allocation device 222 allocates picture display areas to picture groups (photographers) on a one-on-one basis, thereby creating allocation information indicative of the display area allocated to each picture group. The display area allocation device 222 then supplies the display picture list and allocation information to the reproduction control device 223.

Given the display picture list and allocation information from the display area allocation device 222, the reproduction control device 223 informs the rendering control device 224 of the picture to be displayed and the display location in which to display the picture in question.

The rendering control device 224 acquires the picture file of the picture designated by the reproduction control device 223 from the picture file recording device 91 and supplies the acquired picture file to the display device 37. The rendering control device 224 then causes the output device 37 to display (on its screen) the picture in the display location designated by the reproduction control device 223.

When a piece of removable media 51 is loaded into the above-described information processing apparatus 11, the data control device 71 detects the loaded removable media 51 and instructs the display control device 72 to display an input/output screen through which to import picture files. Given the instruction to display the input/output screen from the data control device 71, the display control device 72 acquires from the recording device 38 the picture file (picture data) for displaying the input/output screen. The display control device 72 feeds the acquired picture file to the output device 37 and causes the device 37 to display the input/output screen accordingly. Illustratively, the output device 37 displays the input/output screen such as one indicated in FIG. 7.

On the left-hand side of the input/output screen 301 are buttons 311 through 313 that are used to import picture files recorded on the removable media 51.

The button 311 indicates the text "Copy all files (for group use)." Selecting the button 311 displays a dialog that allows all picture files recorded on the loaded removable media 51 to be imported (for storage into the recording device 38). By operating the input device 36, the user may select the button 311 to display the dialog and enter a photographer name and an event name into suitable fields of the dialog. This causes all picture files recorded on the removable media 51 to be imported into the information processing apparatus 11 for storage.

When the photographer name and event name are input to the dialog displayed following selection of the button 311, the data control device 71 creates a top folder with its name derived from the input event name in accordance with the input signal supplied from the input device 36 reflecting the user's operation. The data control device 71 further creates a sub-folder with its name derived from the input photographer name, stores the sub-folder into the top folder, and sends the top folder and sub-folder to the recording device 38 for storage. The data control device 71 acquires all picture files from the removable media 51 and supplies the acquired files to the recording device 38 in such a manner that the supplied picture files are stored into the sub-folder named after the input photographer name.

The button 312 indicates the text "Copy part of the files (for group use)." Selecting the button 312 displays a dialog that allows part of the picture files recorded on the loaded removable media 51 to be imported (for storage into the recording device 38). By operating the input device 36, the user may select the button 312 to display the dialog, enter a photographer name and an event name into suitable fields of the dialog, and select the picture files to be imported. This causes the selected picture files recorded on the removable media 51 to be imported into the information processing apparatus 11 for storage.

The button 313 indicates the text "Copy files to the date folder (for personal use)." Selecting the button 313 displays a dialog that allows part of the picture files recorded on the loaded removable media 51 to be imported (for storage into the recording device 38). By operating the input device 36, the user may select the button 313 to display the dialog, enter a photographer name and an event name into suitable fields of the dialog, and select the picture files to be imported. This causes the selected picture files recorded on the removable media 51 to be imported into the information processing apparatus 11 for storage. In this case, of the picture files recorded on the loaded removable media 51, those with their photographed dates matching a user-input photographed date are selected and imported from the media 51 into the information processing apparatus 11 for storage.

On the right-hand side of the input/output screen 301 are buttons 314 through 317. The button 314 indicates the text "Export specifically designated files." Selecting the button 314 displays a dialog that allows picture files stored in the information processing apparatus 11 to be exported (i.e., recorded) selectively to the removable media 51. By operating the input device 36, the user may select the button 314 to display the dialog and designate desired picture files and removable media 51 in suitable fields of the dialog. This causes the designated picture files to be recorded to the designated removable media 51.

The button 315 indicates the text "Export thumbnails." Selecting the button 315 displays a dialog that allows thumbnails of the picture files stored in the information processing apparatus 11 to be exported (i.e., recorded) to the removable media 51. By operating the input device 36, the user may select the button 315 to display the dialog and designate the picture files for thumbnail display. This causes the designated picture files for thumbnail display to be recorded to the removable media 51.

The button 316 indicates the text "Update media information." Selecting the button 316 displays a dialog that permits updating (i.e., changing) of information about the removable media 51 recorded as the media lineup information. By operating the input device 36, the user may select the button 316 to display the dialog and enter an ID for identifying the removable media 51 of interest, a photographer name (a user name) associated with the identified removable media 51, and other relevant items into suitable fields of the dialog. This causes the information about the removable media 51 to be updated in the media lineup information recorded in the recording device 38.

The button 317 shows the word "Cancel." Selecting the button 317 closes the input/output screen 301.

Suppose that the user selects the button 312 by operating the input device 36. In this case, the input device 36 sends to the display control device 72 an input signal indicating that the button 312 has been selected. Given the input signal indicative of selection of the button 312, the display control device 72 causes the recording device 38 to display a dialog through which to import part of the picture files recorded on the removable media 51. More specifically, the display control device 72 acquires a picture file for displaying the dialog from the recording device 38, supplies the acquired picture file to the output device 37, and causes the output device 37 to display the dialog based on the supplied file. Illustratively, the output device 37 displays the dialog such as one indicated in FIG. 8.

Figure 8:
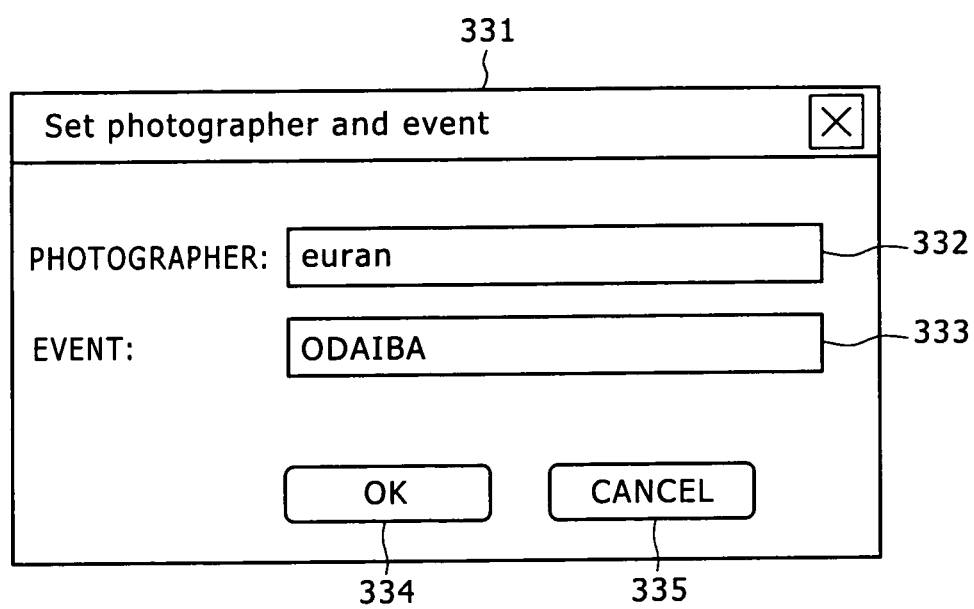
FIG. 8 is a schematic view explanatory of a dialog for importing part of the picture files recorded on removable media.

As shown in FIG. 8, the dialog 331 has a field 332 in which to enter a photographer name and a field 333 in which to enter an event name. At the bottom of the dialog 331 are buttons 334 and 335. To the left of the field 332 is the indication "Photographer." The user may enter a desired photographer name into the field 332 by operating the input device 36. In FIG. 8, the photographer name "euran" is shown to be entered by the user in the field 332. If the information about the removable media 51 currently loaded in the information processing apparatus 11 is already included in the media lineup information recorded in the recording device 38, then the display control device 72 causes the photographer name associated with the ID identifying the removable media 51 to be displayed in the field 332 in advance.

To the left of the field 333 is the indication "Event." The user may input a desired event name to the field 333 by operating the input device 36. In FIG. 8, the event name "ODAIBA" is shown to be entered by the user in the field 333. The button 334 shows the letters "OK." After the photographer name is entered into the field 332 and the event name into the field 333, selecting the button 334 closes the dialog 331 and displays another dialog through which to select new files to be imported. The button 335 shows the indication "Cancel." The dialog 331 is closed if the user selects the button 335 by operating the input device 36.

By operating the input device 36, the user may input a photographer name to the field 332 and an event name to the field 333 and select the button 334. This causes the display control device 72 to acquire from the recording device 38 the picture file (picture data) for displaying the dialog through which to select the picture files to be imported. The acquired picture file is supplied to the output device 37 which in turn is caused to display the dialog such as one indicated in FIG. 9.

Figure 9:
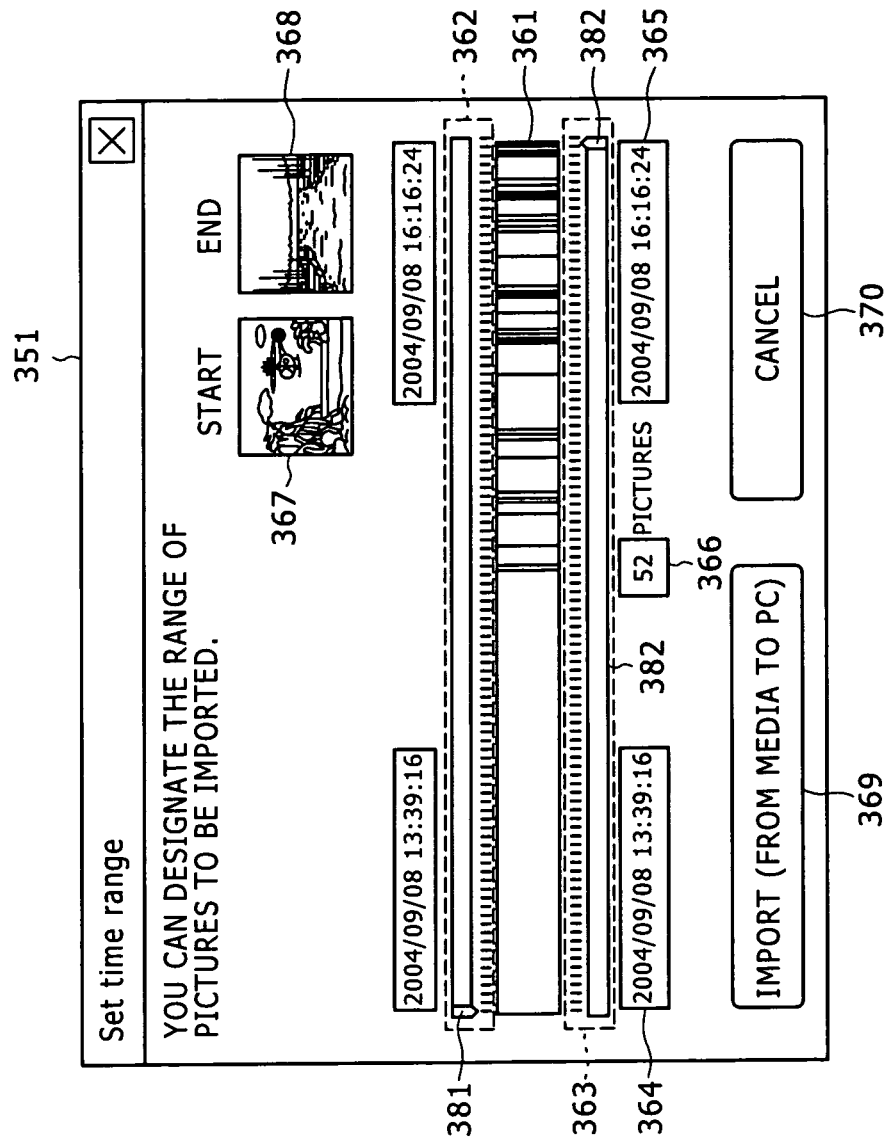
FIG. 9 is a schematic view explanatory of a dialog for selecting the picture files to be imported.

In the middle of the dialog 351 in FIG. 9 is a field 361 that visually indicates the picture files recorded on the removable media 51. In the field 361, each vertical line represents a single picture file recorded on the removable media 51. The vertical lines in the field 361 are arranged from left to right to represent the pictures in the picture files in chronological order of their photographed dates and times.

That is, for example, the leftmost vertical line in the field 361 represents the picture file of the oldest picture (relative to the present time) recorded on the removable media 51; the rightmost vertical line denotes the picture file of the most recent picture found on the removable media 51.

Above the field 361 in FIG. 9 is a slider bar 362. The user may move a button 381 along the slider bar 362 by operating the input device 36. Moving the button 381 along the slide bar 362 permits selection of the oldest of the pictures in picture files to be imported from the removable media 51.

The position of the button 381 on the slider bar 362 approximately corresponds to the time represented by the photographed date and time of each of the vertical lines in the corresponding position inside the field 361. More specifically, with the button 381 placed in the leftmost position, the oldest of the pictures in picture files recorded the removable media 51 is selected as the oldest picture to be imported; with the button 381 in the rightmost position, the most recent of the pictures in picture files recorded the removable media 51 is selected as the oldest picture to be imported.

Likewise, below the field 361 in FIG. 9 is a slider bar 363. The user may move a button 382 along the slider bar 363 by operating the input device 36. Moving the button 382 along the slide bar 363 permits selection of the most recent of the pictures in picture files to be imported from the removable media 51.

The position of the button 382 on the slider bar 363 approximately corresponds to the time represented by the photographed date and time of each of the vertical lines in the corresponding position inside the field 361. With the button 382 placed in the leftmost position, the oldest of the pictures in picture files recorded on the removable media 51 is selected as the most recent picture to be imported; with the button 382 in the rightmost position, the most recent of the pictures in picture files recorded on the removable media 51 is selected as the most recent picture to be imported.

In other words, the picture files of pictures photographed between the time indicated by the button 381 and the time denoted by the button 382 will be imported from the removable media 51 to the information processing apparatus 11. In FIG. 9, for example, the button 381 is set in the leftmost position on the slider bar 362 and the button 382 in the rightmost position on the slider bar 363. That means all picture files recorded on the removable media 51 are to be imported to the information processing apparatus 11.

A field 364 in the dialog 351 shows the time represented by the position of the button 381, and a field 365 indicates the time denoted by the position of the button 382. In FIG. 9, for example, the field 364 shows "2004/09/08 13:39:16" signifying the time of day "13:39:16, September 8, 2004" represented by the position of the button 381; the field 365 shows "2004/09/08 16:16:24" signifying the time of day "16:16:24, September 8, 2004" denoted by the position of the button 382.

A field 366 indicates the number of pictures in picture files to be imported from the removable media 51. This number is determined as the number of vertical lines in the field 361 between two positions corresponding to the buttons 381 and 382 along the slider bars 362 and 363 respectively, the button positions being selected by the user operating the input device 36. In FIG. 9, the field 366 shows letters "52" signifying that 52 pictures are imported in picture files from the removable media 51.

Areas 367 and 368 in the upper part of the dialog 351 display a picture each. The area 367 displays the oldest of the pictures in picture files to be imported from the removable media 51; the area 368 indicates the most recent of the pictures in picture files to be imported from the removable media 51.

At the bottom of the dialog 351 are buttons 369 and 370. The button 369 shows the text "Import (from media to PC)," and the button 370 gives the indication "Cancel."

By operating the input device 36, the user may select the picture files to be imported from the removable media 51 to the information processing apparatus 11, before selecting the button 369. This causes the user-selected picture files to be imported from the removable media 51 to the information processing apparatus 11 for storage. If the button 370 is selected, no picture files are imported and the dialog 351 is closed.

When the information processing apparatus 11 starts importing picture files from the removable media 51 following selection of the button 369, the display control device 72 closes the dialog 351, acquires a picture file (picture data) representative of another dialog from the recording device 38, and sends the acquired file to the output device 37. In turn, the output device 37 displays the dialog such as one shown in FIG. 10.

Figure 10:
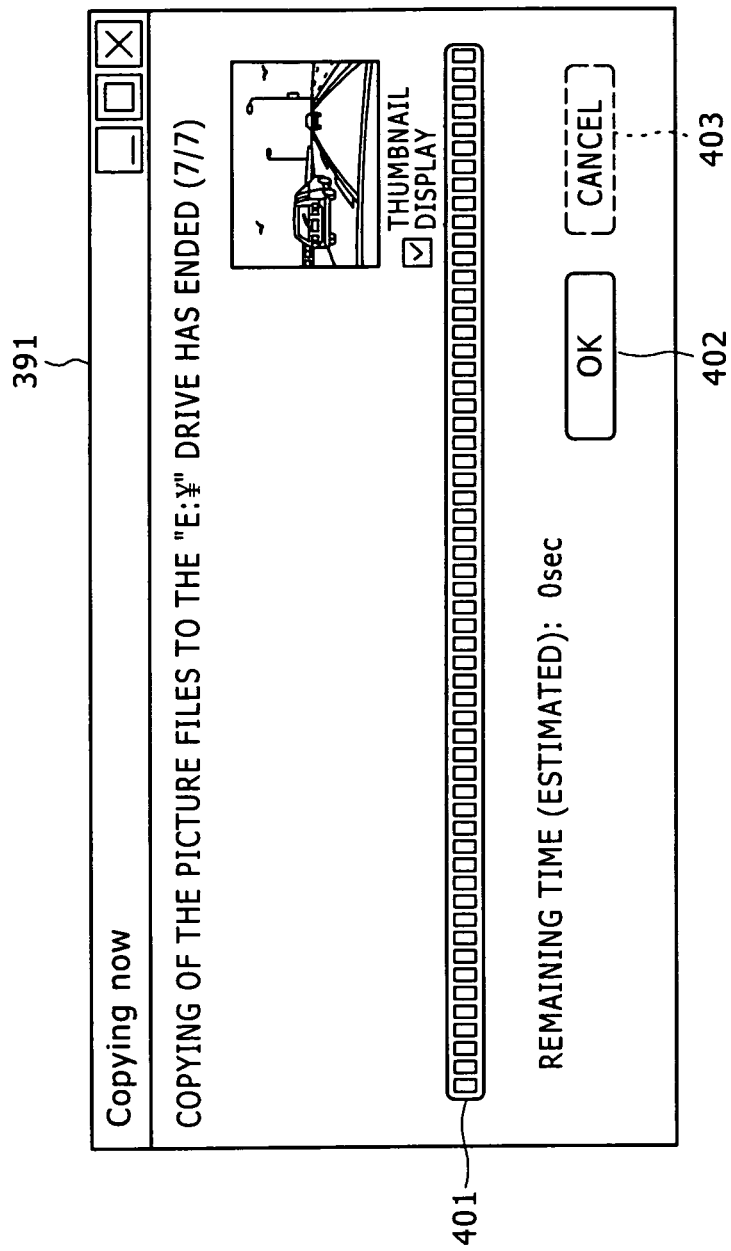
FIG. 10 is a schematic view showing a dialog indicating picture import status.

In FIG. 10, the dialog 391 shows an indicator 401 indicating the status (i.e., progress) of picture files being imported from the removable media 51. At the bottom of the dialog 391 are buttons 402 and 403. The button 402 shows letters "OK" and the button 403 gives the indication "Cancel."

Illustratively, while the import of picture files from the removable media 51 (i.e., recording to the recording device 38) has yet to be completed, the button 402 is displayed at a lower level of brightness than the button 403 so that the button 402 may not be selected by the user operating the input device 36. If in this state the button 403 is selected by the user operating the input device 36, then the dialog 391 is closed and the import of the picture files from the removable media 51 is stopped.

Conversely, when the import (recording to the recording device 38) of picture files from the removable media 51 has been completed, the button 403 is displayed at a lower level of brightness than the button 402 so that the button 403 may not be selected by the user operating the input device 36. When the button 402 is selected in this state by the user operating the input device 36, the dialog 391 is closed.

Figure 11:
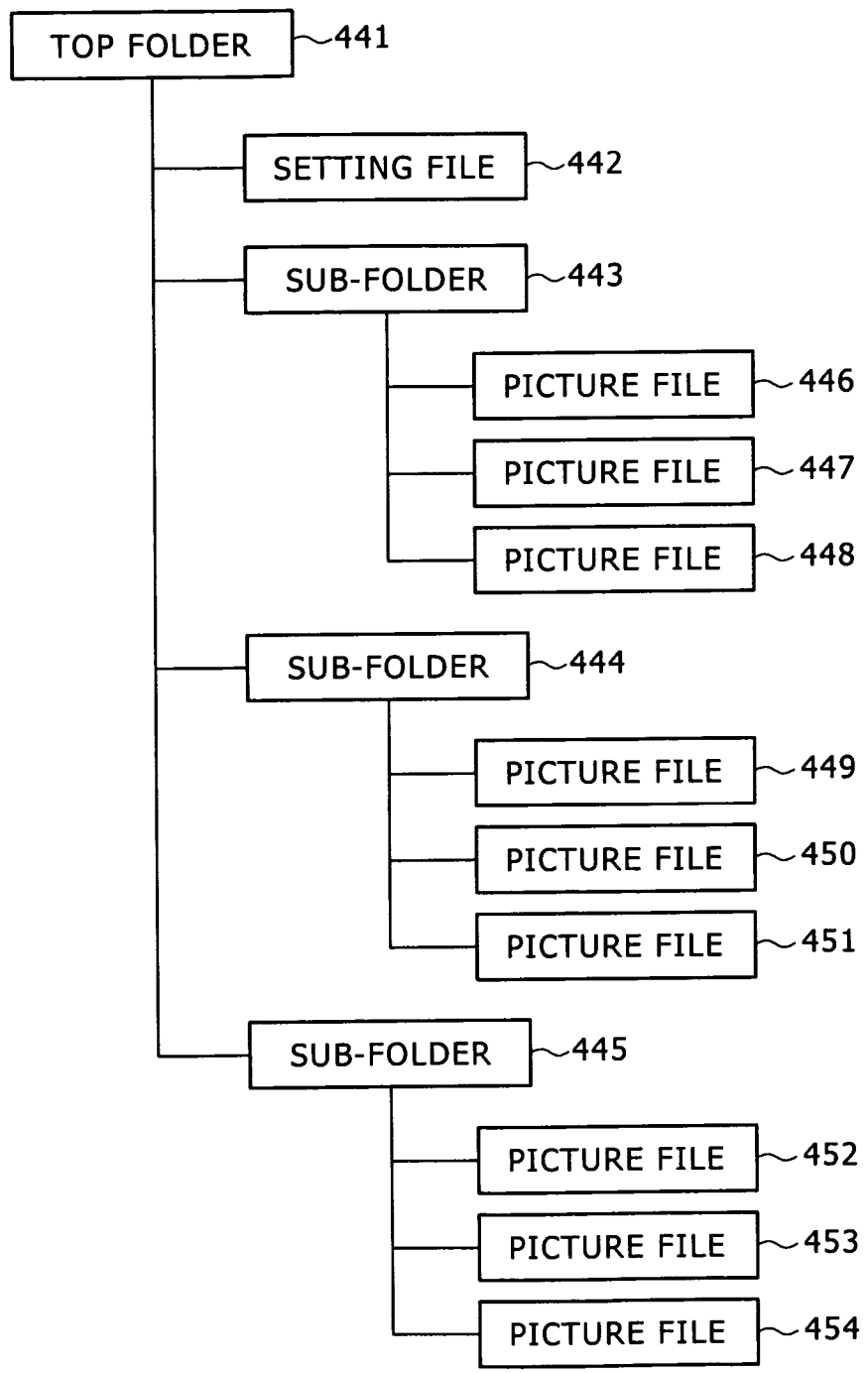
FIG. 11 is a schematic view explanatory of a structure of folders that accommodate picture files.

When the picture files are imported from the removable media 51 to the information processing apparatus 11 as described above, the picture files moved into the apparatus 11 are stored into sub-folders that have as their folder names the photographer names entered by the user as shown in FIG. 11.

In FIG. 11, a top folder 441 accommodates a setting file 442 and sub-folders 443 through 445. The folder name for the top folder 441 may be the event name input to the field 333 in the dialog 331 of FIG. 8 (e.g., "ODAIBA" in FIG. 8).

Under the top folder 441, the sub-folder 443 holds picture files 446 through 448; the sub-folder 444 retains picture files 449 through 451; and the sub-folder 445 contains picture files 452 through 454. As their folder names, the sub-folders 443 through 445 are furnished with the photographer names entered into the field 332 in the dialog 331 of FIG. 8 (e.g., "euran" in FIG. 8).

The picture files 446 through 454 are illustratively given file names determined by the imaging devices having taken the pictures of these files, such as "SWW00001.jpg." More specifically, the picture files 446 through 454 are provided with picture data and additional information for displaying the pictures contained therein. Such additional information may include EXIF (EXchangeable Image File Format) information and attribute information. The EXIF information may contain picture-taking settings such as shutter speeds and sensitivity, photographed dates and times, and the model name of the imaging device used to take pictures. The attribute information may include created dates and times (created time of day) of picture files as well as their last changed dates and times (last changed time of day). Each of the sub-folders 443 through 445 may accommodate not only picture files but also moving picture data and audio data.

The setting file 442 holds offset values for a picture group made up of the picture files 446 through 448, for a picture group formed by the picture files 449 through 451, and for a picture group constituted by the picture files 452 through 454.

Figure 12:
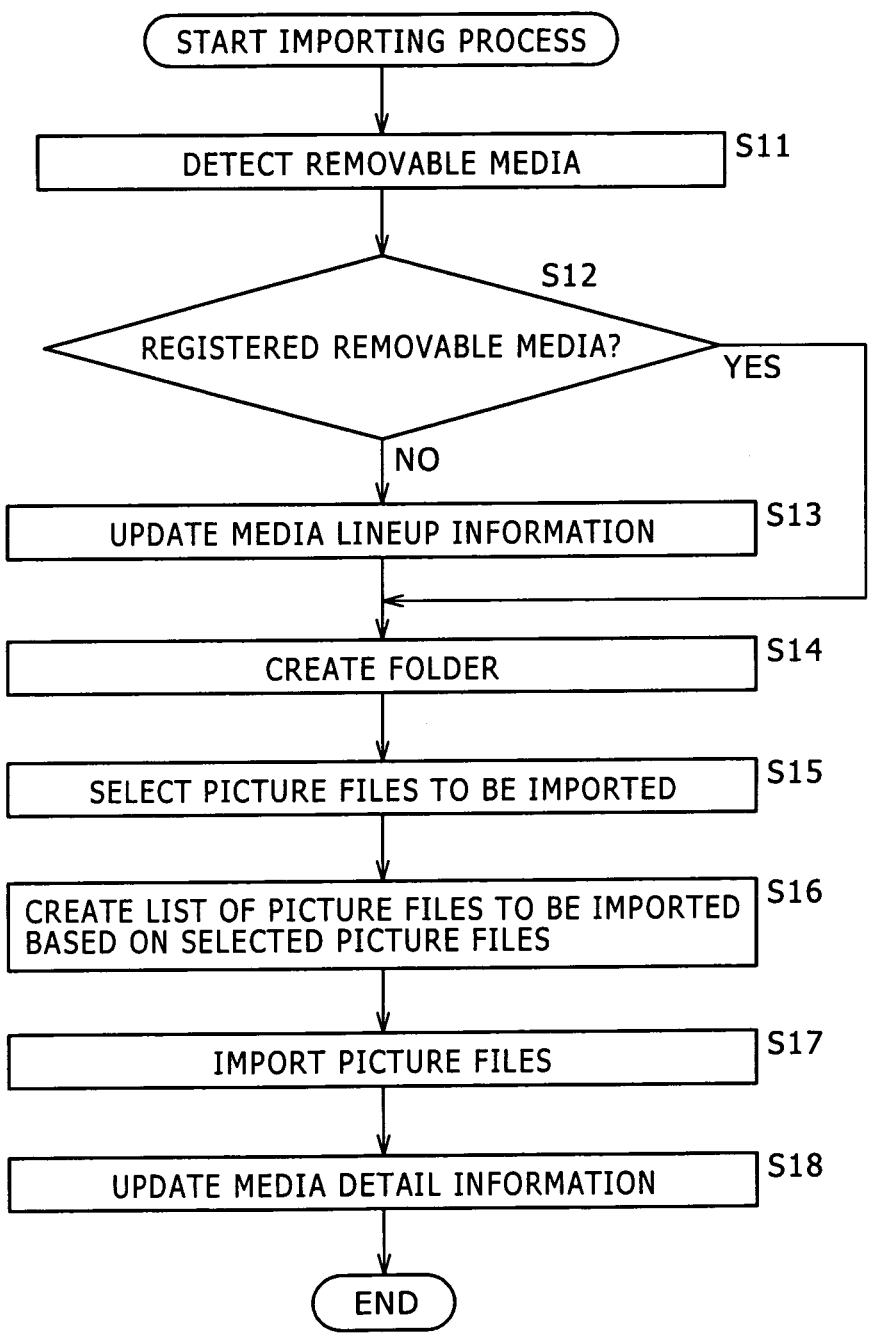
FIG. 12 is a flowchart of steps constituting an importing process.

Described below with reference to the flowchart of FIG. 12 is an importing process whereby picture files are imported from the removable media 51 to the information processing apparatus 11 for storage.

When a piece of removable media 51 is loaded into the information processing apparatus 11, step S11 is reached. In step S1, the detection device 121 (FIG. 3) detects the removable media 51 loaded into the information processing apparatus 11 and generates a signal indicating detection of the loaded removable media 51. The generated signal is sent from the detection device 121 to the media information management device 122 (FIG. 3).

After the detection device 121 has supplied the media information management device 122 with the signal indicative of detection of the removable media 51, step S12 is reached. In step S12, the media management device 122 checks to determine whether or not the detected piece of removable media 51 is registered in the media lineup information recorded in the media lineup information recording device 93.

Illustratively, the media information management device 122 retrieves an ID file from the ID file recording device 111 on the loaded removable media 51. If the ID in the retrieved ID file identifying the removable media 51 is found to be included in the media lineup information recorded in the media lineup information recording device 93, then the media information management device 122 determines that the loaded piece of removable media 51 is one of the removable media 51 registered in the media lineup information.

If no ID file is found in the ID file recording device 111 on the removable media 51, then the media information management device 122 determines that the loaded piece of removable media 51 is not one of the removable media 51 registered in the media lineup information.

If in step S12 the loaded piece of removable media 51 is not found to be any one of the removable media 51 registered in the media lineup information, then step S13 is reached so that the loaded removable media 51 may be registered anew in the media lineup information. That is, in step S13, the media information management device 122 causes the recording device 38 to update the media lineup information in the media lineup information recording device 93 in a manner reflecting the added piece of removable media 51.

Illustratively, the media lineup information recording device 93 retains the media lineup information such as one shown in FIG. 13. In FIG. 13, line numbers 1 through 18 are shown added only for explanation purposes; they are not actually included in the media lineup information.

The media lineup information is written illustratively in a markup language called XML (Extensible Markup Language). In FIG. 13, lines 2 through 8 show information about one piece of removable media 51, and lines 10 through 16 give information about another piece of removable media 51.

Illustratively, line 2 shows the ID for identifying the piece of removable media 51. In this case, the ID is given as "{5F1AD6 DB-FA1D-4F4F-8BDB-66C9D8DE7C4D}." Line 3 indicates the photographer name specific to this piece of removable media 51. The photographer name is given illustratively as "euran."

Line 5 shows the storage location in the recording device 38 to which to record the picture files imported from the removable media 51. In this case, the location is given as "C:¥Documents and Settings¥nishy4¥My Documents¥My Pictures¥." For example, suppose that picture files are to be imported from the piece of removable media 51 identified by the ID "{5F1AD6DB-FA1D-4F4F-8BDB-66C9D8DE7C4D}." In this case, the top folder is recorded to the storage location determined as "C:¥Documents and Settings¥nishy4¥My Documents¥My Pictures¥," and the sub-folders are stored into the top folder. The picture files imported from the removable media 51 are then placed into the sub-folders.

Line 7 shows a drive letter ("F:¥" in this case) indicative of the last drive from which the picture files were imported. Line 8 gives the time of day at which the picture files were last imported from the removable media 51. In this case, the last imported time of day is given as "Tue, 31 May 2005 22:43:12 GMT." This description on line 8 signifies that the last imported time of day is 22:43:12, Tuesday, May 31, 2005.

Just like lines 2 through 8, lines 10 through 16 provide information about another piece of removable media 51. Illustratively, line 10 shows the ID for identifying this piece of removable media 51. In this case the ID is given as "{5F1AD6 DB-FA1D-4F4F-8BDB-66C9D8DE7C4E}." Line 11 shows the photographer name specific to the removable media 51; the name here is "nishy."

Line 13 shows the storage location in the recording device 38 to which to record the picture files imported from the removable media 51. In this case, the location is given as "C:¥Documents and Settings¥nishy4¥My Documents¥My Pictures¥." Line 15 shows a drive letter ("F:¥" in this case) indicative of the last drive from which the picture files were imported. Line 16 gives the time of day at which the picture files were last imported from the removable media 51. In this case, the last imported time of day is given as "Tue, 31 May 2005 22:45:12 GMT."

Suppose that in step S12, the loaded piece of removable media 51 is not found to be registered in the media lineup information. In that case, the media information management device 122 may cause the display control device 72 to display a dialog through which to register the new piece of removable media 51 in the media lineup information.

The display control device 72 acquires from the recording device 38 a picture file (i.e., picture data) for displaying the dialog and sends the acquired file to the output device 37. In turn, the output device 37 is caused to display the dialog through which the newly detected piece of removable media 51 is registered in the media lineup information.

On the displayed dialog screen, the user operating the input device 36 may illustratively enter the photographer name associated with the removable media 51 and the storage location to which to import the picture files from the media 51. This causes the input device 36 to send a signal reflecting the user's operation to the media information management device 122 in the data control device 71. Given the signal, the media information management device 122 causes the recording device 38 to update the media lineup information in the media lineup information recording device 93 in such a manner that the media lineup information such as the one in FIG. 13 will reflect the photographer name and picture file import destination designated by the input signal as well as the ID found in the ID file which was retrieved from the removable media 51 and which identifies the media 51.

If no ID file is found in the ID file recording device 111 on the removable media 51, then the media information management device 122 creates an ID file that holds a new ID not included in the media lineup information. The ID file thus created is sent to the loaded piece of removable media 51 for recording to its ID file recording device 111. Illustratively, the ID file may contain text (information) indicative of an ID for identifying the removable media 51 such as "GUID={5F1AD6 DB-FA1D-4F4F-8BDB-66C9D8DE7C4D}."

In step S13 back in the flowchart of FIG. 12, the media lineup information is updated as described above. Step S13 is followed by step S14. If in step S12 the piece of removable media 51 loaded in the information processing apparatus 11 is found already registered in the media lineup information, step S13 is skipped and step S14 is reached directly.

In step S14, the input/output control device 123 creates folders in which to store the picture files imported from the removable media 51.

Figure 7:
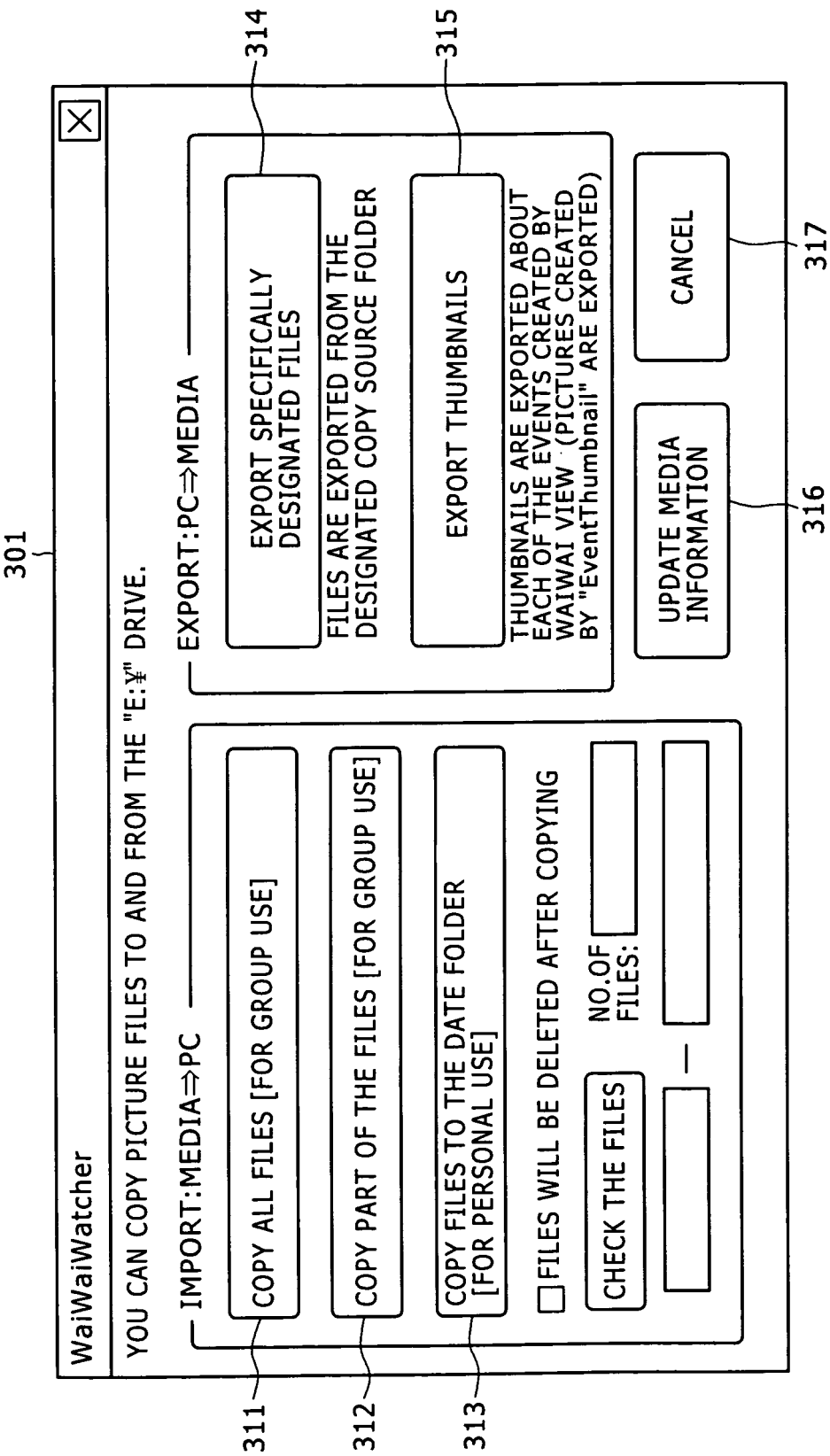
FIG. 7 is a schematic view explanatory of an input/output screen.

Illustratively, the input/output control device 123 gives the display control device 72 an instruction to display the input/output screen 301 shown in FIG. 7. Given the instruction to display the input/output screen 301 from the data control device 71, the display control device 72 acquires from the recording device 38 a picture file (picture data) for displaying the input/output screen 301 and sends the acquired file to the output device 37. In turn, the output device 37 is caused to display the input/output screen 301.

If the user selects the button 312 by operating the input device 36, the display control device 72 illustratively acquires from the recording device 38 a picture file (picture data) for displaying the dialog 331 shown in FIG. 8 and supplies the acquired file to the output device 37. The output device 37 is caused to display the dialog 331.

Suppose that by operating the input device 36, the user enters "euran" as the photographer name into the field 332 and "ODAIBA" as the event name into the field 333 and selects the button 334. In that case, the input device 36 supplies the input/output control device 123 with an input signal reflecting the user's operation specifying that "euran" was input as the photographer name and "ODAIBA" as the event name. Given the input signal from the input device 36, the input/output control device 123 creates a top folder named "ODAIBA" and a sub-folder named "euran" and stores the sub-folder into the top folder. The input/output device 123 proceeds to acquire the media lineup information from the media lineup information recording device 93 via the media information management device 122. For example, if the media lineup information shown in FIG. 13 is acquired, that information specifies that the picture files recorded on the removable media 51 of which the photographer name is "euran" (line 3 in FIG. 13) are to be imported to "C:¥Documents and Settings¥nishy4¥My Documents¥My Pictures¥" (line 5 in FIG. 13). The input/output control device 123 then supplies the created top folder and sub-folder to the recording device 38. In turn, the recording device 38 is caused to record the top folder to the storage location designated as "C:¥Documents and Settings¥nishy4¥My Documents¥My Pictures¥."

If the top folder named "ODAIBA" is already found stored in the location designated as "C:¥Documents and Settings¥nishy4¥My Documents¥My Pictures¥," then the input/output control device 123 causes the recording device 38 to place the sub-folder named "euran" into the top folder named "ODAIBA" for storage. If the top folder named "ODAIBA" is already found stored in the location designated as "C:¥Documents and Settings¥nishy4¥My Documents¥My Pictures¥" and if the sub-folder named "euran" is found placed in the top folder named "ODAIBA," then the input/output control device 123 will not let the recording device 38 record the newly created top folder and sub-folder.

In step S14, the input/output control device 123 creates the folders in which to store the picture files to be imported from the removable media 51. After creating the folders, the input/output control device 123 causes the output device 37 to display the dialog through which to select the picture files to be imported from the removable media 51.

Illustratively, on the dialog screen 331 shown in FIG. 8, the user may select the button 334 by operating the input device 36. This prompts the input/output control device 123 to create the folders in which to place the picture files as described above. At this point, the input device 36 supplies the display control device 72 with an input signal indicating that the button 334 has been selected. In response, the display control device 72 illustratively acquires from the recording device 38 a picture file (picture data) for displaying the dialog 351 shown in FIG. 9, supplies the acquired file to the output device 37, and causes the output device 37 to display the dialog 351 based on the supplied file.

On the dialog screen for picture file selection, the user selects the picture files to be imported from the removable media 51 to the information processing apparatus 11 by operating the input device 36. The input device 36 supplies the input/output control device 123 with an input signal designating the picture files selected by the user. Given the input signal designating the user-designated picture files from the input device 36, the input/output control device 123 goes to step S15 and selects the designated picture files to be imported from the removable media 51 to the information processing apparatus 11 based on the supplied input signal.

Illustratively, with the dialog 351 displayed as shown in FIG. 9, the user may operate the input device 36 to slide the buttons 381 and 382 along the slider bars 362 and 363 respectively so as to select the picture files to be imported. Selecting the button 369 causes the input device 36 to supply the input/output control device 123 with an input signal designating the user-selected picture files.

Given the input signal from the input device 36, the input/output control device 123 selects the picture files to be imported from the removable media 51 to the information processing apparatus 11. In FIG. 9, for example, the user-selected picture files range from the file of the picture taken at 13:39:16 on Sep. 8, 2004, to the file of the picture taken at 16:16:24 on Sep. 8, 2004. In this case, the input/output control device 123 selects the designated 52 picture files based on the input signal.

Step S16 is reached following the selection of the picture files to be imported. In step S16, the input/output control device 123 creates a list of the picture files to be imported from the removable media 51 in accordance with the selected picture files.

Illustratively, the input/output control device 123 acquires media detail information from the media detail information recording device 92 via the media information management device 122. Referring to the acquired media detail information, the input/output control device 123 creates a list of the picture files to be imported by selecting the picture files yet to be imported from among the selected picture files.

The media detail information recording device 92 illustratively retains the media detail information such as one shown in FIG. 14. In FIG. 14, line numbers 1 through 8 are shown added only for explanation purposes; they are not actually included in the media detail information.

The media detail information is written illustratively in a markup language called XML (Extensible Markup Language). The information in FIG. 14 is about picture files imported from or exported to a single piece of removable media 51.

Illustratively, lines 2 and 3 contain information about one picture file. A description "DSC00273.JPG" on line 2 shows the name of the picture file. The number "159324" on line 2 indicates the size of the picture file in question. Illustratively the number "159324" signifies that the picture file has the size of 159,324 bytes. Another description "Fri, 08 Oct 2004 07:45:46" on line 2 denotes the last changed date and time of the picture file, i.e., the time of day at which the picture file in question was most recently modified. The description "Fri, 08 Oct 2004 07:45:46" means that the picture file was last changed at 07:45:46, Friday, Oct. 8, 2004.

The number "10" on line 3 is a two-bit input/output flag indicating whether the picture file in question was imported from and/or exported to the removable media 51. Illustratively, an input/output flag "01" signifies that the picture file was exported and has not been imported yet; an input/output flag "10" shows that the picture file was imported and has not been exported yet; an input/output flag "11" indicates that the picture was both imported and exported. The input/output flag "10" on line 3 shows that the picture file named "DSC00273.JPG" was imported from, but has not been exported to, the removable media 51.

Just like lines 2 and 3, lines 4 and 5 provide information about another picture file. The picture file described on lines 4 and 5 is named "DSC00274.JPG," has a size of "241910," has the last changed date and time "Fri, 08 Oct 2004 07:48: 36," and is given the input/output flag "10." Lines 6 and 7 show information about yet another picture file. The picture file described on lines 6 and 7 is named "DSC00275.JPG," has a size of "207712," has the last changed date and time "Fri, 08 Oct 2004 07:55:42," and is given the input/output flag "10."

Illustratively, suppose that the user has selected the picture files named "DSC00273.JPG," "DSC00274.JPG," "DSC00275.JPG," and "DSC00276.JPG" and that the media detail information in FIG. 14 acquired from the media detail information recording device 92 indicates the picture files named "DSC00273.JPG," "DSC00274.JPG," and "DSC00275.JPG" which have already been imported from the removable media 51. In that case, the input/output control device 123 in step S16 creates a list that includes the picture file named "DSC00276.JPG" yet to be imported and excludes the already imported picture files.

In this manner, the picture files already imported are excluded from the list of the picture files to be imported. With the previously imported files excluded from the list so as to avoid duplication, the wasteful import of the existing picture files can be averted. This boosts the speed with which the picture files are imported.

The media detail information recording device 92 retains as many items of media detail information as the number of pieces of removable media 51 registered (i.e., included) in the media lineup information held by the media lineup information recording device 93.

Thus if the media lineup information recording device 93 holds the media lineup information shown in FIG. 15A, that means the media detail information recording device 92 retains the media detail information about the removable media 51 identified by IDs "ID-A," "ID-B" and "ID-C."

The media lineup information in FIG. 15A includes the IDs for identifying pieces of removable media 51, photographer names associated with the identified pieces of removable media 51, and information about the destinations (storage locations) to which to import the picture files from the removable media 51. The media lineup information in FIG. 15A excludes information about drive letters indicative of the drives used during the last import and information about the last imported dates and times.

Illustratively, in the media lineup information are registered the piece of removable media 51 identified by their IDs "ID-A," "ID-B" and "ID-C." The piece of removable media 51 identified by the ID "ID-A" is associated with the photographer named "tanaka" who took the pictures in the picture files recorded on this piece of removable media 51. The storage location to which to the import these picture files is "My Documents¥Pictures."

The piece of removable media 51 identified by the ID "ID-B" is associated with the photographer named "suzuki" who took the pictures recorded in the picture files recorded on this piece of removable media 51. The storage location to which to the import these picture files is "My Documents¥Pictures." The piece of removable media 51 identified by the ID "ID-C" is associated with the photographer named "sato" who took the pictures in the picture files recorded on this piece of removable media 51. The storage location to which to the import these picture files is also "My Documents¥Pictures."

In the case above, the media detail information recording device 92 retains the media detail information about each of the pieces of removable media 51 identified by the IDs "ID-A," "ID-B" and "ID-C."

Illustratively, the media detail information about the piece of removable media 51 identified by the ID "ID-A" (called the medium A) includes information about the names of the picture files recorded on this medium, their sizes, and their last changed dates and times as shown in FIG. 15B.

For example, the media detail information about the medium A includes information about a picture file that is named "DSC000001.jpg," that has a size of 1.10 MB, and that has the last changed date and time "2004/01/01/13:01:55." The last changed date and time "2004/01/01/13:01:55" signifies the time of day "13:01:55 on January 1, 2004." The media detail information about the medium A also includes information about another picture file that is named "DSC00002.jpg," that has a size of 1.21 MB, and that has the last changed date and time "2004/01/01/13:02:05"; and information about yet another picture file that is named "DSC000003.jpg," that has a size of 1.11 MB, and that has the last changed date and time "2004/01/01/13:05:07."

In another example, the media detail information about the piece of removable media 51 identified by the ID "ID-B" (called the medium B) and listed in FIG. 15A includes information about the names of the picture files recorded on this medium, their sizes, and their last changed dates and times as indicated in FIG. 15C.

Illustratively, the media detail information about the medium B includes information about a picture file that is named "DSC000001.jpg," that has a size of 1.21 MB, and that has the last changed date and time "2004/01/01/13:01:56"; information about anther picture file that is named "DSC000002.jpg," that has a size of 1.22 MB, and that has the last changed date and time "2004/01/01/13:02:03"; and information about yet anther picture file that is named "DSC000003.jpg," that has a size of 1.31 MB, and that has the last changed date and time "2004/01/01/13:05:05."

In a further example, the media detail information about the piece of removable media 51 identified by the ID "ID-C" (called the medium C) and listed in FIG. 15A includes information about the names of the picture files recorded on this medium, their sizes, and their last changed dates and times as indicated in FIG. 15D.

Illustratively, the media detail information about the medium C includes information about a picture file that is named "DSC000001.jpg," that has a size of 1.11 MB, and that has the last changed date and time "2004/01/01/13:01:57"; information about another picture file that is named "DSC00002.jpg," that has a size of 1.00 MB, and that has the last changed date and time "2004/01/01/13:02:03"; and information about yet anther picture file that is named "DSC000003.jpg," that has a size of 1.12 MB, and that has the last changed date and time "2004/01/01/13:05:09."

In step S16 back in the flowchart of FIG. 12, the list of the picture files to be imported from the removable media 51 is created. Step S16 is followed by step S17 in which the input/output control device 123 imports the picture files from the removable media 51 based on the picture file list thus created.

Illustratively, in keeping with the created picture file list, the input/output control device 123 acquires the listed picture files from the removable media in step S17. The acquired picture files are supplied to the recording device 38. The input/output control device 123 causes the picture file recording device 91 to record the picture files to the recording device 38 in such a manner that the supplied picture files are stored into a sub-folder named after the photographer whose name is associated with the removable media 51.

During recording to the picture file recording device 91, the input/output control device 123 keeps acquiring from the removable media 51 the picture files included in the picture file list and forwarding the acquired files to the recording device 38 for storage therein. The acquiring and the storing of the acquired picture files will continue regardless of, say, errors that may occur halfway unless and until the user operates the input device 36 to give an instruction to stop acquiring the picture files.

The user may illustratively operate the input device 36 to give an instruction saying that the imported picture files are to be deleted from the removable media 51. In such a case, after importing the picture files included in the picture file list, the input/output control device 123 deletes the listed picture files from the removable media 51. With the picture files imported, the input/output control device 123 sends the picture file list to the media information management device 122.

In step S18, in reference to the picture file list sent from the input/output control device 123, the media information management device 122 causes the recording device 38 to update the media detail information held in the media detail information recording device 92. This completes the importing process.

In the manner described above, the information processing apparatus 11 imports from the removable media 51 the picture files of the pictures taken during the time period designated by the user, and records the imported picture files.

When the picture files of the picture photographed during the user-designated time period are imported from the removable media 51 as described above, it becomes significantly easier for the user to specify the picture files to be imported to the information processing apparatus 11.

By designating the top folder that contains the picture files imported as described, the user may obtain the display of a lineup of the picture files accommodated in the designated top file.

For example, the user may operate the input device 36 to designate (i.e., select) one top folder and give an instruction to display a lineup of the pictures contained in the designated top folder. This causes the input device 36 to supply an input signal reflecting the user's operation to the display control device 72. Based on the input signal coming from the input device 36, the lineup display control device 96 in the display control device 72 causes the output device 37 to display a WaiWai View display screen that displays a lineup of the pictures of the picture files held in the designated top folder.

Suppose that the user-designated top folder contains four sub-folders: a sub-folder named "euran" (called the sub-folder "euran"), a sub-folder named "nishy" (called the sub-folder "nishy"), a sub-folder named "ryom" (called the sub-folder "ryom") and a sub-folder "ykoba" (called the sub-folder "ykoba"). In that case, the lineup display control device 96 provides the display of a lineup of the pictures from the picture files held in these four sub-folders. Illustratively, the output device 37 displays a WaiWai View display screen such as one shown in FIG. 16.

Figure 16:
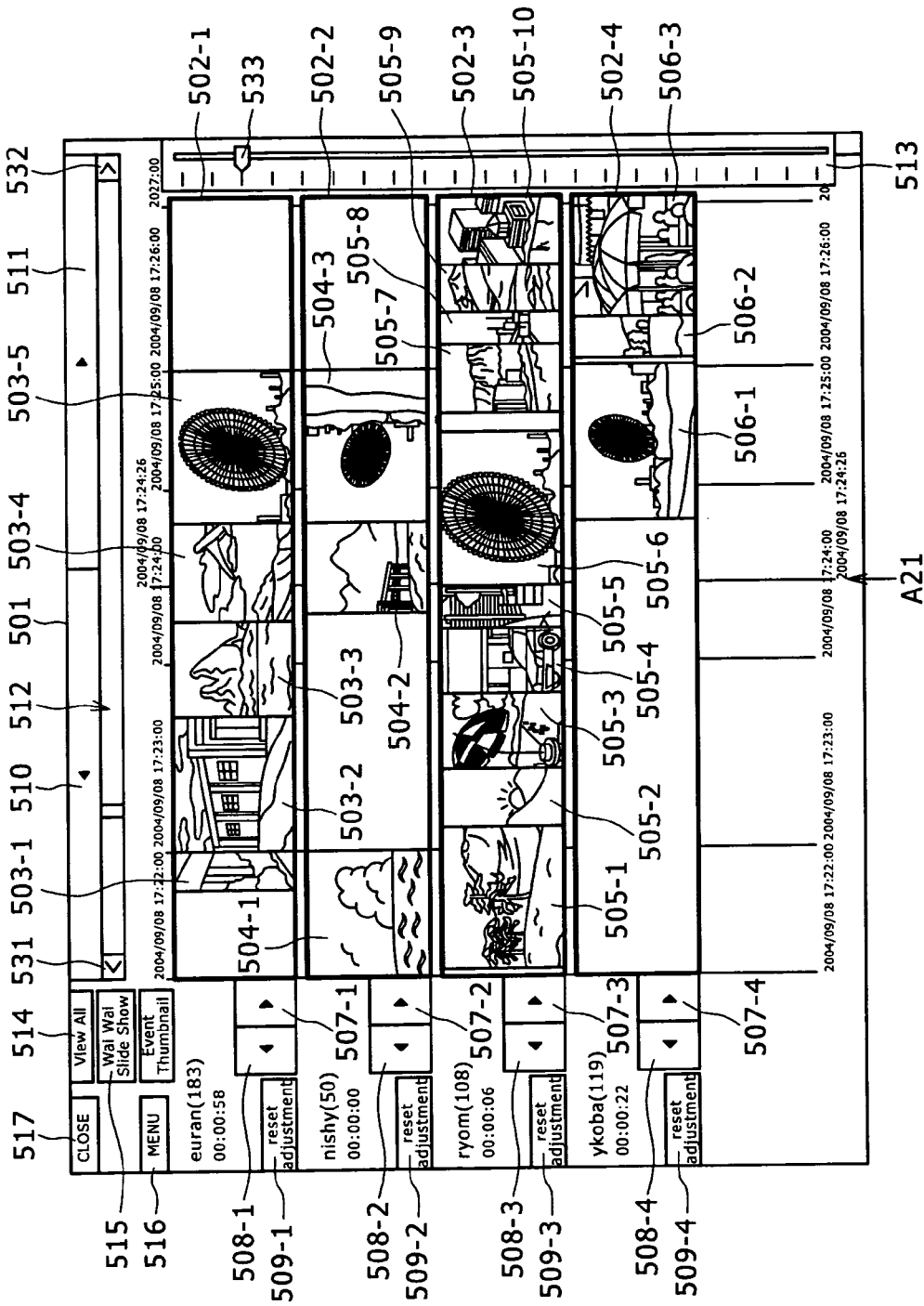
FIG. 16 is a schematic view showing a typical WaiWai ("noisily together" in Japanese) View display screen.

In FIG. 16, a WaiWai View display screen 501 shows four areas 502-1 through 502-4 arrayed vertically corresponding to the four sub-folders. The areas 502-1, 502-2, 502-3, and 502-4 display the pictures of the picture files from the sub-folders "euran," "nishy," "ryom," and "ykoba," respectively.

In other words, the folder name of each of the sub-folders is the same as the photographer name specific to each piece of removable media 51. The WaiWai View display screen 501 has the photographer-specific areas 502-1 through 502-4 arrayed in the vertical direction of the screen as illustrated. There are as many photographer-specific display areas as the number of sub-folders stored in the top holder (i.e., the same as the number of photographers). In each photographer-specific display area, the pictures taken by the corresponding photographer and held in the picture folders placed into the corresponding sub-folder are displayed from left to right in chronological order of their photographed dates and times.

Where there is no need to distinguish between the individual areas 502-1 through 502-4 in the description that follows, the areas will be generically referred to as the area 502.

On the WaiWai View display screen 501, the horizontal direction of the area 502 corresponds to the chronology of the pictures to be displayed therein. In FIG. 16, numerical markings indicative of the passage of time are arranged horizontally above the area 502-1 and under the area 502-4.

Illustratively, the marking "2004/09/08 17:22:00" appears in the leftmost position above the area 502-1 and under the area 502-4. The marking shows that the leftmost position in the area 502 represents the time of day 17:22 on Sep. 8, 2004.

Likewise, the marking "2004/09/08 17:26:00" appears in the rightmost position above the area 502-1 and under the area 502-4. The marking indicates that the rightmost position in the area 502 represents the time of day 17:26 on Sep. 8, 2004.

The area 502 displays pictures in chronological order of their photographed dates and times supplemented by an offset time for each picture group (the offset times are called the display times) for the period ranging from 17:22 on Sep. 8, 2004, to 17:26 on Sep. 8, 2004.

For example, the area 502-1 displays pictures 503-1 through 503-5 (all or part of them) of which the picture folders are stored in the sub-folder "euran" corresponding to the area 502-1. The pictures 503-1 through 503-5 are displayed in those positions of the area 502-1 which correspond to the display times obtained by adding the offset time of the picture group to the photographed dates and times of the pictures in question. Illustratively, the picture 503-2 is displayed in that position in the area 502-1 which corresponds to 17:23 on Sep. 8, 2004, which is the display time obtained by adding the offset time of the picture group to the photographed date and time of that picture. Above the picture 503-2 is seen the marking "2004/09/08 17:23:00" denoting a point in time in the horizontal direction of the area 502-1.

Similarly, the area 502-2 displays pictures 504-1 through 504-3 (all or part of them) of which the picture folders are stored in the sub-folder "nishy" corresponding to the area 502-2. The area 502-3 displays pictures 505-1 through 505-10 (all or part of them) of which the picture folders are stored in the sub-folder "ryom" corresponding to the area 502-3. The area 502-4 displays pictures 506-1 through 506-3 (all or part of them) of which the picture folders are stored in the sub-folder "ykoba" corresponding to the area 502-4.

To the left of the area 502-1 appears the indication "euran (183)," the name of the photographer who-took the pictures currently displayed in this area along with the number of the picture files holding the pictures in the corresponding sub-folder. More specifically, "euran" is the name of the photographer who took the pictures 503-1 through 503-5 being displayed in the area 502-1, and 183 is the number of the picture files holding the pictures in the sub-folder "euran" corresponding to the area 502-1.

To the left of the area 502-1 also appears the time indication "00:00:58" representing the time defined by the offset value for the pictures in the picture files stored in the sub-folder "euran." The indication "00:00:58" indicates that the offset time is 58 seconds. That means the pictures 503-1 through 503-5 are displayed in those positions of the area 502-1 which correspond to the display times obtained by adding the offset time of 58 seconds to their photographed dates and times.

To the left of the area 502-2 appears the indication "nishy (50)," the name of the photographer who took the pictures currently displayed in this area along with the number of the picture files holding the pictures in the corresponding sub-folder. Under the indication "nishy (50)" is a numeric marking "00:00:00" indicating the time defined by the offset value for the pictures in the picture files held in the sub-folder "nishy."

To the left of the area 502-3 appears the indication "ryom (108)," the name of the photographer who took the pictures currently displayed in this area along with the number of the picture files holding the pictures in the corresponding sub-folder. Under the indication "ryom (108)" is a numeric marking "−00:00:06" indicating the time defined by the offset value for the pictures in the picture files held in the sub-folder "ryom." The marking "−00:00:06" shows that the offset time is −6 seconds. That means the pictures 505-1 through 505-10 are displayed in those positions of the area 502-3 which correspond to the display times obtained by adding the offset time of −6 seconds to their photographed dates and times (i.e., by subtracting 6 seconds from each photographed date and time).

To the left of the area 502-4 appears the indication "ykoba (119)," the name of the photographer who took the pictures currently displayed in this area along with the number of the picture files holding the pictures in the corresponding sub-folder. Under the indication "ykoba (119)" is a numeric marking "00:00:22" indicating the time defined by the offset value for the pictures in the picture files held in the sub-folder "ykoba."

To the left of the areas 502-1 through 502-4 are buttons 507-1 through 507-4 and buttons 508-1 through 508-4, respectively. These buttons may be selectively operated to adjust the offset value for each of the pictures displayed in the areas 502-1 through 502-4.

For example, selecting the button 507-1 increments by a predetermined time (e.g., 15 seconds) the time defined by the offset value for the pictures in the picture folder held in the sub-folder "euran"; selecting the button 508-1 decrements by a predetermined time (e.g., 15 seconds) the time defined by the offset value for the pictures in the picture folder kept in the sub-folder "euran." More specifically, if the button 507-1 is selected in FIG. 16, the pictures 503-1 through 503-5 displayed in the area 502-1 are moved right over a distance corresponding to the time defined by the offset value incremented by the button operation.

Likewise, selecting the button 507-2 increments by the predetermined time the time defined by the offset value for the pictures in the picture folder held in the sub-folder "nishy"; selecting the button 508-2 decrements by the predetermined time the time defined by the offset value for the pictures in the picture folder kept in the sub-folder "nishy."

Furthermore, selecting the button 507-3 increments by the predetermined time the time defined by the offset value for the pictures in the picture folder held in the sub-folder "ryom"; selecting the button 508-3 decrements by the predetermined time the time defined by the offset value for the pictures in the picture folder kept in the sub-folder "ryom." Selecting the button 507-4 increments by the predetermined time the time defined by the offset value for the pictures in the picture folder held in the sub-folder "ykoba"; selecting the button 508-4 decrements by the predetermined time the time defined by the offset value for the pictures in the picture folder kept in the sub-folder "ykoba."

Where there is no need to distinguish between the individual buttons 507-1 through 507-4 in the description that follows, the buttons will be generically referred to as the button 507. Similarly, if there is no need to distinguish between the individual buttons 508-1 through 508-4 in the ensuing description, the buttons will be generically referred to as the button 508.

To the left of the areas 502-1 through 502-4 are also buttons 509-1 through 509-4, respectively. Selecting one of the buttons 509-1 through 509-4 resets the offset value for the pictures displayed in the corresponding one of the areas 502-1 through 502-4.

Illustratively, selecting the button 509-1 resets to zero the time defined by the offset value for the pictures in the picture files held in the sub-folder "euran"; selecting the button 509-2 resets to zero the time defined by the offset value for the pictures in the picture files retained in the sub-folder "nishy"; selecting the button 509-3 resets to zero the time defined by the offset value for the pictures in the picture files kept in the sub-folder "ryom"; selecting the button 509-4 resets to zero the time defined by the offset value for the pictures in the picture files found in the sub-folder "ykoba."

In addition, at the top of the WaiWai View display screen 501 are buttons 510 and 511. Selecting the buttons 510 and 511 scrolls left and right the pictures displayed in the area 502, from one point in time for picture display to another.

More specifically, suppose that the picture 505-6 is displayed in the position corresponding to the point in time indicated by an arrow A21; that the picture 503-5 has a display time later than the picture 505-6 and closer thereto chronologically than any other picture displayed in the area 502; and that the picture 504-2 has a display time earlier than the picture 505-6 and closer thereto chronologically than any other picture in the area 502. In such a case, if the user selects the button 510, the pictures displayed in the area 502 are scrolled right so that the picture 504-2 will be in the position corresponding to the time indicated by the arrow A21; if the user selects the button 511, the pictures displayed in the area 502 are scrolled left so that the picture 503-5 will be in the position corresponding to the time indicated by the arrow A21.

Under the buttons 510 and 511 is a scroll bar 512 that may be operated by the user manipulating the input device 36. Operating the scroll bar 512 on the WaiWai View display screen 501 scrolls right and left the pictures displayed in the area 502 in increments of a predetermined time period.

Illustratively, if the user selects a button 531 on the scroll bar 512, the pictures displayed in the area 502 are scrolled right; if the user selects a button 532 on the scroll bar 512; the pictures in the area 502 are scrolled left.

In the rightmost position of the WaiWai View display screen 501 is a slider bar 513. A button 533 on the slider bar 513 may be moved up or down by the user to vary the range of display times for the pictures to be displayed in the area 502.

Illustratively, in FIG. 16, the display times for pictures to be displayed in the area 502 is shown ranging from 17:22 on Sep. 8, 2004, to 17:26 on Sep. 8, 2004. If the user operates the input device 36 to move the button 36 upward, the range of the display times for pictures to be displayed in the area 502 is made shorter than the range from 17:22 on Sep. 8, 2004, to 17:26 on Sep. 8, 2004. If the user moves the button 533 downward by operating the input device 36, the range of the display times for pictures to be displayed in the area 502 is made longer than the range from 17:22 on Sep. 8, 2004, to 17:26 on Sep. 8, 2004.

For example, if the user operates the input device 36 to move the button 533 to the lowest position on the slider bar 513 in FIG. 16, the area 502 is arranged to display pictures with their display times ranging from 17:22 on Sep. 8, 2004, to 20:22 on Sep. 8, 2004.

In the top left corner of the WaiWai View display screen 501 are buttons 514, 515, 516 and 517. The button 514 indicates the text "View All." Selecting the button 514 causes the pictures of the picture files retained in the sub-folders "euran," "nishy," "ryom" and "ykoba" to be displayed one by one in chronological order of their display times.

The button 515 indicates the text "WaiWai Slideshow." Selecting the button 515 causes the output device 37 to establish on its screen the areas each displaying the pictures of the picture files held in each of the sub-folders "euran," "nishy," "ryom" and "ykoba." In each of the established screen areas, the pictures of the picture files kept in the sub-folders "euran," "nishy," "ryom" and "ykoba" are displayed one after another in chronological order of their display times.

Selecting the button 516 displays a pull-down menu. The user may select an appropriate item from the displayed pull-down menu by operating the input device 36, so as to export the picture files from the sub-folder "euran," "nishy," "ryom" or "ykoba."

With the button 516 selected by operating the input device 36, the user may select another appropriate item from the displayed pull-down menu. The selection of the item may illustratively designate (i.e., select) the top folder that contains the pictures to be displayed in the area 502.

The button 517 has the indication "Close." Selecting the button 517 closes the WaiWai View display screen 501.

The user may also drag pictures displayed in the area 502 by operating the input device 36. Dragging a given picture changes its offset-adjusted time, i.e., its display time.

Figure 17A:
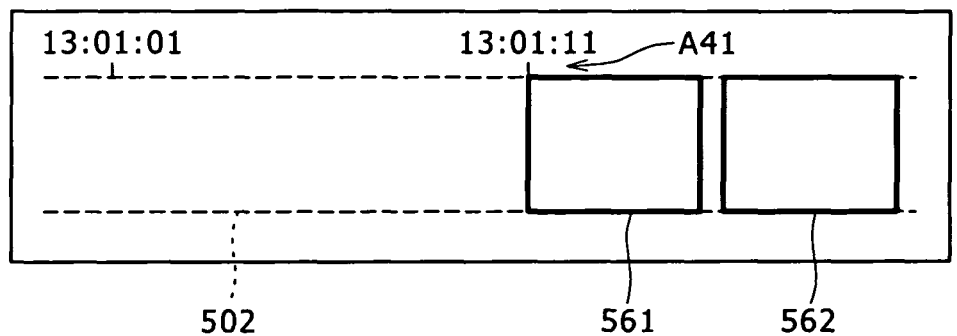
FIGS. 17A, 17B and 17C are schematic views explanatory of how the times of displayed pictures are corrected by dragging the pictures.

Illustratively, suppose that pictures 561 and 562 are displayed in the area 502 as shown in FIG. 17A. Of the reference numerals in FIGS. 17A through 17C, those already used in FIG. 16 designate like or corresponding parts, and their descriptions will be omitted where redundant.

In FIG. 17A, the picture 561 is displayed in the position indicated by an arrow A41. The display time for the picture 561 is given above the arrow A41 as "13:01:11", which means 13 hours, 1 minute and 11 seconds.

Figure 17B:
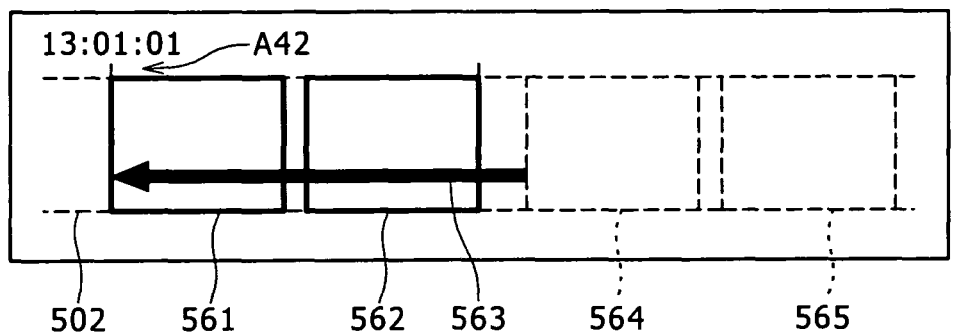

Suppose now that the user drags the picture 561 by operating the input device 36 in such a manner that the pictures 561 and 562 are moved left as shown in FIG. 17B. More specifically, as a result of the user's drag operation, the pictures 561 and 562 are moved from their old display oppositions indicated by broken-line rectangles 564 and 565 into their new positions in the direction indicated by an arrow 563.

Figure 17C:
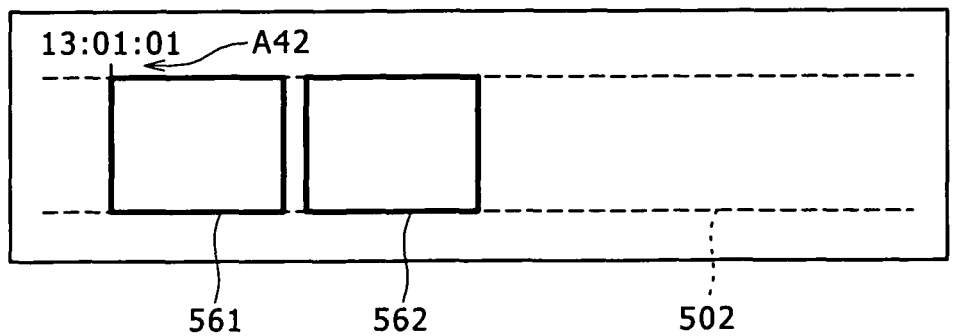

If the user operates the input device 36 to drag the picture 561 into the position indicated by an arrow A42, the picture 561 is moved into the position indicated by the arrow A42 as shown in FIG. 17C. The picture 562 is moved left over the same distance as the picture 561 along with the latter picture. In FIG. 17C, the picture 561 is displayed in the position indicated by the arrow A42, together with a numeric marking "13:01:01" above the arrow indicating the new display time of the picture 561. The display time is now 13 hours, 1 minute and 1 second, a point in time that is reached through an offset of 10 seconds relative to the initial display time of the picture displayed in the area 502. The offset has put the display time back by 10 seconds.

As described, when a picture displayed in the area 502 on the WaiWai View display screen 501 is dragged by the user operating the input device 36, the information processing apparatus 11 changes the offset-adjusted display time for the picture (of a given picture group) by the time period reflecting the distance traveled by the picture in question.

This feature serves as follows: it might happen that the photographers named "euran," "nishy," "ryom" and "ykoba" take pictures of the same object in an approximately simultaneous manner using their imaging devices. In such a case, there may well occur differences in display times between the pictures taken by these photographers when they are displayed on the WaiWai View display screen 501 primarily because the pictures were derived from different imaging devices. Such differences in display time may be adjusted with the help of the above-described feature.

For example, suppose that the photographers named "euran," "nishy," "ryom" and "ykoba" took pictures 503-5, 504-3, 505-6 and 506-1, shown in FIG. 16, of the same object in an approximately simultaneous manner. In this case, the position where the picture 505-6 is displayed (i.e., display time) is shifted left relative to the position (display time) where the other pictures 503-5, 504-3 and 506-1 are shown.

The user may then operate the input device 36 to select the button 507-3 or drag the picture 505-6 so as to change the display times for the pictures in the picture files held in the sub-folder "ryom." That is, the display times are changed so that the pictures 503-5, 504-3, 505-6 and 506-1 will be aligned with the same display time.

As described, the user can visually correct the discrepancies in display times between pictures displayed on the WaiWai View display screen 501 by simply operating the button 507 or 508 or dragging the picture of interest. The discrepancies are liable to occur to pictures taken with different imaging devices.

Figure 18:
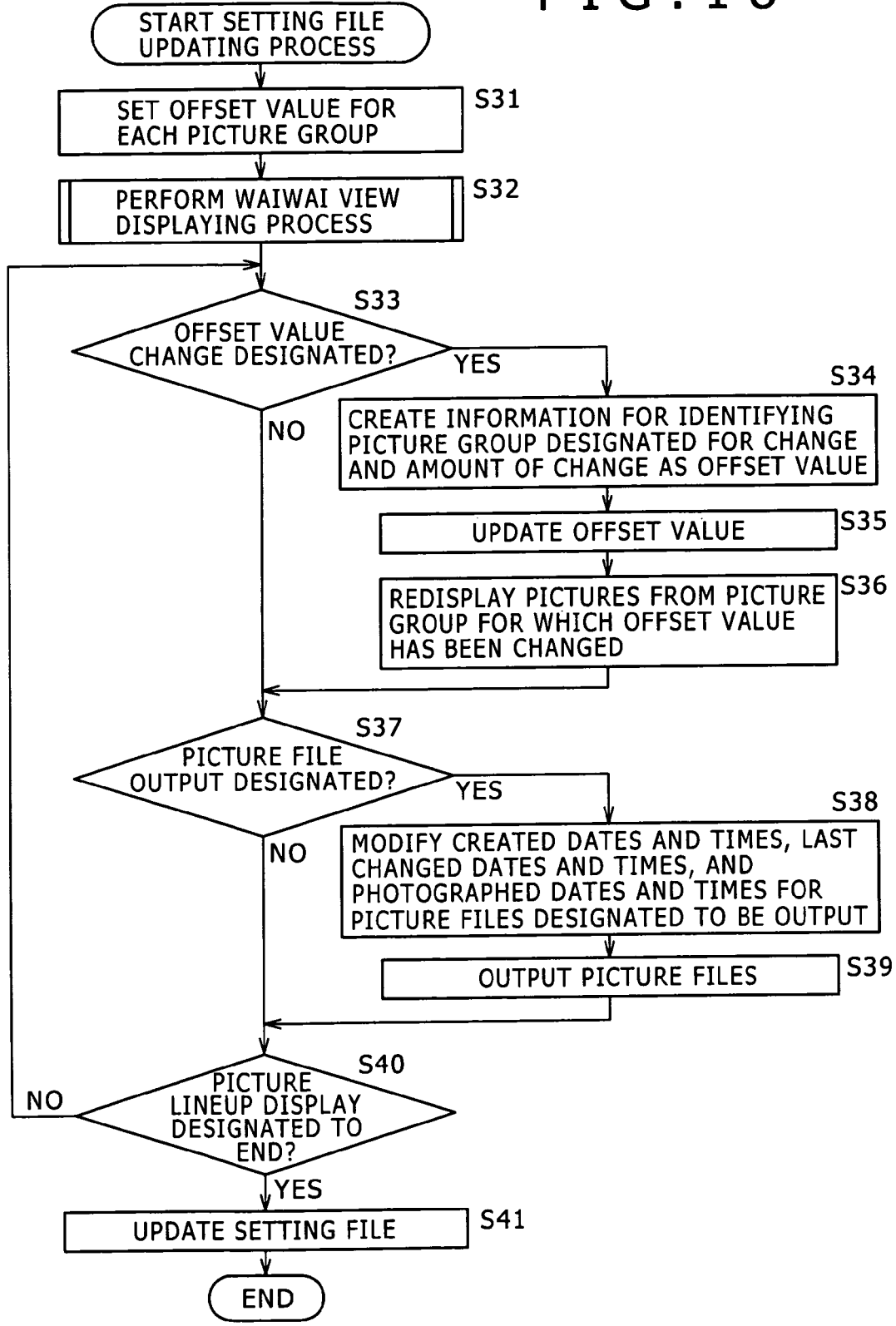
FIG. 18 is a flowchart of steps constituting a setting file updating process.

Described below with reference to the flowchart of FIG. 18 is a setting file updating process whereby a display time difference between pictures on the WaiWai View display screen 501 is corrected.

The user designates display of the WaiWai View display screen 501 by operating the input device 36. In turn, the lineup display control device 96 acquires from the recording device 38 the picture file for displaying the WaiWai View display screen 501, supplies the acquired file to the output device 37, and causes the output device 37 to display the WaiWai View display screen 501 based on the supplied file. In this case, the display device 37 may illustratively display a WaiWai View display screen 501 that has no pictures shown in the area 502.

Step S31 is reached when the WaiWai View display screen 501 is displayed. In step S31, the offset value updating device 162 (FIG. 4) acquires setting files from the setting file recording device 94 (FIG. 4) in the recording device 38, establishes an offset value for each of the picture groups involved, and stores the established offset values temporarily.

There are as many setting files as the number of top folders recorded in the recording device 38. The offset value updating device 162 acquires all setting files kept in the setting file recording device 94, and establishes an offset value for each of the picture groups regarding each of the setting files acquired.

For example, the offset value updating device 162 may acquire from the setting file recording device 94 the setting file shown in FIG. 19. In FIG. 19, line numbers 1 through 8 are shown added only for explanation purposes; they are not actually included in the setting file.

In FIG. 19, lines 1, 3, 5 and 7 indicate the names of the sub-folders stored in a single top folder. The sub-folder names are actually the same as the names of the photographers who took the pictures held in the sub-folders. Lines 2, 4, 6 and 8 indicate an offset value for each of the picture groups associated with the photographers named on lines 1, 3, 5 and 7.

Illustratively, the offset value for the picture group associated with the photographer "euran" shown on line 1 is indicated as "0.0006712962962963." The display times for the pictures of the picture files in the sub-folder named "euran" are obtained by supplementing their photographed dates and times with the time defined by the offset value "0.0006712962962963."

The time period of 24 hours is equated with an offset value of 1.0, and one hour with an offset value of 0.041667 (=1.0/24). It follows that the offset value "0.0006712962962963" shown on line 2 is 58 seconds (=24×0.0006712962962963×3600). That is, the display times for the pictures of the picture files in the sub-folder named "euran" are obtained by adding 58 seconds to their photographed dates and times.

Line 3 shows the photographer name "nishy" and line 4 indicates the offset value "0.0000000000000000" for the picture group associated with the photographer "nishy." Line 5 shows the photographer name "ryom" and line 6 indicates the offset value "0.0002546296296296" for the picture group associated with the photographer "ryom." Line 7 shows the photographer name "ykoba" and line 8 indicates the offset value "0.0002546296296296" for the picture group associated with the photographer "ykoba."

The offset value updating device 162 acquires the setting file shown in FIG. 19 illustratively from the setting file recording device 94 and establishes an offset value for each picture group. For example, the offset value updating device 162 may set an offset value of "0.0006712962962963" for the picture group associated with the photographer "euran," "0.0000000000000000" for the picture group associated with the photographer "nishy," "0.0002546296296296" for the picture group associated with the photographer "ryom," and "0.0002546296296296" for the picture group associated with the photographer "ykoba."

Back in the flowchart of FIG. 18, the user, having established the offset value for each picture group, operates the input device 36 to designate (i.e., select) one top folder. In so doing, the user gives an instruction to display pictures in the area 502 on the WaiWai View display screen 501 (FIG. 16). In step S32, the lineup display control device 96 performs a WaiWai View displaying process which will be discussed later in detail. In carrying out the WaiWai View displaying process, the lineup display control device 96 acquires picture files from the recording device 38 and causes the pictures of the acquired files to be displayed in the area 502 on the WaiWai View display screen 501 shown in FIG. 16.

In step S33, the time correction device 147 checks to determine whether a change in the offset value is designated by the user.

Illustratively, with the WaiWai View display screen 501 displayed as shown in FIG. 16, the user may operate the input device 36 to select (i.e., operate) the button 507 or 508 or to perform a drag operation to move a picture displayed in the area 502. In response to the user's operation, the input device 36 supplies the time correction device 147 with an input signal designating the moved picture and indicating the distance traveled by the picture in question. Given such an input signal from the input device 36, the time correction device 147 determines that an offset value change has been designated.

If it is determined in step S33 that no offset value change has been designated, step S37 is reached.

If in step S33 an offset value change is found to be designated, step S34 is reached for the change to be made. In step S34, the time correction device 147 creates information for identifying the picture group whose offset value is to be changed as well as information for specifying the amount of change in the offset value for the picture group of interest, on the basis of the input signal designating the moved picture and indicating the distance traveled by the picture in question, which came from the input device 36.

Illustratively, suppose that the user operates the input device 36 to move the picture 505-6 in FIG. 16. In that case, the time correction device 147 receives an input signal from the input device 36 and, based on the received signal, creates information indicating that the picture group whose offset value is to be changed is associated with the photographer "ryom" (i.e., the picture group containing the pictures is specific to the photographer named "ryom") as well as information designating the amount of change in the offset value for the picture group associated with the photographer "ryom"; the offset value change reflects the distance traveled by the picture 505-6. The time correction device 147 supplies the created information designating the picture group and information specifying the offset value change to the data management device 141 via the control device 142.

In step S35, the offset value updating device 162 in the data management device 141 updates the stored offset value based on the information designating the picture group and on the information specifying the offset value change coming from the time correction device 147. More specifically, the offset value updating device 162 updates the offset value by adding the value defined by the information designating the offset value change to the offset value for the picture group identified by the information for picture group identification. It follows that every time the user designates a change in the offset value (i.e., display time) for a given picture group, the offset value for that group is supplemented with the value defined by the information designating the offset value change reflecting the user's operation.

Suppose now that the picture group identified by the information for picture group identification is associated with the photographer "ryom"; that the amount of change in the offset value reflecting the information for designating the offset value change is "0.00001"; and that the offset value updating device 162 retains an offset value of "0.00002546296296296" for the picture group associated with the photographer "ryom." In this case, the offset value updating device 162 updates the offset value for the picture group associated with the photographer "ryom" in such a manner that the stored offset value "0.0002546296296296" is supplemented with the amount of change "0.00001" determined by the information for designating the offset value change, to become "0.0002646296296296 (=0.00001+0.0002546296296296)."

After the offset value updating device 162 updates the offset value, the data management device 141 supplies the updated offset value to the search device 144 via the control device 142 and display area allocation device 143. Given the updated offset value from the data management device 141, the search device 144 searches for the pictures to be redisplayed on the basis of the display picture list, display range information, and allocation information supplied from the display area allocation device 143 in step S32 and in accordance with the updated offset value supplied from the data management device 141. Based on the result of the search, the search device 144 notifies the rendering control device 145 of the pictures to be redisplayed and of the display positions where they are to appear.

When notified by the search device 144 of the pictures to be redisplayed and of the positions for revised picture display, the rendering control device 145 in step S36 redisplays the pictures of the picture group whose offset value has been changed. Illustratively, the rendering control device 145 acquires from the picture file recording device 91 in the recording device 38 the picture files of the pictures designated by the search device 144. The rendering control device 145 sends the acquired picture files to the output device 37 and causes the device 37 to redisplay the pictures in the positions designated by the search device 144 in the area 502 on the WaiWai View display screen 501.

Step S37 is reached after the pictures have been redisplayed in step S36 or if no offset value change is found to be designated in step S33. In step S37, the data management device 141 checks to determine whether the user has designated picture file output.

Illustratively, with the input/output screen 301 displayed as shown in FIG. 7, the user may operate the input device 36 to select the button 314 and designate the picture files to be output (i.e., exported) and the destination to which to output (export) the designated picture files from the removable media 51 or the like. Alternatively, with the WaiWai View display screen 501 displayed as shown in FIG. 16, the user may operate the input device 36 to select the button 516 and designate the picture files to be output and the destination to which to output the designated picture files. In such cases, the input device 36 supplies the data management device 141 with an input signal indicating the picture files designated by the user to be output and the destination to which to output the designated picture files. Illustratively, the data management device 141 determines that the user has designated picture file output upon receiving from the input device 36 an input signal indicating the picture files designated to be output and the destination to which to output the designated picture files.

If it is determined in step S37 that picture file output is not designated, step S40 is reached.

If in step S37 picture file output is found to be designated, step S38 is reached for the user-designated picture files to be output. Based on the input signal supplied from the input device 36 by the user indicating the picture files designated to be output and the destination to which to output the designated picture files, the data management device 141 corrects the created dates and times of the designated picture files, their last changed dates and times, and their photographed dates and times.

Illustratively, in accordance with the input signal supplied from the input device 36 by the user indicating the picture files destined for output and the destination to which to output the files, the data management device 141 acquires the picture files designated by the user for output (i.e., export) from the picture file recording device 91 in the recording device 38. In reference to the offset value kept in the offset value updating device 162, the data management device 141 corrects (i.e., updates) the created dates and times of the acquired picture files, their last changed dates and times, and their photographed dates and times as part of the additional information about the acquired files.

For example, the data management device 141 may update the additional information about the picture files by adding the time defined by the offset value to the created dates and times of the picture files, their last changed dates and times, and their photographed dates and times prior to correction, thereby establishing the created dates and times of the picture files, their last changed dates and times, and their photographed dates and times, all corrected by offset. After correcting the additional information about the picture files, the data management device 141 sends the picture files together with their corrected additional information to the recording device 38. The recording device 38 records the received files to the picture file recording device 91 independently of the original picture files with their additional information uncorrected. After causing the recording device 38 to record the picture files with their additional information corrected, the data management device 141 designates the picture files to be output (exported) and the destination to which to output the picture files, and instructs the data control device 71 to output the designated picture files accordingly.

After the data management device 141 gives the data control device 71 the instruction to export the picture files, step S39 is reached. In step S39, the input/output control device 123 (FIG. 3) in the data control device 71 acquires the picture files being instructed to be export by the data management device 141 and being corrected their additional information from the picture file recording device 91 in the recording device 38 and outputs the acquired picture files to the designated destination. For example, the input/output control device 123 supplies the picture files acquired from the recording device 38 to the removable media 51 for storage thereon or back to the recording device 38 for recording to the location therein designated as the output destination.

Illustratively, the input/output control device 123 may record the designated picture files to the output destination (e.g., removable media 51) as follows: detects an available capacity of the recording area at the output destination (e.g., removable media 51) designated by the data management device 141; in keeping with a constraint described later, changes the sizes of the picture files with their additional information corrected, which instructed by the data managing device 141 to acquire from the picture file recording device 91, or changes the sizes of the pictures in the picture files; and records the changed files to the output destination. The constraint mentioned above is that the total file size of the designated picture files does not exceed the available capacity of the recording area at the output destination.

Alternatively, the information processing apparatus 11 may record as part of its media lineup information the information representing the sizes of stored picture files, the sizes of the pictures in the stored picture files, or the total size of the picture files prior to their output to pieces of removable media 51. Every time picture files are to be output to a given piece of removable media 51, the information processing apparatus 11 may reference the media lineup information and accordingly change the sizes of the pictures in the picture files of interest or the sizes of these picture files before recording the files to the output destination on the removable media 51.

As another alternative, the information processing apparatus 11 may reference the media detail information in the media detail information recording device 92 and the media lineup information in the media lineup information recording device 93, perform a picture recognizing process, and search through the pictures of the user-designated output-bound picture files for pictures that are similar to a given picture taken by the photographer determined by the ID for identifying the piece of removable media 51 established as the output destination. The picture files of the pictures thus detected may either be prevented from getting output or be output preferentially.

After outputting (i.e., exporting) the picture files in question, the input/output control device 123 creates information indicating the exported picture files, sends the created information to the media information management device 122, and instructs the device 122 to update the media detail information. Given the instruction from the input/output control device 123, the media information management device 122 causes the recording device 38 to update the media detail information in the media detail information recording device 92 based on the information indicating the exported picture files.

On the basis of the information about the exported picture files, the medial information management device 122 updates the media detail information (shown in FIG. 14) illustratively in such a manner that the input/output flag of each output picture file will be set to "01" or "11."

Step S40 is reached after the picture files have been output in step S39 or if it is determined in step S37 that picture file output is not designated. In step S40, the data management device 141 (FIG. 4) checks to determine whether or not picture lineup display is designated to terminate.

Illustratively, the user may operate the input device 36 to select the button 517 on the WaiWai View display screen 501 shown in FIG. 16. The user's operation causes the input device 36 to supply the data management device 141 with an input signal indicating that the button 517 has been selected. Given the input signal designating selection of the button 517, the data management device 141 determines that picture lineup display is designated to terminate.

If in step S40 picture lineup display is not found to be designated to terminate, step S33 is reached and the subsequent steps are repeated as described above.

If in step S40 the data management device 141 finds that picture lineup display is designated to end, step S41 is reached. In step S41, the offset value updating device 162 in the data management device 141 sends the stored offset value to the recording device 38. In turn, the setting file recording device 94 in the recording device 38 updates the stored setting file to reflect the received offset value. This terminates the setting file updating process.

As described above, when the user operates the input device 36 to select the button 507 or 508 or to drag a given picture, the information processing apparatus 11 corrects the display times of the displayed pictures and causes the pictures to be redisplayed in a manner reflecting the corrected display times. When the user designates picture file output, the information processing apparatus 11 corrects the additional information about the user-designated picture files on the basis of the stored offset value before recording the files to the user-designated output destination.

The display times of pictures are corrected as instructed by the user. By operating the input device 360, the user may simply select buttons or drag pictures to visually correct discrepancies in display times between the pictures displayed on the WaiWai View display screen 501; the discrepancies are primarily attributable to different imaging devices used to take pictures.

The offset value corrected as instructed by the user is stored, and, on the basis of the stored offset value, the additional information about the user-designated picture files is corrected to reflect the stored offset value so that the picture files may be output with their additional information corrected. With this feature in effect, the user need only select buttons or drag pictures visually to correct unsynchronized time information as part of the additional information about the picture files to be exported, the unsynchronized times being derived mainly from different imaging devices used to take pictures.

In the foregoing description, the information processing apparatus 11 was shown storing setting files (i.e., offset values) and updating (i.e., correcting) chronological information as part of the additional information about the picture files designated to be output. Alternatively, when the user designates a display time change (update), the information processing apparatus 11 may not update the offset values but directly rewrite the chronological information included in the additional information about the picture files (e.g., photographed dates and times of the pictures as part of the EXIF information).

Described below with reference to the flowchart of FIG. 20 is the WaiWai View displaying process corresponding to step S32 in FIG. 18. The process is carried out as follows:

The setting file is acquired from the recording device 38, and an offset value is established for each of the picture groups involved. The user may operate the input device 36 illustratively to select the button 516 thereby designating one top folder and issuing an instruction to display a lineup of pictures. This causes the input device 36 to supply the data management device 141 with an input signal giving the instruction to display a picture lineup.

Given the input signal from the input device 36 with the instruction to perform a picture lineup display, the data management device 141 goes to step S61. In step S61, the picture information holding device 161 in the data management device 141 acquires the picture files under the user-designated top folder from the picture file recording device 91 of the recording device 38.

Illustratively, suppose that the user operates the input device 36 to designate a picture lineup display from the top folder containing the sub-folders "euran," "nishy," "ryom" and "ykoba." In this case, the picture information holding device 161 acquires the picture files in the sub-folders "euran," "nishy," "ryom" and "ykoba" from the picture file recording device 91.

Based on the acquired picture files, the picture information holding device 161 creates and holds picture information including the names of the picture files in question, paths to the picture files, and additional information about the picture files. Illustratively, the picture information holding device 161 creates picture information about each acquired sub-folder that accommodates picture files.

In step S62, on the basis of the picture information held by the picture information holding device 161, the list creation device 163 creates a display picture list of the pictures in each picture group to be displayed in the area 502 on the WaiWai View display screen 501 (i.e., display picture list of each picture group).

For example, the list creation device 163 creates a display picture list for the group of pictures stored in the sub-folder "euran" based on the picture information held by the picture information holding device 161. In this case, the list creation device 163 may create a display picture list including information indicative of the paths to the picture files contained in the sub-folder "euran" and the photographed dates and times of the pictures involved. If picture files have no information indicating their photographed dates and times (i.e., time information as part of the EXIF information), the list creation device 163 creates a display picture list including information representative of the last changed dates and times or the created dates and times of the picture files in place of their photographed dates and times.

As a result, the display picture list for the group of picture files contained in, for example, the sub-folder "euran" includes as many list items as the number of the picture files found in that sub-folder "euran." Each list item includes information indicative of the path to a single picture file and the photographed date and time of the picture in that picture file.

In step S63, the list creation device 163 sorts (reorders) the list items in the created display picture list by the time indicated by information composed of the photographed dates and times contained in the list items. For example, the list creation device 163 may reorder the list items in the display picture list as following manner: among the list items of the display picture list, the list item including the time, which is indicated by the information designating the photographed date and time stored in the list item thereof and is oldest photographed date and time (relative to the current time), comes on top of the display picture list; and the list items line with their time information designated by the photographed date and time stored in the list item thereof beginning with chronologically oldest.

After the display picture list is sorted by the list creation device 163, the data management device 141 supplies the control device 142 with the offset value stored in the offset value updating device 162 as well as the picture display list with its picture groups sorted by the list creation device 163.

When the display picture list of the picture group and the offset value are sent from the data management device 141 to the control device 142, step S64 is reached. In step S64, the control device 142 creates display range information indicative of the range of display times for the pictures to be displayed, in reference to the picture information and offset value stored (held) by the data management device 141.

Illustratively, suppose that on the WaiWai View display screen 501 in FIG. 16, the width of the area 502 in the horizontal direction corresponds to a time period of 10 minutes and that, among the picture display times (i.e., times obtained by adding the offset-adjusted time to the photographed dates and times of the pictures involved) included in the picture information stored in the data management device 141, the oldest of the picture display times (relative to the current time) as part of the picture information held by the data management device 141 is 13:40 on Sep. 8, 2004. In that case, the control device 142 creates display range information indicating that the display times for the pictures to be displayed range from 13:40 on Sep. 8, 2004, to 13:50 on Sep. 8, 2004.

In another example, it is also assumed that on the WaiWai View display screen 501 in FIG. 16, the width of the area 502 in the horizontal direction corresponds to the time period of 10 minutes and that the oldest of the picture display times as part of the picture information held by the data management device 141 is 13:40 on Sep. 8, 2004. In such a case, the control device 142 may alternatively create display range information indicating that the display times for the pictures to be displayed range from 13:35 on Sep. 8, 2004, to 13:45 on Sep. 8, 2004.

After creating the display range information, the control device 142 supplies the display area allocation device 143 with the display picture list of the picture group in question, the offset value, and the created display range information.

In step S65, the display area allocation device 143 allocates a picture display area for each photographer in reference to the picture information held by the picture information holding device 161. That is, by referencing the picture information, the display area allocation device 143 allocates a picture display area for each picture group (i.e., photographer) in the display picture list and creates allocation information indicative of the display area allocated for each picture group.

For example, suppose that the picture information holding device 161 holds picture information about each of the picture files in the sub-folders "euran," "nishy," "ryom" and "ykoba." In this case, the display area allocation device 143 referencing the picture information allocates the area 502-1 on the WaiWai View display screen 501 in FIG. 16, for the picture group in the sub-folder "euran" specific to the photographer named "euran"; the allocated area 502-1 displays the pictures of the picture files stored in the sub-folder "euran."

Likewise, the display area allocation device 143 allocates the area 502-2 for the picture group in the sub-folder "nishy," the area 502-3 for the picture group in the sub-folder "ryom," and the area 502-4 for the picture group in the subfolder "ykoba." The display area allocation device 143 proceeds to create allocation information indicating that the area 502-1 is allocated as the display area for the picture group in the sub-folder "euran."

After creating the allocation information, the display area allocation device 143 supplies the search device 144 with the created allocation information along with the display picture list for the picture group in question, the offset value, and the display range information sent from the control device 142.

In step S66, on the basis of the display picture list for the picture group in question, offset value, and display range information sent from the display area allocation device 143, the search device 144 searches for pictures within the display range defined by the display range information in the display picture list.

Illustratively, if the chronological display range defined by the display range information is from 13:40 on Sep. 8, 2004, to 13:50 on Sep. 8, 2004, then the search device 144 searches through the display picture list for the list items with their times (display times) ranging from 13:40 to 13:50 on Sep. 8, 2004, the display times being obtained by adding the offset-adjusted time to the photographed dates and times of the list items. In this manner, the search device 144 searches for and acquires the pictures that fall within the display range designated by the display range information.

In step S67, the search device 144 checks to determine whether or not any pictures have been found from within the display range defined by the display range information. If in step S67 no picture applicable to the display range is found, then there is no picture to be displayed. In that case, steps S68 through S71 are skipped and step S33 in FIG. 18 is reached.

If in step S67 pictures falling within the display range have been found, then step S68 is reached in which the pictures of the list items in the display picture list are displayed. In step S68, the search device 144 reads from the display picture list the first of the list items indicative of the pictures within the display range based on the result of the search for the pictures.

Illustratively, it might happen that the third through the fifth list items from the top of the display picture list are found to fall within the display range. In such a case, the search device 144 reads the third list item from the top of the display picture list.

In step S69, the search device 144 notifies the rendering control device 145 of the picture to be displayed and of the position in which to display the picture.

Illustratively, the search device 144 creates display picture information including the display time, i.e., time obtained by adding the offset-adjusted time to the photographed date and time found in the retrieved list item, the path to the picture file contained in the retrieved list item, and the allocation information sent from the display area allocation device 143. The search device 144 supplies the rendering control device 145 with the created display picture information thereby designating the picture to be displayed and the position in which to display the picture.

In step S70, the rendering control device 144 causes the pictures designated by the search device 144 to be displayed. Illustratively, on the basis of the display picture information supplied from the search device 144, the rendering control device 145 references the paths to the picture files included in the display picture information and acquires the picture files of the display-destined pictures from the picture file recording device 91 in the recording device 38. The rendering control device 145 supplies the acquired picture files to the output device 37 and, based on the picture display times and allocation information included in the display picture information, causes the output device 37 to display the pictures of interest in the area 502 on the WaiWai View display screen 501.

Suppose that the area 502-1 in FIG. 16 is allocated for the picture group of the pictures designated by the search device 144 and that the picture display time designated by the search device 144 is 17:23 on Sep. 8, 2004. In such a case, the rendering control device 145 causes the picture designated by the search device 144 to be displayed in that position of the area 502-1 which is determined by the display time of that picture. As a result, the area 502-1 on the WaiWai View display screen 501 displays the picture 503-2 as shown in FIG. 16.

In step S71, the search device 144 checks to determine whether or not the list item next to the currently retrieved list item falls within the display range. For example, it might happen that the third through the fifth list items from the top of the display picture list fall within the display range and that the last (i.e., most recently) retrieved list item is the third item from the top of the display picture list. In that case, the fourth list item next to the third item from the top of the display picture list falls within the display range, so that the search device 144 determines that the picture of the next list item is included in the display range.

If in step S71 the picture of the next list item is found included in the display range, step S72 is reached so that the picture of the next list item may be displayed in the area 502 on the WaiWai View display screen 501. In step S72, the search device 144 reads from the display picture list the list item next to the last (most recently) retrieved list item based on the result of the search for pictures falling within the display range. With the next list item retrieved, step S69 is reached again and the subsequent steps are repeated as described above.

If in step S71 the picture of the next list item is not found to fall within the display range, that means all pictures to be displayed in the area 502 on the WaiWai View display screen 501 have been displayed. In that case, control is passed on to step S33 in FIG. 18.

The above-described WaiWai View displaying process is carried out for each of the sub-folders that come under the top folder designated by the user. Suppose that the user operates the input device 36 to designate a picture lineup display by specifying the top folder that contains the sub-folders "euran," "nishy," "ryom" and "ykoba." In such a case, the lineup display control device 96 creates a display picture list for each sub-folder and, based on the created display picture list, causes the applicable pictures to be displayed on the WaiWai View display screen 501.

The lineup display control device 96 thus creates display picture lists one after another and thereby displays the sub-folder-specific pictures in their respective areas. Illustratively, a display picture list of the pictures in the picture files held in the sub-folder "euran" is created and these pictures are displayed in the area 502-1; a display picture list of the pictures in the picture files kept in the sub-folder "nishy" is created and these pictures are displayed in the area 502-2; a display picture list of the pictures in the picture files retained in the sub-folder "ryom" is created and these pictures are displayed in the area 502-3; and a display picture list of the pictures in the picture files contained in the sub-folder "ykoba" is created and these pictures are displayed in the area 502-4.

As described, the lineup display control device 96 creates the display picture list specific to each sub-folder, and displays chronologically the pictures taken by each photographer in the area allocated for each photographer on the WaiWai View display screen 501.

When the pictures taken by individual photographers are displayed chronologically in the area allocated for each photographer on the WaiWai View display screen 501, the pictures can be displayed more effectively than before. Because it is possible to display similar pictures taken by different photographers in a simultaneous and chronologically sorted manner, the user can visually recognize how the groups of pictures taken by the diverse photographers are related to one another chronologically (i.e., in terms of photographed dates and times).

When the user is presented with a lineup of chronologically displayed pictures taken by different photographers, the user will have revelations. For example, after returning from outings with other photographers, the user may well discover that each photographer has distinctly different preferences. By viewing the pictures taken by the fellow photographers on the road, the user can vividly recall the atmosphere of the locations where the photo-taking sessions took place. If the photographers at some point acted not in groups but individually, each user later viewing synchronously the pictures they separately took can still feel they shared the same time and space.

The user may designate a change of the time range within which to display pictures in the area 502 illustratively using the input device 36 to operate the button 510 or 511, scroll bar 512, or slider bar 513 on the WaiWai View display screen 501 in FIG. 16. In that case, the information processing apparatus 11 changes the time range for the pictures to be displayed in the area 502 in a manner reflecting the user's operation. Pictures are then redisplayed in the area 502 in keeping with the changed display time range.

For example, the user may give an instruction to change the display time range by operating the input device 36. In such a case, the input device 36 supplies the display range correction device 146 with an input signal reflecting the user's operation. Based on the input signal coming from the input device 36, the display range correction device 146 creates display range correction information and sends the created information to the control device 142.

On the basis of the display range correction information coming from the display range correction device 146, the control device 142 creates display range information anew and sends the created information to the search device 144 via the display area allocation device 143. In accordance with the display picture list of the picture group of interest, the offset value for the picture group, and the display range information sent anew from the control device 142, the search device 144 searches the display picture list for pictures that fall within the display range designated by the display range information. The search device 144 then designates the pictures to be displayed and the positions in which to display the pictures in question for the rendering control device 145. The rendering control device 145 causes the designated pictures to be redisplayed in the area 502.

Figure 21B:
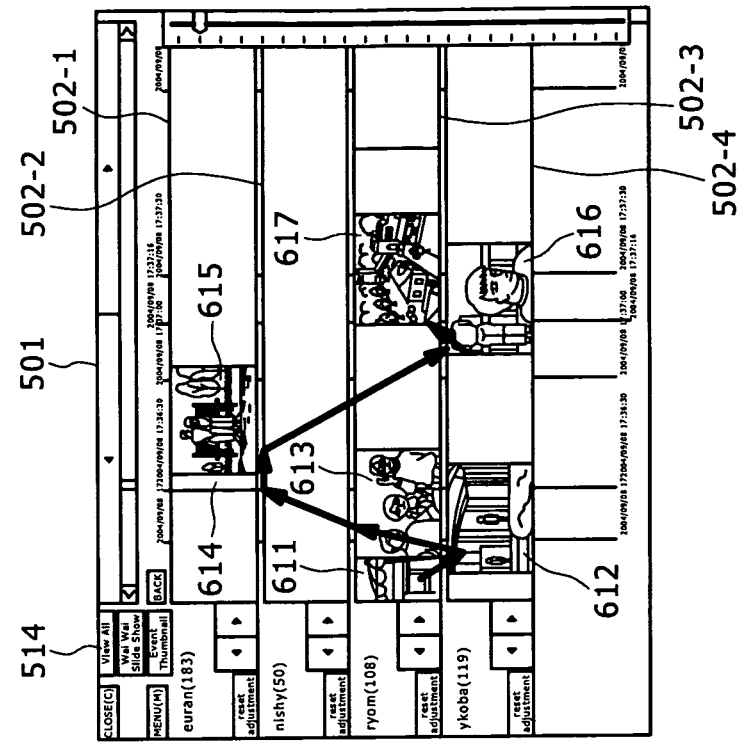
FIGS. 21A and 21B are schematic views explanatory of a blanket slide show display screen.
Figure 21A:
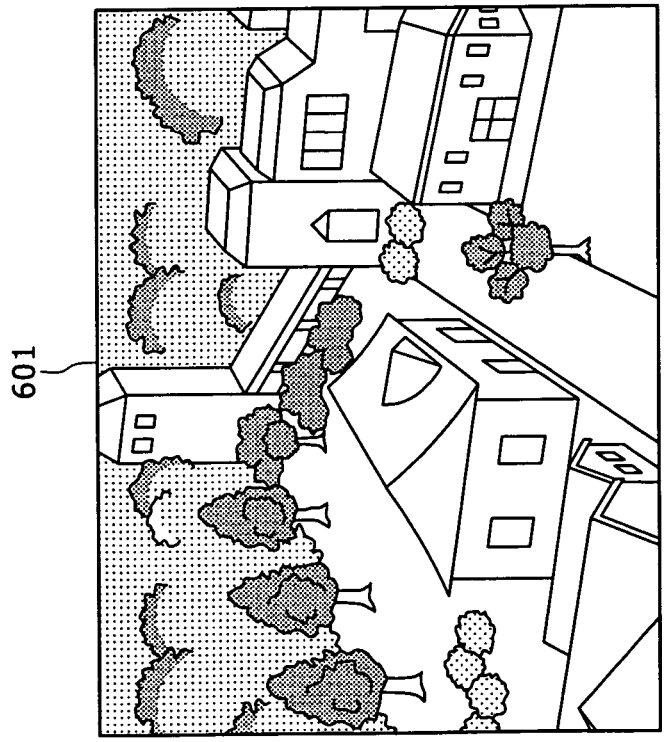

If the user selects the button 514 on the WaiWai View display screen 501, the time-series display control device 97 in the display control device 72 causes the pictures taken by different photographers indicated on the WaiWai View display screen 501 to be displayed one at a time. For example, the output device 37 is caused to display a blanket slide show display screen 601 as shown in FIG. 21A.

The blanket slide show display screen 601 chronologically displays the pictures one by one, which were taken by the photographers indicated on the WaiWai View display screen 501. Suppose that on the WaiWai View display screen 501, pictures 614 and 615 are displayed in the area 502-1, pictures 611, 613 and 617 in the area 502-3, and pictures 612 and 616 in the area 502-4; and that the pictures 611 through 617 appear in chronological order of their display times, as shown in FIG. 21B. In that case, if the user selects the button 514, then the pictures 611 through 617 are displayed one at a time, in the order indicated by the arrow in FIG. 21B, on the blanket slide show display screen 601.

Figure 22:
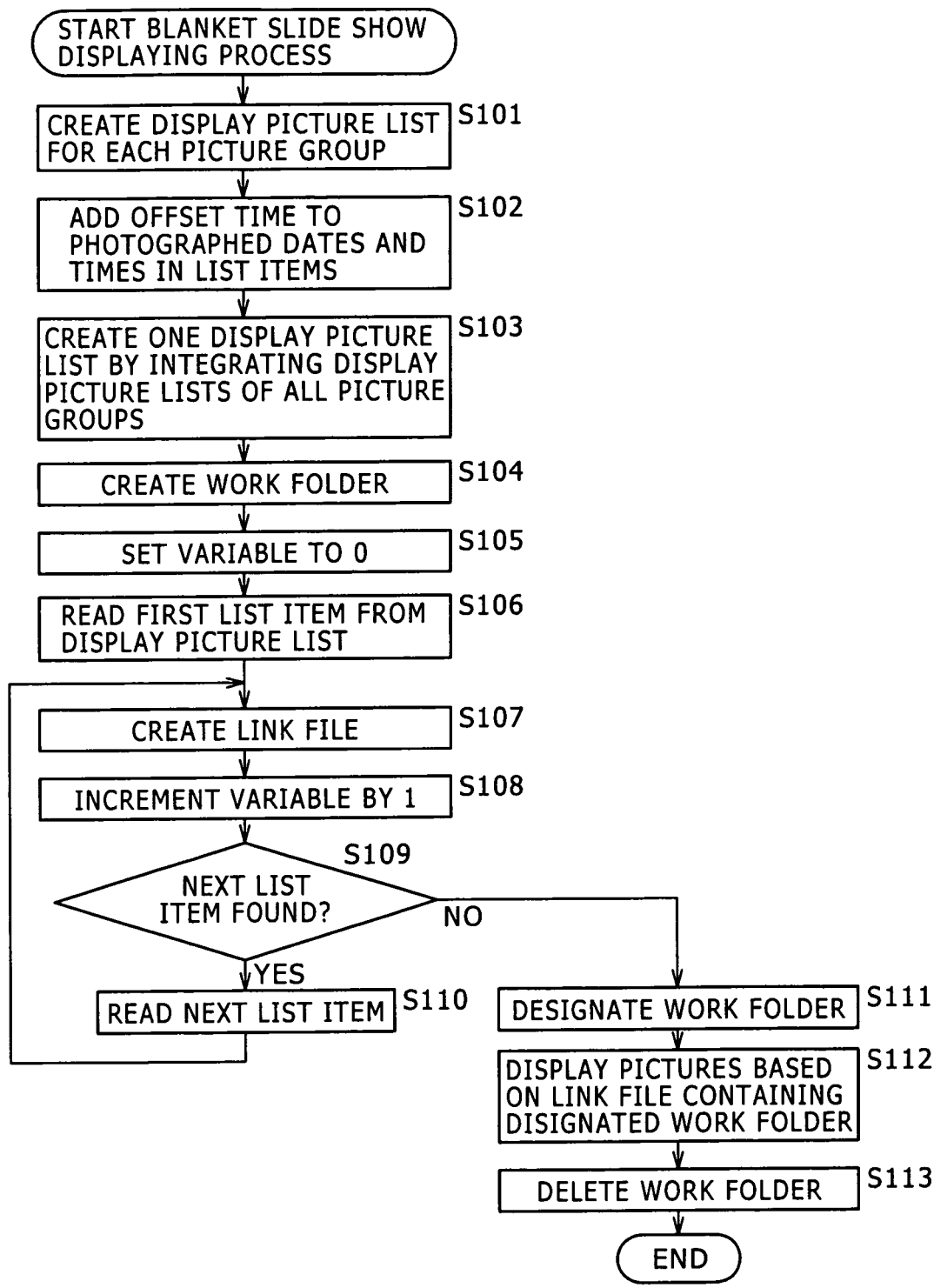
FIG. 22 is a flowchart of steps constituting a blanket slide show displaying process.

Described below with reference to the flowchart of FIG. 22 is a blanket slide show displaying process whereby pictures are displayed on the blanket slide show display screen 601. The process is carried out as follows:

When the user selects the button 514 on the WaiWai View display screen 501 by operating the input device 36, the input device 36 sends to the time-series display control device 97 an input signal indicating that the button 514 has been selected.

When the input signal designating selection of the button 514 is sent from the input device 36 to the time-series display control device 97, step S101 is reached. In step S101, the photographer-specific list creation device 201 creates a display picture list for each picture group.

Illustratively, given the input signal from the input device 36, the list creation device 181 acquires picture information and offset values from the lineup display control device 96. Based on the acquired picture information, the photographer-specific list creation device 201 in the list creation device 181 creates a display picture list of the group of pictures in the picture files held in each sub-folder. At this point, the photographer-specific list creation device 201 creates a display picture list that includes the paths to the picture files in each sub-folder and their photographed dates and times.

As a result, the display picture lists are each arranged to contain as many list items as the number of the picture files included in the corresponding sub-folder. One list item includes information indicative of the path to a single picture file and the photographed date and time of the picture in that picture file. The photographer-specific list creation device 201 creates as many display picture lists as the number of pieces of picture information acquired form the lineup display control device 96. If the picture files have no information indicating their photographed dates and times, the photographer-specific list creation device 201 creates display picture lists each including information representative of the last changed dates and times or the created dates and times of the picture files in place of their photographed dates and times.

In step S102, the photographer-specific list creation device 201 adds the time defined by the offset value for each picture group acquired from the lineup display control device 96, to the photographed dates and times for the list items in the created display picture list.

Illustratively, when the photographer-specific list creation device 201 creates a display picture list of the group of pictures held in the sub-folder "euran," the photographer-specific list creation device 201 adds the time defined by the offset value for the picture group determined by the sub-folder "euran," to the photographed dates and times for the list items in that created display picture list.

In step S103, the integrated list creation device 202 creates a single display picture list by integrating the display picture lists created by the photographer-specific list creation device 201 for the picture groups involved.

For example, if the photographer-specific list creation device 201 has created four display picture lists (for the four picture groups), the integrated list creation device 202 creates a single display picture list (integrated display picture list) that includes all list items in the four picture lists. At this point, the integrated list creation device 202 arranges the list items chronologically in creating the integrated display picture list so that the list item having the oldest display time (i.e., least recent time relative to the current time) will come to the top of the list.

With the integrated display picture list created, the list creation device 181 gives the link file creation device 182 an instruction to create a link file. Given the instruction to create a link file from the list creation device 181, the link file creation device 182 goes to step S104. In step S104, the link file creation device 182 creates a work folder and sends the created folder to the link file storage device 96 of the recording device 38 for storage therein.

In step S105, the variable holding device 203 in the link file creation device 182 sets "0" to the variable that will become the name of the link file and retains the variable thus established.

In step S106, the link file creation device 182 reads the first list item from the top of the display picture list created by and stored in the integrated list creation device 202.

In step S107, the link file creation device 182 creates a link file which has as its link destination the path to the picture file contained in the retrieved list item and which takes as its file name the variable held by the variable holding device 203. The link file creation device 182 supplies the created link file to the link file storage device 95. The link file storage device 95 stores the supplied link file thus supplied.

In step S108, the variable holding device 203 increments by "1" the variable it holds.

In step S109, the link file creation device 182 checks to determine whether or not there exists a list item next to the last (i.e., most recently) retrieved list item in the integrated display picture list stored in the integrated list creation device 202.

If in step S109 the next list file is found to exist, that means not all list items have been retrieved yet. In that case, step S110 is reached. In step S110, the link file creation device 182 retrieves the next list item from the integrated display picture list stored in the integrated list creation device 202. Step S110 is followed by step S107 and the subsequent steps are repeated as described above.

If in step S109 the next list item is not found to exist, that means all list items have been read from the integrated display picture list and that the link file has been created. In this case, the link file creation device 182 generates a signal indicating that the link file has been created and supplies the generated signal to the list creation device 181. Step S109 is followed by step S111.

Given the signal indicating creation of the link file from the link file creation device 182, the list creation device 181 reaches step S111. In step S111, the list creation device 181 informs the reproduction control device 183 of the work folder created by the link file creation device 182 as a folder that accommodates the link file linked to the picture file containing the picture to be displayed.

In step S112, the reproduction control device 183 causes the blanket slide show display screen 601 to display pictures based on the link files stored in the work folder designated by the list creation device 181.

Illustratively, the reproduction control device 183 reads the link files written in the work folder designated by the list creation device 181 from the link file storage device 95 in chronological order of the file names, acquires from the picture file recording device 91 the picture files linked to the retrieved link files, and supplies the acquired picture files to the output device 37. On the basis of the supplied picture files, the reproduction control device 183 causes the output device 37 to display one picture after another at predetermined time intervals on the blanket slide show display screen 601. For example, the pictures in the picture files held in a plurality of sub-folders are displayed one by one in chronological order of the picture display times.

Programs for implementing the so-called slide show, i.e., the process of displaying pictures one by one from the picture files in a single folder, are in many cases capable of displaying the pictures in order of their file names or in chronological order of their photographed dates and times. For that reason, where the reproduction control device 183 is implemented by the CPU 31 executing a program, that program may be provided either as a dedicated program for carrying out the blanket slide show display or as a program for performing the existing slide show display.

When the pictures in the picture files linked to the link files held in the work folder have been displayed on the blanket slide show display screen 601, the user may operate the input device 36 to give an instruction to terminate the display of pictures on the screen 601. In response to the user's operation, the input device 36 supplies the link file creation device 182 with an input signal representing the instruction to terminate the display of pictures on the blanket slide show display screen 601.

Given from the input device 36 the input signal designating the end of picture display on the blanket slide show display screen 601, the link file creation device 182 reaches step S113. In step S113, the link file creation device 182 causes the recording device 38 to delete the work folder in the link file storage device 95 along with the link files held in the work folder. This completes the blanket slide show displaying process.

In the manner described, the time-series display control device 97 creates link files linked to the picture files of the pictures taken by different photographers shown on the WaiWai View display screen 501. The time-series display control device 97 then causes the pictures taken by the diverse photographers to be displayed one by one in chronological order of their display times.

Because the pictures taken by the various photographers are displayed one at a time in chronological order, it is possible to present the user with these pictures more effectively than before. The user can thus enjoy pictures taken by a plurality of photographers in the order in which they were taken.

In the foregoing description, the pictures taken by each photographer were shown to be displayed one by one chronologically in a manner determined by list items. Alternatively, of the pictures determined by the list items in the integrated display picture list, those similar to one another may be retrieved and put into a single group. The pictures in groups thus formed may then be displayed successively, one group at a time, on the blanket slide show display screen 601.

Illustratively, when the user selects the button 515 on the WaiWai View display screen 501, the photographer-specific display control device 98 in the display control device 72 causes a WaiWai slide show display screen to appear. This is a screen on which to display the pictures taken by different photographers shown on the WaiWai View display screen 501, in display areas allocated for each of the photographers involved.

For example, it might happen that the area 502 on the WaiWai View display screen 501 is displaying pictures taken by the photographers "euran," "nishy," "ryom" and "ykoba." In this case, the photographer-specific display control device 98 causes the output device 37 to display a WaiWai slide show display screen 641 shown in FIG. 23A.

In FIG. 23A, the WaiWai slide show display screen 641 provides four areas: an area 642-1 for displaying pictures taken by the photographer "euran," an area 642-2 for displaying pictures taken by the photographer "nishy," an area 642-3 for displaying pictures taken by the photographer "ryom," and an area 642-4 for displaying pictures taken by the photographer "ykoba." If there is no need to distinguish among the areas 642-1 through 642-4 in the description that follows, the areas will be simply referred to as the area 642.

In the top right corner of each of the areas 642-1 through 642-4 appears the name of the photographer ("euran," "nishy," "ryom" or "ykoba") who took the pictures to be displayed in the area in question. As illustrated, a picture 643 taken by the photographer "euran" is currently displayed in the area 642-1; a picture 644 taken by the photographer "ryom," in the area 642-3; and a picture 645 taken by the photographer "ykoba" in the area 642-4.

The pictures displayed in the area 642 are scaled down at predetermined time intervals at a predetermined rate. In FIG. 23A, the picture 645 is shown smaller than the picture 644, and the picture 643 is made to appear smaller than the picture 645. It can be seen that the pictures 643, 645, and 644 are displayed in that order in time-shifted fashion on the WaiWai slide shown display screen 641.

Illustratively, as shown in FIG. 23B, suppose that on the WaiWai View display screen 501, the area 502-1 displays the picture 643 and a picture 674; the area 502-3 displays the picture 644 and pictures 671, 673 and 675; and the area 502-4 displays the picture 645 and a picture 672; and that the pictures 671 through 674, 643, 645, 675, and 644 are arrayed from left to right in chronological order of their display times on the WaiWai View display screen 501. In such a case, if the user selects the button 515, the pictures 671 through 674, 643, 645, 675, and 644 are displayed in the area 642 on the WaiWai slide show display screen 641 one by one, in that order, as indicated by arrows in FIG. 23B.

For example, the picture 671 is first displayed in the area 642-3, the picture 672 in the area 642-4, and the picture 673 in the area 642-3. Then the picture 674 is displayed in the area 642-1, the picture 643 in the area 642-1, the picture 645 in the area 642-4, the picture 675 in the area 642-3, and the picture 644 in the area 642-3.

As a result, as indicated in FIG. 23A, the picture 645 that appeared earlier than the picture 644 is displayed in scaled-down form, currently shown smaller than the picture 644. Likewise the picture 643 that appeared earlier than the picture 645 is shown scaled down, currently appearing smaller than the picture 645.

Figure 24:
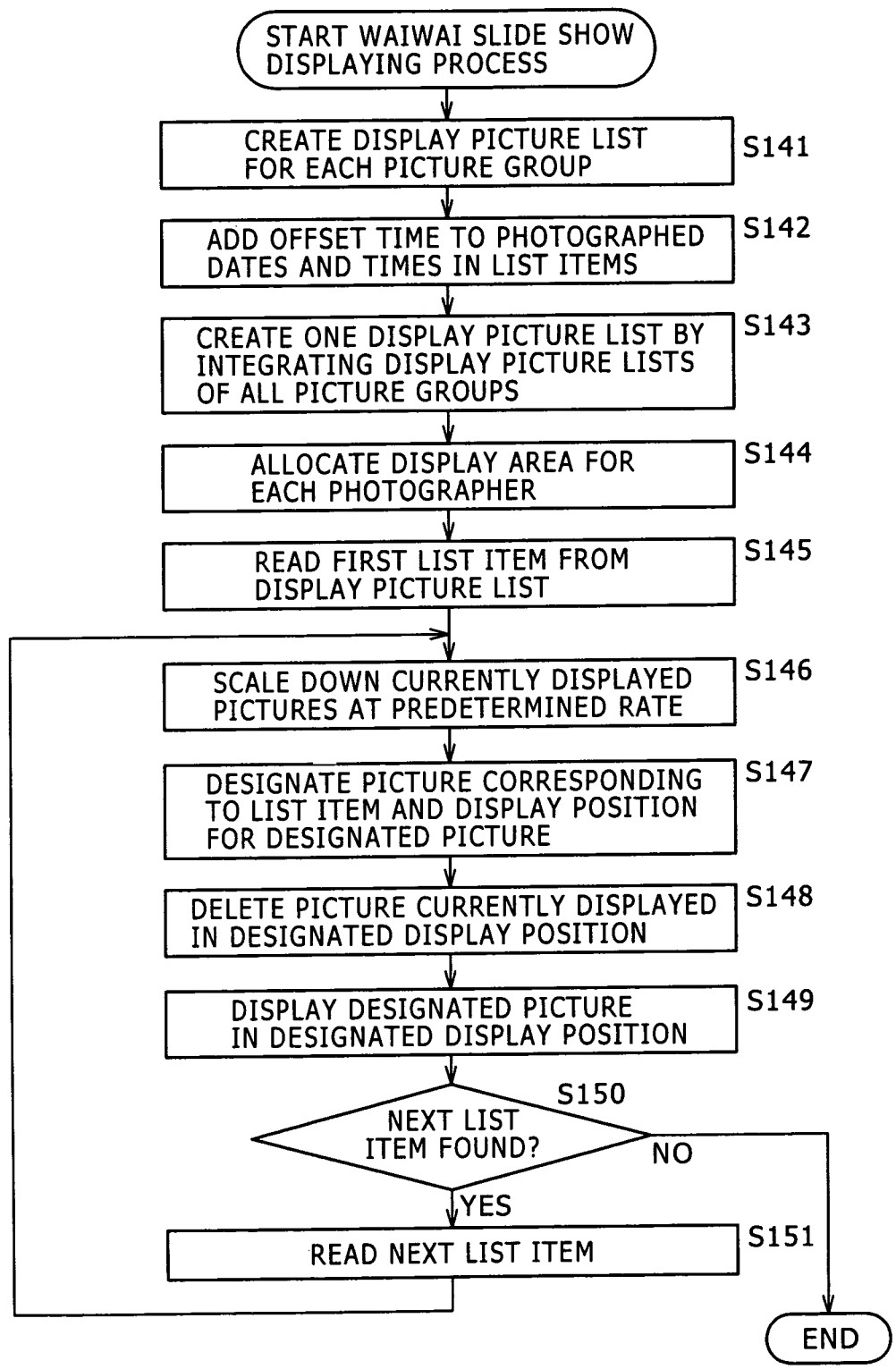
FIG. 24 is a flowchart of steps constituting a WaiWai slide show displaying process.

Described below with reference to the flowchart of FIG. 24 is a WaiWai slide show displaying process whereby pictures are displayed on the WaiWai slide shown display screen 641. The process is performed as follows:

The user selects the button 515 on the WaiWai View display screen 501 by operating the input device 36. In turn, the input device 36 supplies the photographer-specific display control device 98 with an input signal indicating that the button 515 has been operated.

When the input device 36 has sent to the photographer-specific display control device 98 the input signal indicating selection of the button 515, step S141 is reached. In step S141, the photographer-specific list creation device 241 creates a display picture list for each of the picture groups involved.

Illustratively, given the input signal from the input device 36, the list creation device 221 acquires picture information and offset values from the lineup display control device 96. On the basis of the acquired picture information, the photographer-specific list creation device 241 in the list creation device 221 creates display picture lists for the groups of picture files kept in sub-folders. In this case, the photographer-specific list creation device 241 typically creates display picture lists each including the paths to the picture files held in each sub-folder, information about the photographed dates and times of these picture files, and a group number identifying the group of the picture files kept in the sub-folder in question.

As a result, each display picture list typically includes as many list items as the number of the picture files contained in the corresponding sub-folder. Each list item includes the path to a single picture file, information about the photographed date and time of the picture in that picture file, and the group number identifying the picture group. The photographer-specific list creation device 241 creates as many display picture lists as the number of pieces of picture information acquired from the lineup display control device 96. If the picture files have no information indicating their photographed dates and times, the photographer-specific list creation device 241 creates display picture lists each including information representative of the last changed dates and times or the created dates and times of the picture files in place of their photographed dates and times.

In step S142, the photographer-specific list creation device 241 adds the time defined by the offset value for each picture group acquired from the lineup display control device 96, to the photographed dates and times for the list items in each display picture list thus created.

Illustratively, when the photographer-specific list creation device 241 creates a display picture list of the group of pictures held in the sub-folder "euran," the photographer-specific list creation device 241 adds the time defined by the offset value for the picture group determined by the sub-folder "euran," to the photographed dates and times for the list items in that created display picture list.

In step S143, the integrated list creation device 242 creates a single display picture list by integrating the display picture lists created by the photographer-specific list creation device 241 for the picture groups involved.

For example, if the photographer-specific list creation device 241 has created four display picture lists (for the four picture groups), the integrated list creation device 242 creates a single display picture list (integrated display picture list) that includes all list items in the four picture lists. At this point, the integrated list creation device 242 arranges the list items as following manner: the list item having the oldest display time (i.e., least recent time relative to the current time) being stored in the list item of the integrated display picture list comes on top of the display picture list; and the list items line with their display time stored in the list item thereof beginning with chronologically oldest.

When the integrated display picture list is created by the integrated list creation device 242, the list creation device 221 supplies the integrated display picture list to the display area allocation device 222.

In step S144, the display area allocation device 222 allocates a picture display area to each picture group (i.e., each photographer) in the display picture list based on the group number included in the display picture list supplied from the list creation device 221. The display area allocation device 222 thus creates allocation information indicating the display areas allocated to the respective picture groups. The display picture list and the allocation information are sent from the display area allocation device 222 to the reproduction control device 223.

For example, suppose that the display picture list includes the group number of the picture group identified by the photographer "euran," the group number of the picture group identified by the photographer "nishy," the group number of the picture group identified by the photographer "ryom," and the group number of the picture group identified by the photographer "ykoba." In such a case, the display area allocation device 222 may allocate the area 642-1 in FIG. 23A to the picture group associated with the photographer "euran," the area 642-2 to the picture group associated with the photographer "nishy," the area 642-3 to the picture group associated with the photographer "ryom," and the area 642-4 to the picture group associated with the photographer "ykoba," and creates allocation information reflecting what has thus been allocated.

In step S145, the reproduction control device 223 reads the first list item from the top of the display picture list sent from the display area allocation device 222.

After retrieving the first list item from the display picture list, the reproduction control device 223 gives the rendering control device 224 an instruction to display pictures in scaled-down form. In step S146, given the instruction for scaled-down picture display from the reproduction control device 223, the rendering control device 224 scales down the currently displayed pictures in the area 642 on the WaiWai slide show display screen 641.

Illustratively, if the output device 37 is currently displaying the WaiWai slide show display screen 641 shown in FIG. 23A, the rendering control device 224 causes the output device 37 to scale down each of the currently displayed pictures 643, 644 and 645 at a predetermined rate. Alternatively, the rendering control device 224 may delete (i.e., fade out) those of the pictures in the area 642 which have elapsed a predetermined time period since they were first displayed.

In step S147, the reproduction control device 223 informs the rendering control device 224 of the picture in the retrieved list item and of the position in which to display the picture on the basis of the display picture list and allocation information supplied from the display area allocation device 222.

Illustratively, the reproduction control device 223 may create display picture information including the path to the picture file contained in the retrieved list item and the position in which to display the picture designated by the allocation information. The reproduction control device 223 may then feed the created display picture information to the rendering control device 224 informing the device 224 of the picture to be displayed and of the position in which to display the picture.

When the picture to be displayed and the position in which to display the picture are designated, step S148 is reached. In step S148, the rendering control device 224 causes the output device 37 to delete the picture currently displayed in the position for the upcoming display of the picture specified by the reproduction control device 223.

For example, suppose that the position designated by the reproduction control device 223 for picture display is the area 642-1 on the WaiWai slide show display screen 641 in FIG. 23A and that the picture 643 is currently displayed in the area 642-1. In that case, the rendering control device 224 causes the output device 37 to delete the picture 643. If there is no picture currently displayed in the position designated by the reproduction control device 223 for picture display, the rendering control device 224 will do nothing to effect picture erasure.

In step S149, the rendering control device 224 causes the picture to be displayed in the position designated by the reproduction control device 223. Illustratively, based on the display picture information sent from the reproduction control device 223, the rendering control device 224 acquires the applicable picture file from the picture file recording device 91 in the recording device 38, supplies the acquired file to the output device 37, and causes the device 37 to display the picture in the position associated with the group number in question. This is how the picture is typically displayed in the area 642 on the WaiWai slide show display screen 641.

In step S150, the reproduction control device 223 checks to determine whether or not there exists a list item next to the last (i.e., most recently) retrieved list item in the display picture list.

If in step S150 the next list item is found to exist, that means not all list items have been retrieved yet. In that case, step S151 is reached. In step S151, the reproduction control device 223 retrieves the next list item from the display picture list. Control is then returned to step S146 and the subsequent steps are repeated as described above.

If in step S150 the next list item is not found to exist, that means all list items have been read from the display picture list for picture display. This completes the WaiWai slide show displaying process.

As described, the photographer-specific display control device 98 allocates for each photographer a picture display area in which to display the pictures taken by that photographer. On the WaiWai slide show display screen 641, pictures are then displayed in the area 642 allocated to each of the photographers involved.

Thus, pictures taken by different photographers are displayed side by side in chronological order in the photographer-specific display areas for more effective picture presentation. The user can enjoy the pictures taken by the multiple photographers concurrently and in chronological order of the photographed dates and times of these pictures.

In the foregoing description, a piece of removable media 51 was shown to be loaded into the information processing apparatus 11 so that picture files may be imported from the removable media 51 to the apparatus 11 or exported (i.e., recorded) from the apparatus 11 to the media 51. Alternatively, the information processing apparatus 11 may be connected with an imaging device such as a digital still camera or a camera-equipped mobile phone compatible with USB (Universal Serial Bus) mass storage class criteria, and picture files may be imported or exported between the apparatus 11 and the imaging device through the established connection.

In another example, the information processing apparatus 11 may be linked to an imaging device in ad hoc mode or through a Bluetooth (trademark) connection to let picture files be imported or exported wirelessly between the two. In the setup where the information processing apparatus 11 is connected wirelessly to the imaging device, there is no need for the user to load or unload the removable media 51 into or from the apparatus 11. It follows that the moment a picture is taken by the imaging device, the picture file created by the picture-taking action is imported from the imaging device to the information processing apparatus 11 on a real-time basis.

In yet another example, the information processing apparatus 11 may correct (i.e., change) the display times of the pictures displayed on the WaiWai View display screen 501 through a picture recognizing process. In this case, a plurality of photographers may take pictures of the same object (e.g., blue sky) at the same time with their own imaging devices. The picture files of the pictures thus taken are stored on the removable media 51 in the respective imaging devices. The removable media 51 may then be removed from the imaging devices and loaded into the information processing apparatus 11 to let the apparatus 11 import the picture files from the loaded media.

The information processing apparatus 11 then carries out the picture recognizing process to recognize the pictures taken concurrently by the multiple photographers as well as the display times of the recognized pictures. The information processing apparatus 11 proceeds to correct the offset value (display time) for the picture group associated with each of the photographers involved so that the display times of the recognized pictures will be synchronized among them.

Figure 25:
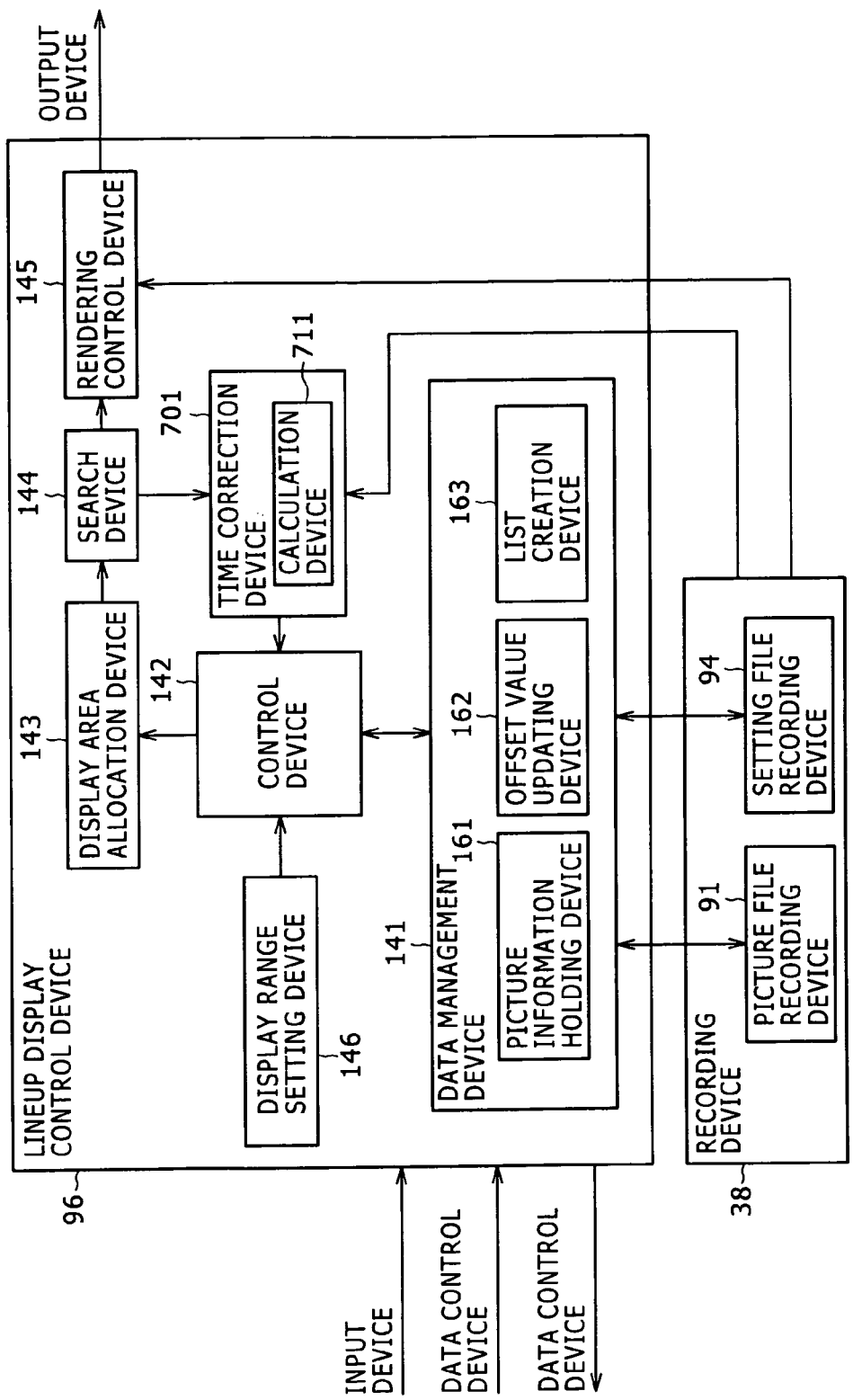
FIG. 25 is a block diagram showing another detailed structure of the lineup display control device.

In the foregoing example, the lineup display control device 96 may be structured illustratively as shown in FIG. 25. In FIG. 25, the data management device 141, control device 142, display area allocation device 143, search device 144, rendering control device 145, and display range correction device 146 are given the same reference numbers as their functionally equivalent counterparts in FIG. 4, and their descriptions will be omitted hereunder where redundant.

In the lineup display control device 96 of FIG. 25, a time correction device 701 replaces the time correction device 147 in the lineup display control device 96 of FIG. 4. The time correction device 701 searches for similar pictures by carrying out a picture recognizing process. The time correction device 701 includes a calculation device 711.

The time correction device 701 acquires display picture lists and offset values from the data management device 141 via the control device 142. Based on the acquired display picture lists, the time correction device 701 acquires picture files from the recording device 38 and, through the picture recognizing process, searches for and retrieves pictures which belong to different picture groups and which are similar to one another. On the basis of the offset values acquired from the data management device 141, the calculation device 711 in the time correction device 701 calculates the difference between the display time of one of the retrieved pictures regarded as a reference display time on the one hand, and the display times of the other retrieved pictures on the other hand. The difference is calculated as the amount of change in the offset value for each picture group. Information representing the calculated amount of change in the offset value is sent to the data management device 141 via the control device 142.

Figure 26:
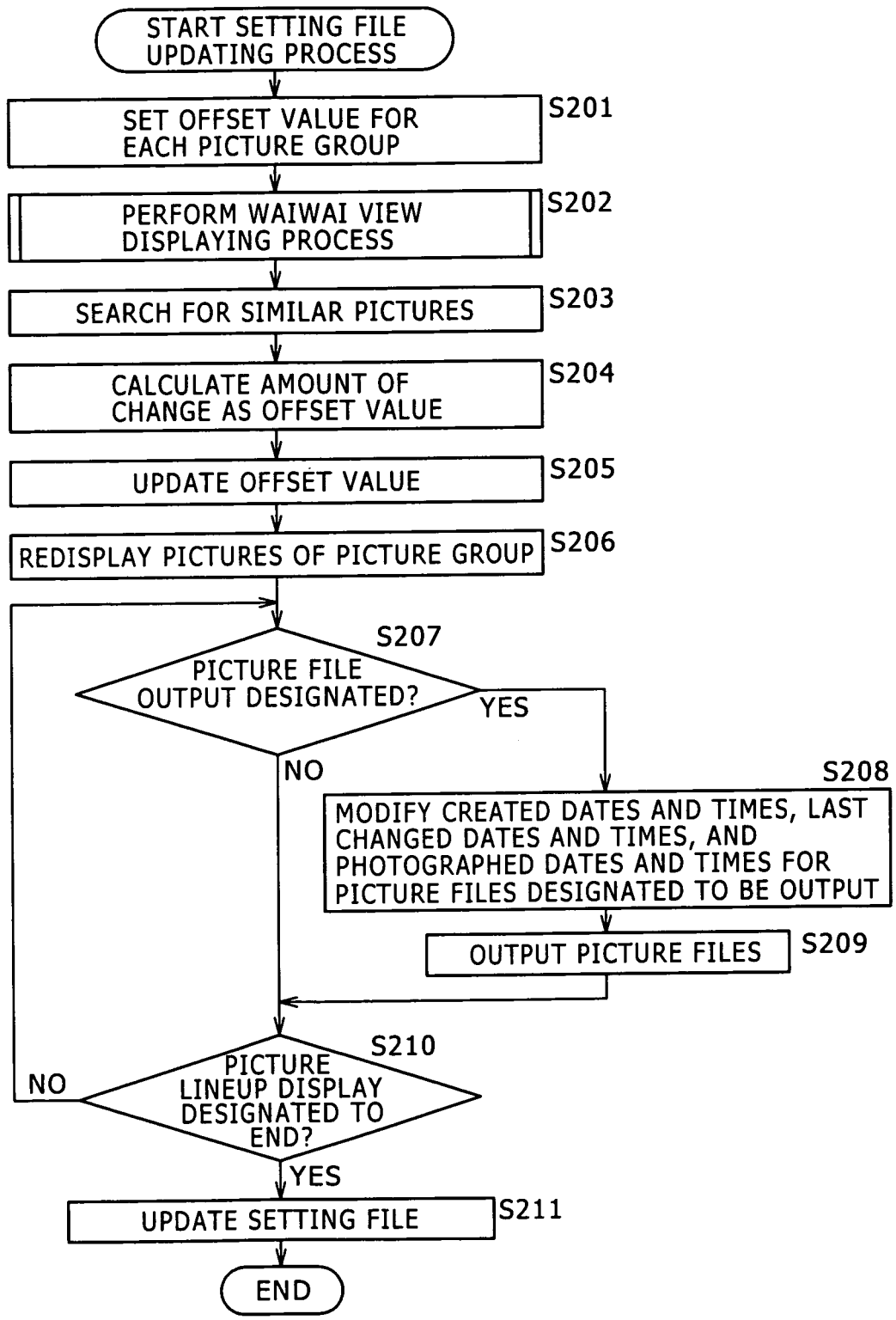
FIG. 26 is a flowchart of steps constituting a setting file updating process.

Described below with reference to the flowchart of FIG. 26 is a setting file updating process performed by the lineup display control device 96 shown in FIG. 25. Steps 201 and 202 in FIG. 26 are the same in function as steps S31 and S32 in FIG. 18 and thus will not be described further.

In step S203, the time correction device 701 acquires display picture lists and offset values from the control device 142, and searches for pictures that are similar to one another.

Illustratively, the time correction device 701 acquires display picture lists and offset values from the data management device 141 via the control device 142 and, based on the acquired display picture lists, obtains picture files from the recording device 38. If the time correction device 701 acquires from the recording device 38 the picture files kept in, for example, the sub-folders "euran," "nishy," "ryom" and "ykoba," the time correction device 701 searches through the pictures of the picture files in each of the sub-folders "euran," "nishy," "ryom" and "ykoba," for similar pictures that may be found in the other sub-folders.

In step S204, on the basis of the offset value acquired from the data management device 141, the calculation device 711 calculates the difference between the display time of one of the retrieved pictures regarded as a reference display time on the one hand, and the display times of the other retrieved pictures on the other hand. The difference is calculated as the amount of change in the offset value for each picture group. This step creates information representing the calculated amount of change in the offset value.

For example, suppose that the pictures 503-5, 504-3, 505-6, and 506-1 displayed in the area 502 on the WaiWai View display screen 501 in FIG. 16 have been retrieved as similar pictures. In that case, the calculation device 711 may regard the display time of the picture 505-6 as the reference and calculate the difference between the display time of the picture 505-6 and that of the picture 503-5. The calculated difference is taken as the amount of change in the offset value for the picture group associated with the photographer named "euran." The calculation device 711 thus creates information representing the amount of change in the offset value for the picture group specific to the photographer "euran."

Similarly the calculation device 711 calculates the difference between the display time of the picture 505-6 and that of the picture 504-3, and the difference between the display time of the picture 505-6 and that of the picture 506-1. Based on the differences thus calculated, the calculation device 711 creates information indicative of the amount of change in the offset value for the picture group associated with the photographer named "nishy" and of the amount of change in the offset value for the picture group associated with the photographer named "ykoba." The calculation device 711 sends the information thus created to represent the amount of change in the offset value for each of the picture groups to the data management device 141 via the control device 142.

In step S205, the offset value updating device 162 in the data management device 141 updates the stored offset values for the respective picture groups on the basis of the information indicating the amount of change in the offset value for each picture group; the information came from the time correction device 701. Step S205 is followed by steps S206 through S211. Steps S206 through S211 are the same in function as steps S36 through S41 in FIG. 18 and thus will not be discussed further.

In the manner described above, the lineup display control device 96 searches for similar pictures through picture recognition and corrects the offset values of the picture groups based on the result of the search.

When the lineup display control device 96 searches for similar pictures and, on the basis of the result, corrects the offset value of each picture group, the user need not operate buttons or controls on the WaiWai View display screen 501 in order to correct the display times of the displayed pictures.

Alternatively, the user may select pictures in their respective areas 502 on the WaiWai view display screen 501 so as to synchronize the display times of the selected pictures. For example, if the user wants to synchronize the display times of the pictures 503-5, 504-3 and 506-1 with the display time of the picture 505-6 in FIG. 16, the user may operate the input device 36 in order to select the pictures 503-5, 504-3 and 506-1 whose display times are to be corrected (i.e., changed) and also to select the picture 505-6 whose display time is regarded as the reference. By operating the input device 36, the user then selects the button 516 to give an instruction to correct the display times of the pictures 503-5, 504-3 and 506-1.

When the user operates the button 516 to designate correction (i.e., change) of the display times of the pictures 503-5, 504-3 and 506-1, the input device 36 supplies the time correction device 147 (FIG. 4) with an input signal designating the pictures whose display times are to be corrected along with the picture regarded as the reference. Given the input signal from the input device 36, the time correction device 147 creates information for specifying the picture groups whose offset values (i.e., display times) are to be corrected and information for designating the amount of change in the offset value for each picture group. The information thus created is forwarded to the data management device 141 via the control device 142. The offset value updating device 162 in the data management device 141 updates the stored offset values based on the information for specifying the picture groups whose offset values are to be corrected and on the information for designating the amount of change in the offset value for each picture group; the two pieces of information came from the time correction device 147.

In the foregoing description, the WaiWai View display screen 501 was shown to furnish photographer-specific display areas in which pictures taken by different photographers are displayed in chronological order. Alternatively, the WaiWai View display screen 501 may be arranged to provide display areas associated with particular photographed dates of pictures taken by a single photographer. In each area specific to a given photographed date, the pictures taken by the photographer on that day may be displayed in chronological order.

Illustratively, as shown in FIG. 27, one top folder may subsume sub-folders 801 through 804 each containing the picture files of pictures taken on a particular date. In the example of FIG. 27, the sub-folder 801 is named "20040101." The folder name "20040101" signifies that the pictures held in the sub-folder 801 in the form of picture files were photographed on Jan. 1, 2004. Likewise the sub-folder 802 is named "20050101"; the sub-folder 803 "20050102"; and the sub-folder 804 "20050201."

The sub-folder 801 subsumes picture files named "DSC000001.jpg," "DSC0002.jpg," and "DSC0003.jpg." On the right of the picture file names "DSC00011.jpg," "DSC0002.jpg," and "DSC0003.jpg" are numeric characters indicating the photographed dates and times "(2004/01/01 10:10)," "(2004/01/01 10:10)" and "(2004/01/01 10:20)" for the pictures held in the respective picture files. For example, the numeric indication "(2004/01/01 10:01)" signifies that the picture in the picture file named "DSC00011.jpg" was taken at 10:10 on Jan. 1, 2004.

Similarly the sub-folder 802 subsumes picture files named "DSC01001.jpg," "DSC01002.jpg," and "DSC01003.jpg." On the right of the picture file names "DSC01001.jpg," "DSC01002.jpg" and "DSC01003.jpg" are numeric characters indicating the photographed dates and times "(2005/01/01 10:05)," "(2005/01/01 10:20)" and "(2005/01/01 10:28)" for the pictures held in the respective picture files.

The sub-folder 803 subsumes picture files named "DSC02001.jpg," "DSC02002.jpg," and "DSC02003.jpg." On the right of the picture file names "DSC02001.jpg," "DSC02002.jpg," and "DSC02003.jpg" are numeric characters indicating the photographed dates and times "(2005/01/02 10:10)," "(2005/01/02 10:20)" and "(2005/01/02 10:25)" for the pictures held in the respective picture files.

The sub-folder 804 subsumes picture files named "DSC03001.jpg," "DSC03002.jpg," and "DSC03003.jpg." On the right of the picture file names "DSC03001.jpg," "DSC03002.jpg" and "DSC03003.jpg" are numeric characters indicating the photographed dates and times "(2005/02/01 10:05," "(2005/02/01 10:20)" and "(2005/02/01 10:30)" for the pictures held in the respective picture files.

Illustratively, the user may operate the input device 36 to designate (i.e., select) the top folder under which the sub-folders 801 through 804 are stored as shown in FIG. 27, before specifying execution of lineup picture display. In such a case, the WaiWai View display screen 501 is arranged to furnish four areas as shown in FIG. 28: an area 831-1 for displaying the pictures of the picture files in the sub-folder 801 (FIG. 27), an area 831-2 for displaying the pictures of the picture files in the sub-folder 802 (FIG. 27), an area 831-3 for displaying the pictures of the picture files in the sub-folder 803 (FIG. 27), and an area 831-4 for displaying the pictures of the picture files in the sub-folder 804 (FIG. 27).

On the left of the areas 831-1 through 831-4 in FIG. 28 are numeric characters indicating the photographed dates "20040101," "20050101," "20050102" and "20050201" of the pictures associated with the sub-folders 801 through 804. The areas 831-1 through 831-4 display pictures of the picture files from the sub-folders 801 through 804, respectively, the pictures being shown from left to right in chronological order of their display times.

As described, the WaiWai View display screen 501 is arranged to provide display areas each specific to a given photographed date. Each display area is caused to display pictures that were taken on the corresponding day, the pictures appearing side by side chronologically. The user viewing the pictures thus displayed on the WaiWai View display screen 501 can recall what he or she was doing every day, every month, or every year (e.g., as the user's chronicle).

In another example, one photographer may have taken pictures using a plurality of imaging devices during a single event. In that case, a sub-folder may be created for each imaging device and the created sub-folders may be subsumed under one suitable top folder. The WaiWai View display screen 501 may then be arranged to furnish display areas each specific to one imaging device. Each of the areas may be set to display pictures taken by the corresponding imaging device, the pictures appearing side by side in chronological order.

As described, the information processing apparatus allows pictures taken by different photographers to be displayed in photographer-specific areas on the WaiWai View display screen, side by side in chronological order. This arrangement presents the user with pictures taken by multiple photographers more effectively than before.

The series of steps and processes described above may be executed either by hardware or by software. For the software-based processing to take place, the programs constituting the software may be either incorporated beforehand in dedicated hardware of a computer or installed upon use from a suitable program storage medium into a general-purpose personal computer or like equipment capable of executing diverse functions based on the installed programs.

As shown in FIG. 1, the program storage medium carrying the programs to be installed into the computer for execution may be the removable media 51 as package media constituted by magnetic disks (including flexible disks), optical disks (including CD-ROM (Compact Disc-Read Only Memory) and DVD (Digital Versatile Disc)), magneto-optical disks (including MD (Mini-disc; registered trademark)), or semiconductor memory; or may be offered in the form of the ROM 32 or hard disks making up the recording device 38 where the programs are stored temporarily or permanently. The storage medium may have the programs recorded thereto as needed through wired or wireless communication means such as local area networks, the Internet, or digital satellite broadcasting networks, by way of the communication device 39 serving as an interface in the form of a router or a modem.

In this specification, the steps which describe the programs stored on the program storage medium represent not only the processes that are to be carried out in the depicted sequence, or on a time series basis, but also processes that may be performed parallelly or individually and not chronologically.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus comprising:
circuitry configured to:
allocate each of a plurality of picture display areas on a display to each of a plurality of picture groups each made up of a plurality of pictures, said picture display areas being arrayed in a first direction on a screen for displaying pictures;
display at least a portion of image contents of each of the pictures of each of said picture groups in screen locations of the display which correspond to said picture display areas allocated to said picture groups, the screen locations arrayed in a second direction different from said first direction and determined by a chronological timing associated with said pictures; and
control a range of said chronological timing for displaying the pictures, wherein
the range of said chronological timing for displaying the pictures in each of the picture display areas allocated to each of the picture groups spans a same predetermined time interval,
the circuitry is configured to display a first photographer name in an area of the display along with a first picture group among the plurality of picture groups corresponding to the first photographer name and to display a second photographer name in another area of the display along with a second picture group among the plurality of picture groups corresponding to the second photographer name, and
the first picture group corresponding to the first photographer name and the second picture group corresponding to the second photographer name are arrayed on the display in the second direction in a chronological order corresponding to a photographed date and time of pictures in the first picture group and the second picture group.

2. The information processing apparatus according to claim 1, wherein any one of said picture groups is formed by the pictures taken by a single photographer, picked up by a single imaging device, or recorded at a same date and time; and
wherein said chronological timing associated with said pictures represent either times at which said pictures were taken or times at which picture files for said pictures were created.

3. The information processing apparatus according to claim 1, wherein the circuitry is configured to:
store information representing a correction value for correcting said chronological timing associated with said pictures; and
cause said pictures to be displayed in the screen locations determined by updated times obtained by adding said correction value to said chronological timing associated with said pictures.

4. An information processing method comprising:
allocating each of a plurality of picture display areas on a display to each of a plurality of picture groups each made up of a plurality of pictures, said picture display areas being arrayed in a first direction on a screen for displaying pictures;
displaying at least a portion of image contents of each of the pictures of each of said picture groups in screen locations of the display which correspond to said picture display areas allocated to said picture groups, the screen locations arrayed in a second direction different from said first direction and determined by a chronological timing associated with said pictures; and controlling a range of said chronological timing for displaying the pictures, wherein the range of said chronological timing for displaying the pictures in each of the picture display areas allocated to each of the picture groups spans a same predetermined time interval, a first photographer name is displayed in an area of the display along with a first picture group among the plurality of picture groups corresponding to the first photographer name and a second photographer name is displayed in another area of the display along with a second picture group among the plurality of picture groups corresponding to the second photographer name, and the first picture group corresponding to the first photographer name and the second picture group corresponding to the second photographer name are arrayed on the display in the second direction in a chronological order corresponding to a photographed date and time of pictures in the first picture group and the second picture group.

5. A non-transitory computer readable storage medium having instructions stored therein, which when executed by a processor causes the processor to execute a method comprising:

allocating each of a plurality of picture display areas on a display to each of a plurality of picture groups each made up of a plurality of pictures, said picture display areas being arrayed in a first direction on a screen for displaying pictures;

displaying at least a portion of image contents of each of the pictures of each of said picture groups in screen locations of the display which correspond to said picture display areas allocated to said picture groups, the screen locations arrayed in a second direction different from said first direction and determined by a chronological timing associated with said pictures; and controlling a range of said chronological timing for displaying the pictures, wherein the range of said chronological timing for displaying the pictures in each of the picture display areas allocated to each of the picture groups spans a same predetermined time interval, a first photographer name is displayed in an area of the display along with a first picture group among the plurality of picture groups corresponding to the first photographer name and a second photographer name is displayed in another area of the display along with a second picture group among the plurality of picture groups corresponding to the second photographer name, and the first picture group corresponding to the first photographer name and the second picture group corresponding to the second photographer name are arrayed on the display in the second direction in a chronological order corresponding to a photographed date and time of pictures in the first picture group and the second picture group.

6. An information processing apparatus comprising:

an allocation device configured to allocate each of a plurality of picture display areas on a display to each of a plurality of picture groups each made up of a plurality of pictures, said picture display areas being arrayed in a first direction on a screen for displaying pictures; and a lineup display control device configured to display at least a portion of image contents of each of the pictures of each of said picture groups in screen locations of the display which correspond to said picture display areas allocated to said picture groups, the screen locations arrayed in a second direction different from said first direction and determined by a chronological timing associated with said pictures, and control a range of said chronological timing for displaying the pictures, wherein the range of said chronological timing for displaying the pictures in each of the picture display areas allocated to each of the picture groups spans a same predetermined time interval, the lineup display control device is configured to display a first photographer name in an area of the display along with a first picture group among the plurality of picture groups corresponding to the first photographer name and to display a second photographer name in another area of the display along with a second picture group among the plurality of picture groups corresponding to the second photographer name, and the first picture group corresponding to the first photographer name and the second picture group corresponding to the second photographer name are arrayed on the display in the second direction in a chronological order corresponding to a photographed date and time of pictures in the first picture group and the second picture group.

7. The information processing apparatus according to claim 1, wherein the screen includes a button on a slide bar to allow a user to vary the range of said chronological timing for displaying the pictures in each of the picture display areas allocated to each of the picture groups.

8. The information processing apparatus according to claim 1, wherein the screen includes a pair of buttons for each of the picture groups so as to adjust a starting display time and a ending display time of the pictures in picture display areas corresponding to each of the picture groups.

* * * * *